US012707233B2

(12) United States Patent
Wu

(10) Patent No.: US 12,707,233 B2
(45) Date of Patent: Aug. 11, 2026

(54) MANAGING POINT-TO-POINT AND POINT-TO-MULTIPOINT TRANSMISSION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 375 days.

(21) Appl. No.: 18/272,259

(22) PCT Filed: Jan. 10, 2022

(86) PCT No.: PCT/US2022/011776

§ 371 (c)(1),
(2) Date: Jul. 13, 2023

(87) PCT Pub. No.: WO2022/155086

PCT Pub. Date: Jul. 21, 2022

(65) Prior Publication Data

US 2024/0089705 A1 Mar. 14, 2024

Related U.S. Application Data

(60) Provisional application No. 63/137,388, filed on Jan. 14, 2021.

(51) Int. Cl.
*H04W 4/06* (2009.01)
*H04W 72/30* (2023.01)

(52) U.S. Cl.
CPC ............. *H04W 4/06* (2013.01); *H04W 72/30* (2023.01)

(58) Field of Classification Search
None
See application file for complete search history.

(56) References Cited

U.S. PATENT DOCUMENTS

2020/0323024 A1 10/2020 Huang et al.
2021/0120526 A1 4/2021 Zhu et al.
(Continued)

FOREIGN PATENT DOCUMENTS

EP 3 723 395 A1 10/2020
WO WO-2021/098106 A1 5/2021
(Continued)

OTHER PUBLICATIONS

International Search Report and Written Opinion for Application No. PCT/US2022/011776, dated Apr. 26, 2022.
(Continued)

*Primary Examiner* — Robert M Morlan
(74) *Attorney, Agent, or Firm* — MARSHALL, GERSTEIN & BORUN LLP

(57) ABSTRACT

A method in one or more nodes of a radio access network (RAN), for managing multicast and/or broadcast services (MBS) communications, includes transmitting to a user device an MBS radio bearer (MRB) configuration associated with an MRB, implementing a shared packet data convergence protocol (PDCP) entity to transmit first MB S packets to the user device via the MRB and according to the MRB configuration and a first lower layer configuration, and after transmitting the first MB S packets, implementing the shared PDCP entity to transmit second MB S packets to the user device via the MRB and according to a second lower layer configuration and the MRB configuration. The first and second lower layer configurations being different ones of a multicast configuration and a unicast configuration.

21 Claims, 29 Drawing Sheets

(56) References Cited

U.S. PATENT DOCUMENTS

| | | | | |
|---|---|---|---|---|
| 2021/0136693 | A1* | 5/2021 | Zhang | H04W 76/40 |
| 2022/0225384 | A1* | 7/2022 | Takeda | H04W 72/04 |
| 2023/0262735 | A1* | 8/2023 | Wu | H04L 1/1819<br>370/312 |

FOREIGN PATENT DOCUMENTS

| | | | |
|---|---|---|---|
| WO | WO-2021/149939 | A1 | 7/2021 |
| WO | WO-2021/159229 | A1 | 8/2021 |
| WO | WO-2022/031507 | A1 | 2/2022 |

OTHER PUBLICATIONS

RAN3 Chairman, "List of E-Mail Discussions," 3GPP Draft (Sep. 2, 2020).

"LTE; Evolved Universal Terrestrial Radio Access (E-UTRA); Packet Data Convergence Protocol (PDCP) Specification," 3GPP TS 36.323 version 16.3.0 Release 16 (2021).

"5G; NR; Packet Data Convergence Protocol (PDCP) specification," 3GPP TS 38.323 version 16.2.0 Release 16 (2020).

* cited by examiner

RECEIVE FROM CN A CN-TO-BS MESSAGE REQUESTING RADIO RESOURCES FOR UE — 1902

DOES THE MESSAGE INDICATE OR INCLUDE A FIRST, SECOND, OR THIRD QoS PROFILE FOR MRB? — 1904

FIRST QoS PROFILE: TRANSMIT TO DU A CU-TO-DU MESSAGE TO REQUEST MULTICAST CONFIGURATION FOR THE UE — 1906

SECOND QoS PROFILE: TRANSMIT TO DU A CU-TO-DU MESSAGE TO REQUEST UNICAST CONFIGURATION FOR THE UE — 1908

THIRD QoS PROFILE: TRANSMIT TO DU A CU-TO-DU MESSAGE TO REQUEST UNICAST AND MULTICAST CONFIGURATION FOR THE UE — 1910

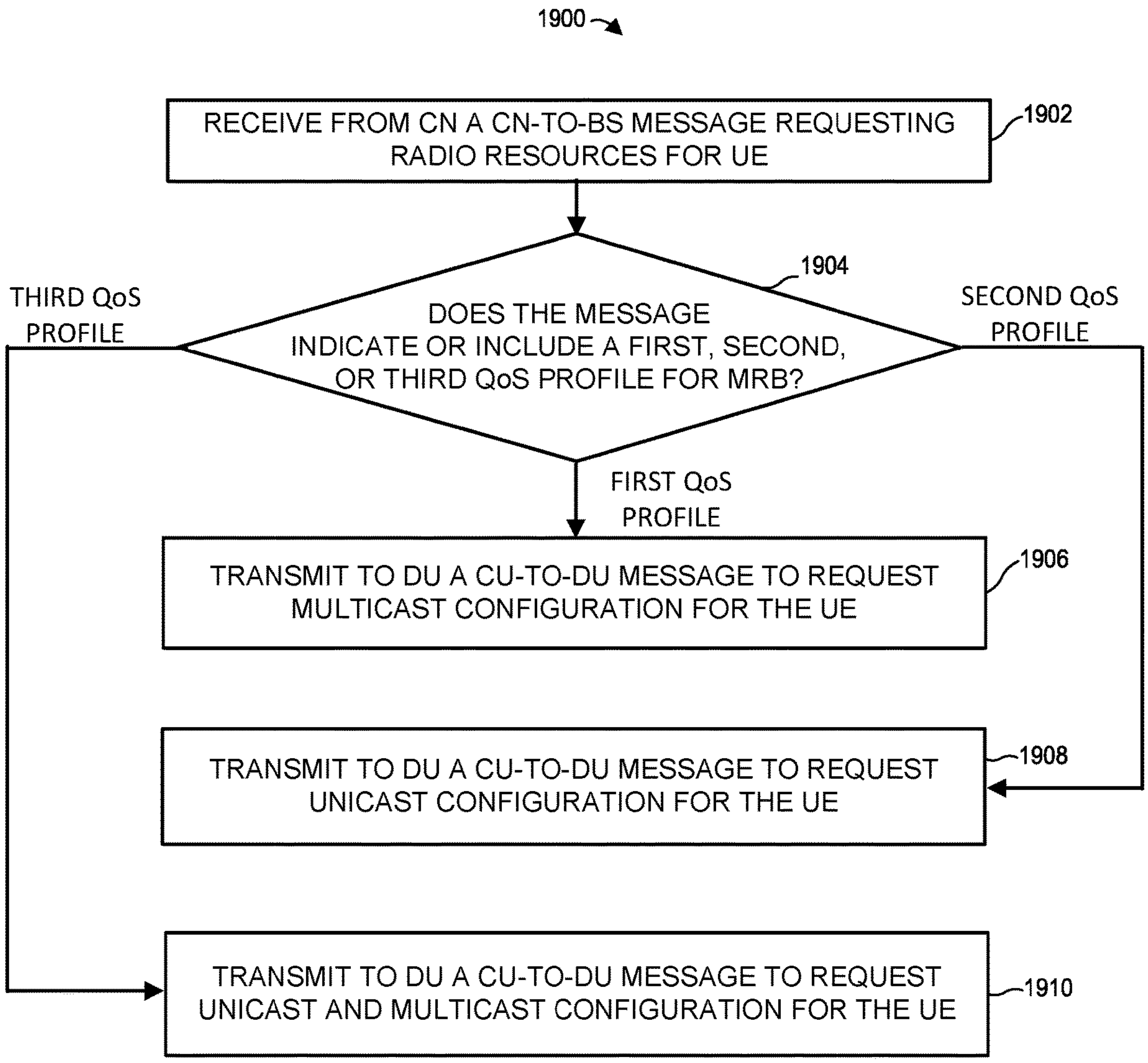

Figure 19

MANAGING POINT-TO-POINT AND POINT-TO-MULTIPOINT TRANSMISSION

FIELD OF THE DISCLOSURE

This disclosure relates to wireless communications and, more particularly, to enabling setup and/or modification of radio resources for point-to-point (PTP) and point-to-multipoint (PTM) communications.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In telecommunication systems, the Packet Data Convergence Protocol (PDCP) sublayer of the radio protocol stack provides services such as transfer of user-plane data, ciphering, integrity protection, etc. For example, the PDCP sublayer defined for the Evolved Universal Terrestrial Radio Access (EUTRA) radio interface (see Third Generation Partnership Project (3GPP) specification TS 36.323) and New Radio (NR) (see 3GPP specification TS 38.323) provides sequencing of protocol data units (PDUs) in the uplink direction from a user device (also known as a user equipment or "UE") to a base station, as well as in the downlink direction from the base station to the UE. The PDCP sublayer also provides services for signaling radio bearers (SRBs) to the Radio Resource Control (RRC) sublayer. The PDCP sublayer further provides services for data radio bearers (DRBs) to a Service Data Adaptation Protocol (SDAP) sublayer or a protocol layer such as an Internet Protocol (IP) layer, an Ethernet protocol layer, and an Internet Control Message Protocol (ICMP) layer. Generally speaking, the UE and a base station can use SRBs to exchange RRC messages as well as non-access stratum (NAS) messages, and can use DRBs to transport data on a user plane.

The UE in some scenarios can concurrently utilize resources of multiple nodes (e.g., base stations or components of a distributed base station or disaggregated base station) of a radio access network (RAN), interconnected by a backhaul. When these network nodes support different radio access technologies (RATs), this type of connectivity is referred to as multi-radio dual connectivity (MR-DC). When operating in MR-DC, the cell(s) associated with the base station operating as a master node (MN) define a master cell group (MCG), and the cells associated with the base station operating as a secondary node (SN) define the secondary cell group (SCG). The MCG covers a primary cell (PCell) and zero, one, or more secondary cells (SCells), and the SCG covers a primary secondary cell (PSCell) and zero, one, or more SCells. The UE communicates with the MN (via the MCG) and the SN (via the SCG). In other scenarios, the UE utilizes resources of one base station at a time, in single connectivity (SC). The UE in SC only communicates with the MN, via the MCG. A base station and/or the UE determines when the UE should establish a radio connection with another base station. For example, a base station can determine to hand the UE over to another base station, and initiate a handover procedure. The UE in other scenarios can concurrently utilize resources of another RAN node (e.g., a base station or a component of a distributed or disaggregated base station), interconnected by a backhaul.

UEs can use several types of SRBs and DRBs. So-called "SRB1" resources carry RRC messages, which in some cases include NAS messages over the dedicated control channel (DCCH), and "SRB2" resources support RRC messages that include logged measurement information or NAS messages, also over the DCCH but with lower priority than SRB1 resources. More generally, SRB1 and SRB2 resources allow the UE and the MN to exchange RRC messages related to the MN and embed RRC messages related to the SN, and can also be referred to as MCG SRBs. "SRB3" resources allow the UE and the SN to exchange RRC messages related to the SN, and can also be referred to as SCG SRBs. Split SRBs allow the UE to exchange RRC messages directly with the MN via lower-layer resources of the MN and the SN. Further, DRBs terminated at the MN and using the lower-layer resources of only the MN can be referred as MCG DRBs, DRBs terminated at the SN and using the lower-layer resources of only the SN can be referred as SCG DRBs, and DRBs terminated at the MN or SN but using the lower-layer resources of both the MN and the SN can be referred to as split DRBs. DRBs terminated at the MN but using the lower-layer resources of only the SN can be referred to as MN-terminated SCG DRBs. DRBs terminated at the SN but using the lower-layer resources of only the MN can be referred to as SN-terminated MCG DRBs.

UEs can perform handover procedures to switch from one cell to another, whether in SC or DC operation. These procedures involve messaging (e.g., RRC signaling and preparation) among RAN nodes and the UE. The UE may handover from a cell of a serving base station to a target cell of a target base station, or from a cell of a first distributed unit (DU) of a serving base station to a target cell of a second DU of the same base station, depending on the scenario. In DC scenarios, UEs can perform PSCell change procedures to change PSCells. These procedures involve messaging (e.g., RRC signaling and preparation) among RAN nodes and the UE. The UE may perform a PSCell change from a PSCell of a serving SN to a target PSCell of a target SN, or from a PSCell of a source DU of a base station to a PSCell of a target DU of the same base station, depending on the scenario. Further, the UE may perform handover or PSCell change within a cell for synchronous reconfiguration.

Base stations that operate according to fifth-generation (5G) New Radio (NR) requirements support significantly larger bandwidth than fourth-generation (4G) base stations. Accordingly, the Third Generation Partnership Project (3GPP) has proposed that for Release 15, user equipment units (UEs) support a 100 MHz bandwidth in frequency range 1 (FR1) and a 400 MHz bandwidth in frequency range (FR2). Due to the relatively wide bandwidth of a typical carrier in 5G NR, 3GPP has proposed for Release 17 that a 5G NR base station be able to provide multicast and/or broadcast service(s) (MBS) to UEs. MBS can be useful in many content delivery applications, such as transparent IPv4/IPv6 multicast delivery, IPTV, software delivery over wireless, group communications, Internet of Things (IoT) applications, V2X applications, and emergency messages related to public safety, for example.

5G NR provides both point-to-point (PTP) and point-to-multipoint (PTM) delivery methods for the transmission of MBS packet flows over the radio interface. In PTP communications, a RAN node transmits different copies of each MBS data packet to different UEs over the radio interface, while in PTM communications a RAN node transmits a single copy of each MBS data packet to multiple UEs over the radio interface. In some scenarios, however, it is unclear how base stations and UEs should configure and manage PTP and PTM transmissions, and switching between PTP and PTM transmissions.

SUMMARY

User equipment units (UEs) and radio access network (RAN) base stations of this disclosure support the communication of multicast and/or broadcast services (MBS) information via radio resources allocated by the base stations. Generally, a UE can perform a session establishment procedure (e.g., a protocol data unit (PDU) session establishment procedure) with a core network (CN) via a base station of the RAN, after which the base station can use an MBS radio bearer (MRB) associated with the session to transmit (i.e., multicast or unicast) MBS data packets to the UE.

In particular, the base station can configure different downlink radio resources in a cell, or in multiple overlapping cells, in order to broadcast, multicast, and/or unicast MBS data (and associated control information) to one or more UEs. To this end, the base station can configure an MRB to carry MBS information, including MBS data packets and/or associated control information, to a UE. It is understood that, while MBS is an acronym for "multicast and/or broadcast" service(s), in some scenarios a base station can provide MBS packet flows via unicast transmissions. For example, unicast transmissions may be more efficient, and therefore preferred by the CN, in scenarios where very few UEs are utilizing a particular MBS. In some implementations, base stations of this disclosure can also unicast non-MBS data to UEs on dedicated data radio bearers (DRBs), and associated control information, and UEs of this disclosure can transmit non-MBS data to a base station on the uplink.

To prepare for downlink transmissions via an MRB (i.e., to configure an MRB), the base station can transmit an MRB configuration, as well as a multicast configuration and/or a unicast configuration, to the UE. After transmitting the configurations, the base station can use point-to-multipoint (PTM) and/or point-to-point (PTP) transmissions to transmit MBS information to the UE via the MRB. As the terms are used herein, "MRB configurations" are higher layer configurations, while "multicast configurations" and "unicast configurations" are lower layer configurations, relative to each other. For example, MRB configurations may be associated with operations at packet data convergence protocol (PDCP) and service data adaptation protocol (SDAP) layers of a protocol stack, while the multicast and unicast configurations may instead be associated with operations at physical, medium access control (MAC) and/or radio link control (RLC) layers of the protocol stack. As used herein, and unless the context of its use clearly indicates a more specific meaning, the term "configuration" can refer to a full configuration, a delta configuration, or any a subset of configuration parameters (e.g., only the configuration parameters associated with a particular subset of protocol stack layers, etc.).

More specifically, for PTM transmissions, a base station can transmit an MRB configuration and a multicast configuration to multiple UEs, to configure the UEs to receive MBS information via the MRB and the multicast radio resources. The base station then transmits (in this case, multicasts) MBS information via the MRB and multicast radio resources in accordance with the multicast configuration and the MRB configuration, and the UEs receive the MBS information via the MRB and multicast radio resources in accordance with the multicast configuration and the MRB configuration.

For PTP transmissions, a base station can instead transmit an MRB configuration and a unicast configuration to a UE, to configure the UE to receive MBS information via the MRB and the unicast radio resources. The base station then transmits (in this case, unicasts) MBS information via the MRB and unicast radio resources in accordance with the unicast configuration and the MRB configuration, and the UE receives the MBS information via the MRB and unicast radio resources in accordance with the unicast configuration and the MRB configuration.

In some implementations, the base station transmits an MRB configuration for each MBS requested by the UE. For example, the base station may send a UE a PTM MRB configuration for an MBS associated with multicast transmissions, and a separate, PTP MRB configuration for an MBS associated with unicast transmissions.

Additionally or alternatively, in some implementations, the base station sends the UE a new MRB configuration, along with a lower layer configuration (i.e., unicast or multicast configuration), when an MBS (e.g., a PDU session associated with the MBS) changes from multicast to unicast transmissions, or vice versa. In other implementations, the base station does not send the UE a new MRB configuration in this scenario, but does send the UE a new lower layer configuration (e.g., a unicast configuration, if the MBS changes from multicast to unicast). In still other implementations, the base station initially sends the UE an MRB configuration, a multicast configuration, and a unicast configuration when the UE requests an MBS, and thus does not need to send any additional configuration when changing the MBS from multicast to unicast, or vice versa.

In one aspect, a method in one or more nodes of a RAN, for managing MBS communications, comprises transmitting to a user device an MRB configuration associated with an MRB, implementing a shared packet data convergence protocol (PDCP) entity to transmit first MBS packets to the user device via the MRB and according to the MRB configuration and a first lower layer configuration, and after transmitting the first MBS packets, implementing the shared PDCP entity to transmit second MBS packets to the user device via the MRB and according to a second lower layer configuration and the MRB configuration. The first and second lower layer configurations are different ones of a multicast configuration and a unicast configuration.

In another aspect, a method, in a user device communicating with a RAN, for managing MBS communications, comprises receiving from the RAN an MRB configuration associated with an MRB, implementing a shared packet data convergence protocol (PDCP) entity to receive first MBS packets from the RAN via the MRB and according to the MRB configuration and a first lower layer configuration, and after receiving the first MBS packets, implementing the shared PDCP entity to receive second MBS packets from the RAN via the MRB and according to a second lower layer configuration and the MRB configuration. The first and second lower layer configurations are different ones of a multicast configuration and a unicast configuration.

BRIEF DESCRIPTION OF THE DRAWINGS

FIGS. 13-20B are flow diagrams of example methods for managing multicast and unicast MBS communications from the perspective of CU or DU, according to various implementations and/or scenarios.

DETAILED DESCRIPTION OF THE DRAWINGS

Figure 1A:
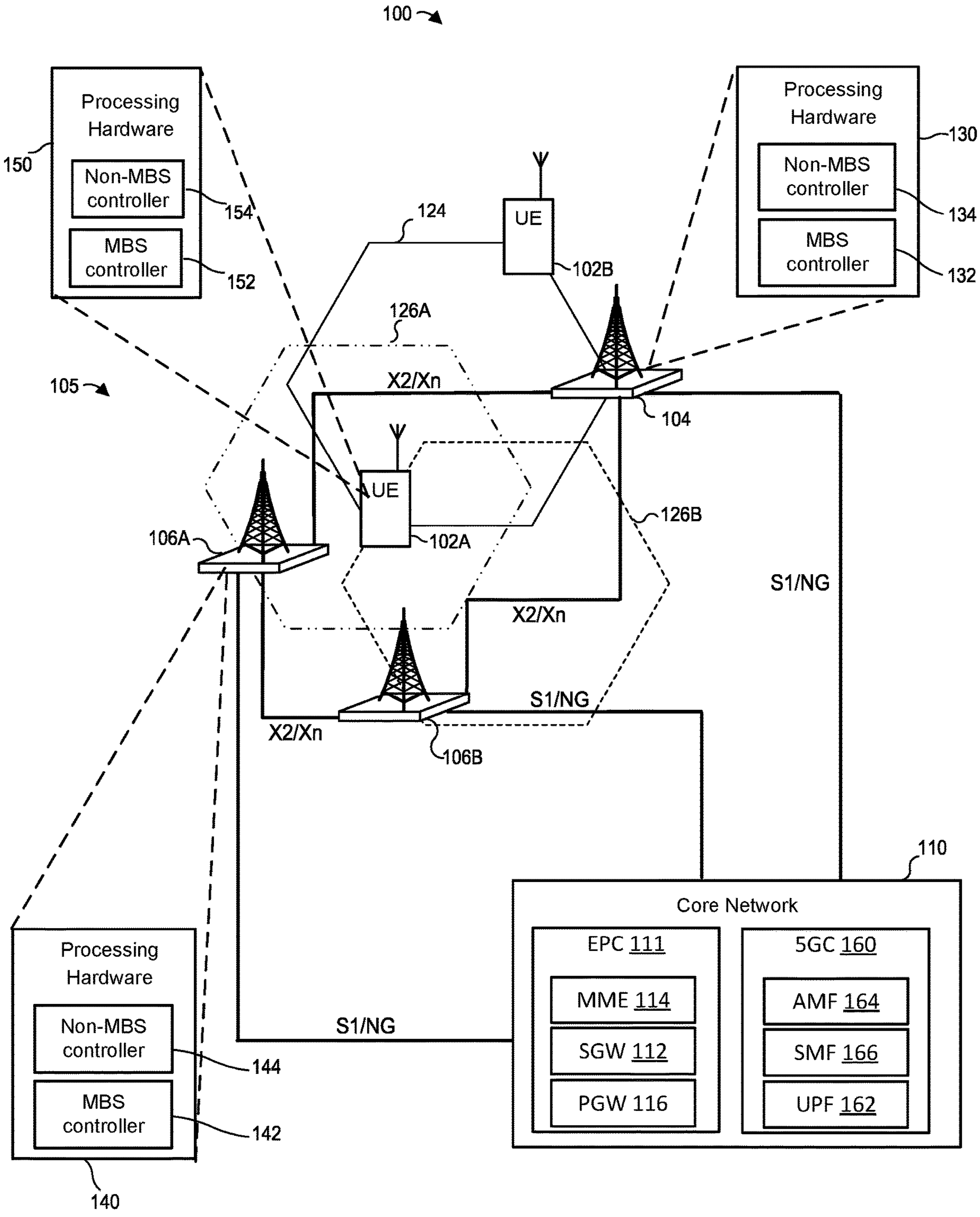
FIG. 1A is a block diagram of an example system in which techniques of this disclosure for managing transmission and reception of MBS information can be implemented.

FIG. 1A depicts an example wireless communication system 100 in which techniques of this disclosure for managing transmission and reception of multicast and/or broadcast services (MBS) information can be implemented. The wireless communication system 100 includes user equipment (UEs) 102A, 102B, as well as base stations 104, 106A, 106B of a radio access network (RAN) 105 connected to a core network (CN) 110. In other implementations or scenarios, the wireless communication system 100 may instead include more or fewer UEs, and/or more or fewer base stations, than are shown in FIG. 1A. The base stations 104, 106A, 106B can be any suitable type, or types, of base stations, such as an evolved node B (eNB), a next-generation eNB (ng-eNB), or a 5G Node B (gNB), for example. As a more specific example, the base station 104 may be an eNB or a gNB, and the base stations 106A and 106B may be gNBs.

The base station 104 supports a cell 124, the base station 106A supports a cell 126A, and the base station 106B supports a cell 126B. The cell 124 partially overlaps with both of cells 126A and 126B, such that the UE 102A can be in range to communicate with base station 104 while simultaneously being in range to communicate with base station 106A or 106B (or in range to detect or measure signals from both base stations 106A and 106B). The overlap can make it possible for the UE 102A to hand over between cells (e.g., from cell 124 to cell 126A or 126B) or base stations (e.g., from base station 104 to base station 106A or 106B) before the UE 102A experiences radio link failure, for example. Moreover, the overlap allows the various dual connectivity (DC) scenarios discussed below. For example, the UE 102A can communicate in DC with the base station 104 (operating as a master node (MN)) and the base station 106A (operating as a secondary node (SN)) and, upon completing a handover to base station 106B, can communicate with the base station 106B (operating as an MN). As another example, the UE 102A can communicate in DC with the base station 104 (operating as an MN) and the base station 106A (operating as an SN) and, upon completing an SN change, can communicate with the base station 104 (operating as an MN) and the base station 106B (operating as an SN). When the UE 102A is in DC with the base station 104 and the base station 106A, the base station 104 operates as a master eNB (MeNB), a master ng-eNB (Mng-eNB), or a master gNB (MgNB), and the base station 106A operates as a secondary gNB (SgNB) or a secondary ng-eNB (Sng-eNB).

In non-MBS (unicast) operation, the UE 102A can use a radio bearer (e.g., a data radio bearer (DRB) or a signal radio bearer (SRB)) that at different times terminates at an MN (e.g., the base station 104) or an SN (e.g., the base station 106A). For example, after handover or SN change to the base station 106B, the UE 102A can use a radio bearer (e.g., a DRB or an SRB) that terminates at the base station 106B. The UE 102A can apply one or more security keys when communicating on the radio bearer, in the uplink (from the UE 102A to a base station) and/or downlink (from a base station to the UE 102A) direction. In non-MBS operation, the UE 102A transmits data via the radio bearer on (i.e., within) an uplink (UL) bandwidth part (BWP) of a cell to the base station, and/or receives data via the radio bearer on a downlink (DL) BWP of the cell from the base station. The UL BWP can be an initial UL BWP or a dedicated UL BWP, and the DL BWP can be an initial DL BWP or a dedicated DL BWP. The UE 102A can receive paging, system information, public warning message(s), or a random access response on the DL BWP. In this non-MB S operation, the UE 102A can be in a connected state. Alternatively, the UE 102A can be in an idle or inactive state if the UE 102A supports small data transmission in the idle or inactive state.

In MBS operation, the UE 102A can use an MBS radio bearer (MRB) that at different times terminates at an MN (e.g., the base station 104) or an SN (e.g., the base station 106A). For example, after handover or SN change to the base station 106B, the UE 102A can use an MRB that terminates at the base station 106B, which can be operating as an MN or SN. In some scenarios, a base station (e.g., the MN or SN) can transmit MBS data over unicast radio resources (i.e., the radio resources dedicated to the UE 102A) to the UE 102A via the MRB. In other scenarios, the base station (e.g., the MN or SN) can transmit MBS data over multicast radio resources (i.e., the radio resources common to the UE 102A and one or more other UEs), or a DL BWP of a cell from the base station to the UE 102A via the MRB. The DL BWP can be an initial DL BWP, a dedicated DL BWP, or an MBS DL BWP (i.e., a DL BWP that is specific to MBS, or not for unicast).

The base station 104 includes processing hardware 130, which can include one or more general-purpose processors (e.g., central processing units (CPUs)) and a computer-readable memory storing machine-readable instructions executable on the one or more general-purpose processor(s), and/or special-purpose processing units. The processing hardware 130 in the example implementation of FIG. 1A includes an MBS controller 132 that is configured to manage or control transmission of MBS information received from the CN 110 or an edge server. For example, the MBS controller 132 can be configured to support radio resource control (RRC) configurations, procedures and messaging associated with MBS procedures, and/or other operations associated with those configurations and/or procedures, as discussed below. The processing hardware 130 can also include a non-MBS controller 134 that is configured to manage or control one or more RRC configurations and/or RRC procedures when the base station 104 operates as an MN or SN during a non-MBS operation.

The base station 106A includes processing hardware 140, which can include one or more general-purpose processors (e.g., CPUs) and a computer-readable memory storing machine-readable instructions executable on the general-purpose processor(s), and/or special-purpose processing units. The processing hardware 140 in the example implementation of FIG. 1A includes an MBS controller 142 and a non-MBS controller 144, which may be similar to the controllers 132 and 134, respectively, of base station 130. While not shown in FIG. 1A, the base station 106B may include processing hardware similar to the processing hardware 130 of the base station 104 and/or the processing hardware 140 of the base station 106A.

The UE 102A includes processing hardware 150, which can include one or more general-purpose processors (e.g., CPUs) and a computer-readable memory storing machine-readable instructions executable on the general-purpose processor(s), and/or special-purpose processing units. The processing hardware 150 in the example implementation of FIG. 1A includes an MBS controller 152 that is configured to manage or control reception of MBS information. For example, the UE MBS controller 152 can be configured to support RRC configurations, procedures and messaging associated with MBS procedures, and/or other operations associated with those configurations and/or procedures, as discussed below. The processing hardware 150 can also include a non-MBS controller 154 configured to manage or control one or more RRC configurations and/or RRC procedures in accordance with any of the implementations discussed below, when the UE 102A communicates with an MN and/or an SN during a non-MBS operation. While not shown in FIG. 1A, the UE 102B may include processing hardware similar to the processing hardware 150 of the UE 102A.

The CN 110 may be an evolved packet core (EPC) 111 or a fifth-generation core (5GC) 160, both of which are depicted in FIG. 1A. The base station 104 may be an eNB supporting an S1 interface for communicating with the EPC 111, an ng-eNB supporting an NG interface for communicating with the 5GC 160, or a gNB that supports an NR radio interface as well as an NG interface for communicating with the 5GC 160. The base station 106A may be an EUTRA-NR DC (EN-DC) gNB (en-gNB) with an S1 interface to the EPC 111, an en-gNB that does not connect to the EPC 111, a gNB that supports the NR radio interface and an NG interface to the 5GC 160, or a ng-eNB that supports an EUTRA radio interface and an NG interface to the 5GC 160. To directly exchange messages with each other during the scenarios discussed below, the base stations 104, 106A, and 106B may support an X2 or Xn interface.

Among other components, the EPC 111 can include a serving gateway (SGW) 112, a mobility management entity (MME) 114, and a packet data network gateway (PGW) 116. The SGW 112 is generally configured to transfer user-plane packets related to audio calls, video calls, Internet traffic, etc., and the MME 114 is configured to manage authentication, registration, paging, and other related functions. The PGW 116 provides connectivity from a UE (e.g., UE 102A or 102B) to one or more external packet data networks, e.g., an Internet network and/or an Internet Protocol (IP) Multimedia Subsystem (IMS) network. The 5GC 160 includes a user plane function (UPF) 162 and an access and mobility management (AMF) 164, and/or a session management function (SMF) 166. The UPF 162 is generally configured to transfer user-plane packets related to audio calls, video calls, Internet traffic, etc., the AMF 164 is generally configured to manage authentication, registration, paging, and other related functions, and the SMF 166 is generally configured to manage PDU sessions.

The UPF 162, AMF 164, and/or SMF 166 can be configured to support MBS. For example, the SMF 166 can be configured to manage or control MBS transport, configure the UPF 162 and/or RAN 105 for MBS flows, and/or manage or configure one or more MBS sessions or PDU sessions for MBS for a UE (e.g., UE 102A or 102B). The UPF 162 is configured to transfer MBS data packets to audio, video, Internet traffic, etc. to the RAN 105. The UPF 162 and/or SMF 166 can be configured for both non-MBS unicast service and MBS, or for MBS only.

Generally, the wireless communication system 100 may include any suitable number of base stations supporting NR cells and/or EUTRA cells. More particularly, the EPC 111 or the 5GC 160 may be connected to any suitable number of base stations supporting NR cells and/or EUTRA cells. Although the examples below refer specifically to specific CN types (EPC, 5GC) and RAT types (5G NR and EUTRA), in general the techniques of this disclosure can also apply to other suitable radio access and/or core network technologies, such as sixth generation (6G) radio access and/or 6G core network or 5G NR-6G DC, for example.

In different configurations or scenarios of the wireless communication system 100, the base station 104 can operate as an MeNB, an Mng-eNB, or an MgNB, the base station 106B can operate as an MeNB, an Mng-eNB, an MgNB, an SgNB, or an Sng-eNB, and the base station 106A can operate as an SgNB or an Sng-eNB. The UE 102A can communicate with the base station 104 and the base station 106A or 106B via the same radio access technology (RAT), such as EUTRA or NR, or via different RATs.

When the base station 104 is an MeNB and the base station 106A is an SgNB, the UE 102A can be in EN-DC with the MeNB 104 and the SgNB 106A. When the base station 104 is an Mng-eNB and the base station 106A is an SgNB, the UE 102A can be in next generation (NG) EUTRA-NR DC (NGEN-DC) with the Mng-eNB 104 and the SgNB 106A. When the base station 104 is an MgNB and the base station 106A is an SgNB, the UE 102A can be in NR-NR DC (NR-DC) with the MgNB 104 and the SgNB 106A. When the base station 104 is an MgNB and the base station 106A is an Sng-eNB, the UE 102A can be in NR-EUTRA DC (NE-DC) with the MgNB 104 and the Sng-eNB 106A.

Figure 1B:
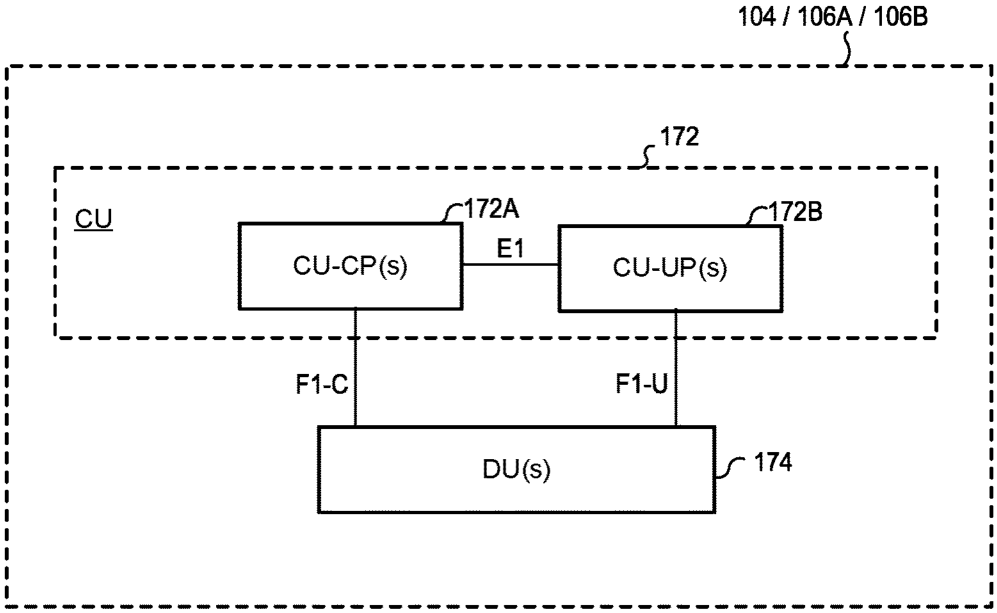
FIG. 1B is a block diagram of an example, distributed implementation of any one or more of the base stations of the RAN of FIG. 1A.

FIG. 1B depicts an example, distributed implementation of any one or more of the base stations 104, 106A, 106B. In this implementation, the base station 104, 106A, or 106B includes a central unit (CU) 172 and one or more distributed units (DUs) 174. The CU 172 includes processing hardware, such as one or more general-purpose processors (e.g., CPUs) and a computer-readable memory storing machine-readable instructions executable on the general-purpose processor(s), and/or special-purpose processing units. For example, the CU 172 can include some or all of the processing hardware 130 or 140 of FIG. 1A.

Each of the DUs 174 also includes processing hardware that can include one or more general-purpose processors (e.g., CPUs) and computer-readable memory storing machine-readable instructions executable on the one or more general-purpose processors, and/or special-purpose processing units. For example, the processing hardware can include a medium access control (MAC) controller configured to manage or control one or more MAC operations or procedures (e.g., a random access procedure), and a radio link control (RLC) controller configured to manage or control one or more RLC operations or procedures when the base station (e.g., base station 104) operates as an MN or an SN. The processing hardware can also include a physical (PHY) layer controller configured to manage or control one or more PHY layer operations or procedures.

In some implementations, the CU 172 can include one or more logical nodes (CU-CP(s) 172A) that host the control plane part of the Packet Data Convergence Protocol (PDCP) protocol of the CU 172 and/or the radio resource control (RRC) protocol of the CU 172. The CU 172 can also include one or more logical nodes (CU-UP(s) 172B) that host the user plane part of the PDCP protocol and/or service data adaptation protocol (SDAP) protocol of the CU 172. The CU-CP(s) 172A can transmit non-MBS control information and MBS control information, and the CU-UP(s) 172B can transmit non-MBS data packets and MBS data packets, as described herein.

The CU-CP(s) 172A can be connected to multiple CU-UPs 172B through the E1 interface. The CU-CP(s) 172A select the appropriate CU-UP(s) 172B for the requested services for the UE 102A. In some implementations, a single CU-UP 172B can be connected to multiple CU-CPs 172A through the E1 interface. A CU-CP 172A can be connected to one or more DUs 174*s* through an F1-C interface. A CU-UP 172B can be connected to one or more DUs 174 through an F1-U interface under the control of the same CU-CP 172A. In some implementations, one DU 174 can be connected to multiple CU-UPs 172B under the control of the same CU-CP 172A. In such implementations, the connectivity between a CU-UP 172B and a DU 174 is established by the CU-CP 172A using bearer context management functions.

Figure 2:
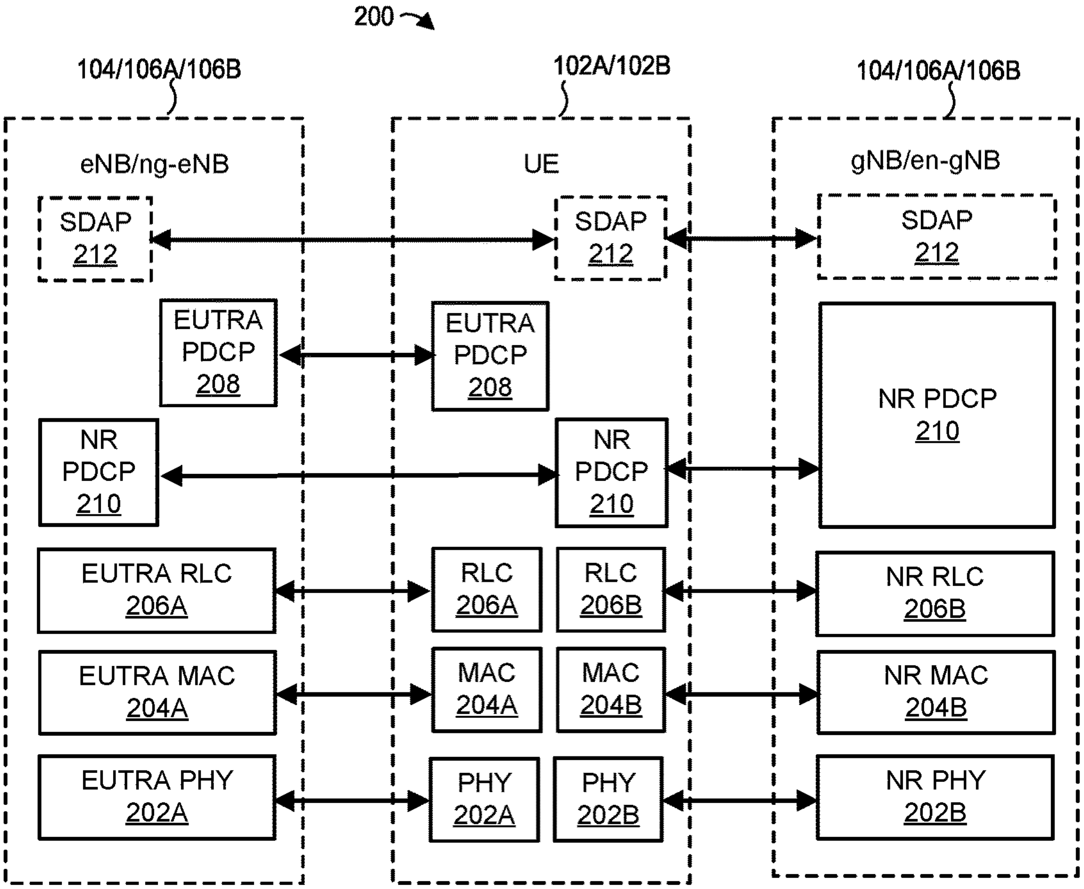
FIG. 2 depicts an example protocol stack according to which the UE of FIG. 1A can communicate with base stations of FIG. 1A.

FIG. 2 illustrates, in a simplified manner, an example protocol stack 200 according to which a UE (e.g., UE 102A or 102B) can communicate with an eNB/ng-eNB or a gNB (e.g., one or more of the base stations 104, 106A, 106B). In the example protocol stack 200, a PHY sublayer 202A of EUTRA provides transport channels to an EUTRA MAC sublayer 204A, which in turn provides logical channels to an EUTRA RLC sublayer 206A. The EUTRA RLC sublayer 206A in turn provides RLC channels to an EUTRA PDCP sublayer 208 and, in some cases, to an NR PDCP sublayer 210. Similarly, an NR PHY 202B provides transport channels to an NR MAC sublayer 204B, which in turn provides logical channels to an NR RLC sublayer 206B. The NR RLC sublayer 206B in turn provides RLC channels to an NR PDCP sublayer 210. The UE 102A, in some implementations, supports both the EUTRA and the NR stack as shown in FIG. 2, to support handover between EUTRA and NR base stations and/or to support DC over EUTRA and NR interfaces. Further, as illustrated in FIG. 2, the UE 102A can support layering of NR PDCP 210 over EUTRA RLC 206A, and an SDAP sublayer 212 over the NR PDCP sublayer 210. Sublayers are also referred to herein as simply "layers."

The EUTRA PDCP sublayer 208 and the NR PDCP sublayer 210 receive packets (e.g., from an IP layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets." The packets can be MBS packets or non-MBS packets. MBS packets may include application content for an MBS service (e.g., IPv4/IPv6 multicast delivery, IPTV, software delivery over wireless, group communications, IoT applications, V2X applications, and/or emergency messages related to public safety), for example. As another example, MBS packets may include application control information for the MBS service.

On a control plane, the EUTRA PDCP sublayer 208 and the NR PDCP sublayer 210 can provide SRBs to exchange RRC messages or non-access-stratum (NAS) messages, for example. On a user plane, the EUTRA PDCP sublayer 208 and the NR PDCP sublayer 210 can provide DRBs to support data exchange. Data exchanged on the NR PDCP sublayer 210 may be SDAP PDUs, IP packets, or Ethernet packets, for example.

In scenarios where the UE 102A or 102B operates in EN-DC with the base station 104 operating as an MeNB and the base station 106A operating as an SgNB, the wireless communication system 100 can provide the UE 102A or 102B with an MN-terminated bearer that uses EUTRA PDCP sublayer 208, or an MN-terminated bearer that uses NR PDCP sublayer 210. The wireless communication system 100 in various scenarios can also provide the UE 102A or 102B with an SN-terminated bearer, which uses only the NR PDCP sublayer 210. The MN-terminated bearer may be an MCG bearer, a split bearer, or an MN-terminated SCG bearer. The SN-terminated bearer may be an SCG bearer, a split bearer, or an SN-terminated MCG bearer. The MN-terminated bearer may be an SRB (e.g., SRB1 or SRB2) or a DRB. The SN-terminated bearer may be an SRB or a DRB.

In some implementations, a base station (e.g., base station 104, 106A, or 106B) broadcasts MBS data packets via one or more MBS radio bearers (MRB(s)), and in turn the UE 102A receives the MBS data packets via the MRB(s). The base station can include configuration(s) of the MRB(s) in multicast configuration parameters (which can also be referred to as MBS configuration parameters) described below. In some implementations, the base station broadcasts the MBS data packets via RLC sublayer 206, MAC sublayer 204, and PHY sublayer 202, and correspondingly, the UE 102A uses PHY sublayer 202, MAC sublayer 204, and RLC sublayer 206 to receive the MBS data packets. In such implementations, the base station and the UE 102A may not use PDCP sublayer 208 and a SDAP sublayer 212 to communicate the MBS data packets. In other implementations, the base station transmits the MBS data packets via PDCP sublayer 208, RLC sublayer 206, MAC sublayer 204, and PHY sublayer 202, and correspondingly, the UE 102A uses PHY sublayer 202, MAC sublayer 204, RLC sublayer 206 and PDCP sublayer 208 to receive the MBS data packets. In such implementations, the base station and the UE 102A may not use a SDAP sublayer 212 to communicate the MBS data packets. In yet other implementations, the base station transmits the MBS data packets via the SDAP sublayer 212, PDCP sublayer 208, RLC sublayer 206, MAC sublayer 204, and PHY sublayer 202 and, correspondingly, the UE 102A uses the PHY sublayer 202, MAC sublayer

204, RLC sublayer 206, PDCP sublayer 208, and SDAP sublayer 212 to receive the MBS data packets.

FIGS. 3A-3F depict alternative, example protocol architectures that a base station (e.g., base station 104, 106A, and/or 106B) may implement for an MRB, while FIGS. 4A-4F depict the corresponding/respective protocol architectures that a UE (e.g., UE 102A and/or 102B) may implement for an MRB. Generally, a protocol layer "entity" (e.g., NR MAC entity 304 or NR MAC entity 404) in FIGS. 3A-3F and 4A-4F is an instance that operates a corresponding protocol layer (e.g., NR MAC 204B) in FIG. 2. The base station can transmit particular configuration parameters for a particular protocol layer entity to the UE. For example, the base station 104 can transmit to the UE 102A MAC configuration parameters for the UE 102A to operate the NR MAC entity 404, 414, or 424. The MAC configuration parameters for NR MAC entity 404, 414, or 424 may be the same, different, or partly the same and partly different.

Figure 3A:
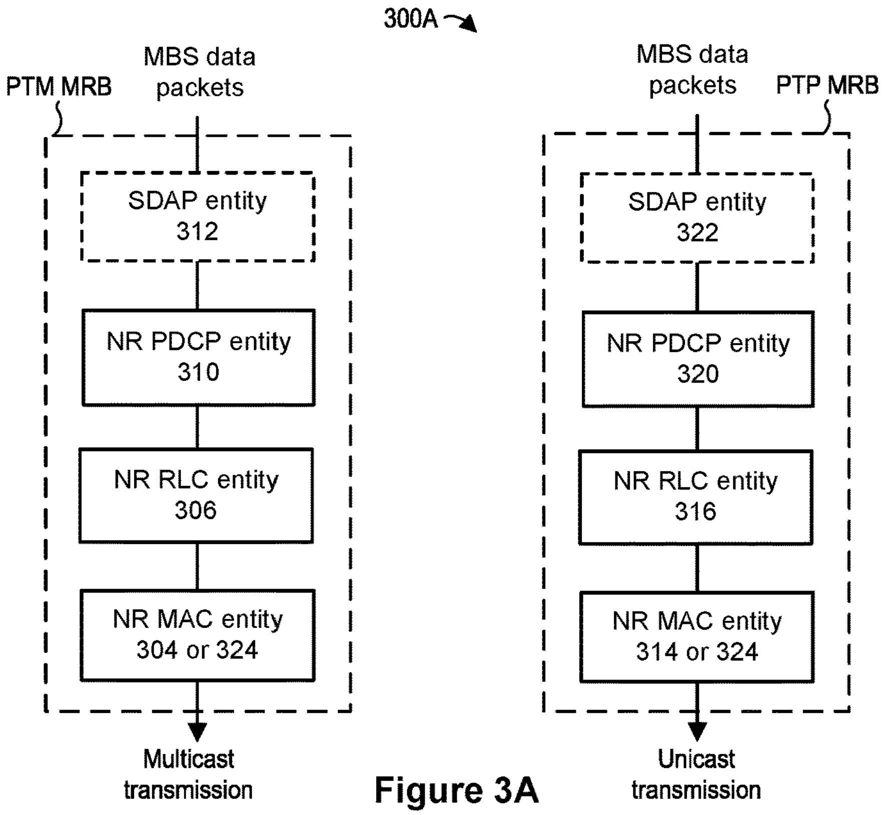
FIGS. 3A-3F depict alternative, example protocol architectures for an MRB in a base station.
Figure 4A:
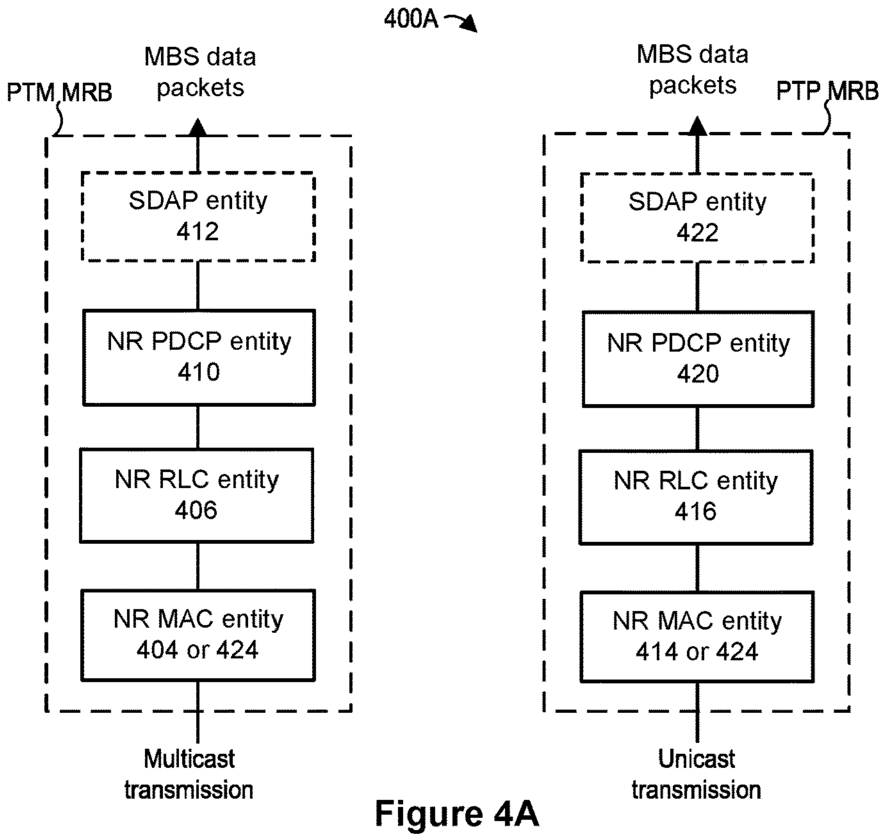
FIGS. 4A-4F depict alternative, example protocol architectures for an MRB in a UE.

Referring first to FIG. 3A, in a protocol architecture 300A, the base station uses separate entities for PTM (multicast) and PTP (unicast) transmissions associated with the same MBS, at each of the MAC, RLC, PDCP, and SDAP layers. In particular, for multicast transmission of MBS information on a PTM MRB, the base station implements an NR MAC entity 304, an NR RLC entity 306, an NR PDCP entity 310, and (optionally) an SDAP entity 312. Conversely, for unicast transmission of MBS information on a PTP MRB, the base station implements a different NR MAC entity 314, a different NR RLC entity 316, a different NR PDCP entity 320, and (optionally) a different SDAP entity 322. As indicated in FIG. 3A, in an alternative implementation, the base station may use the same NR MAC entity 324 regardless of whether transmitting on a PTM MRB or a PTP MRB. FIG. 4A indicates the corresponding entities at the UE, in a protocol architecture 400A. In particular, for receiving MBS information on a PTM MRB, the UE implements an NR MAC entity 404, an NR RLC entity 406, an NR PDCP entity 410, and (optionally) an SDAP entity 412. Conversely, for receiving MBS information on a PTP MRB, the UE implements a different NR MAC entity 414, a different NR RLC entity 416, a different NR PDCP entity 420, and (optionally) a different SDAP entity 422. As indicated in FIG. 4A, in an alternative implementation, the UE may use the same NR MAC entity 424 regardless of whether receiving on a PTM MRB or a PTP MRB.

Figure 3B:
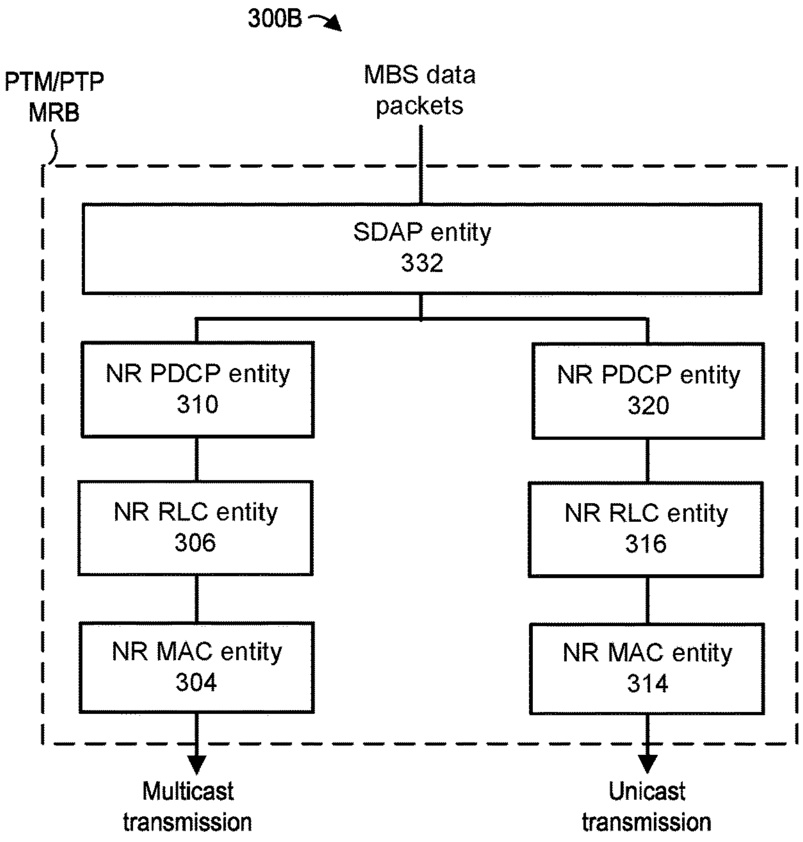
Figure 4B:
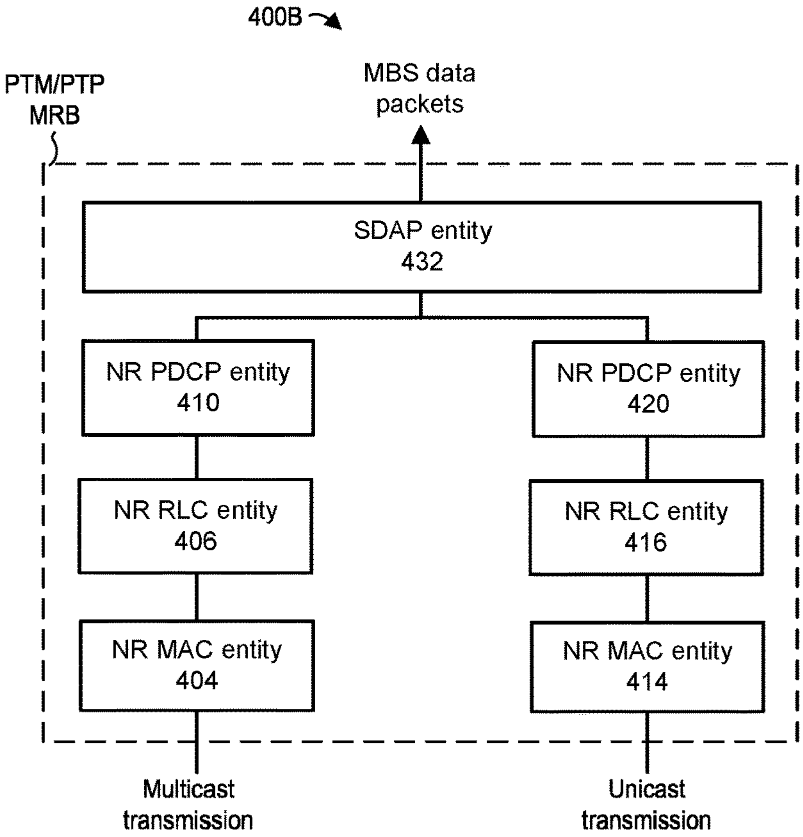

Referring next to FIG. 3B, in an alternative protocol architecture 300B, the base station uses separate entities for PTM (multicast) and PTP (unicast) transmissions associated with the same MBS at some, but not all, layers. In particular, for multicast transmission of MBS information on a PTM MRB, the base station implements an NR MAC entity 304, an NR RLC entity 306, an NR PDCP entity 310, and an SDAP entity 332. Conversely, for unicast transmission of MBS information on a PTP MRB, the base station implements a different NR MAC entity 314, a different NR RLC entity 316, and a different NR PDCP entity 320, but the same SDAP entity 332. FIG. 4B indicates the corresponding entities at the UE, in a protocol architecture 400B. In particular, for receiving MBS information on a PTM MRB, the UE implements an NR MAC entity 404, an NR RLC entity 406, an NR PDCP entity 410, and an SDAP entity 432. Conversely, for receiving MBS information on a PTP MRB, the UE implements a different NR MAC entity 414, a different NR RLC entity 416, and a different NR PDCP entity 420, but the same SDAP entity 432.

Figure 3C:
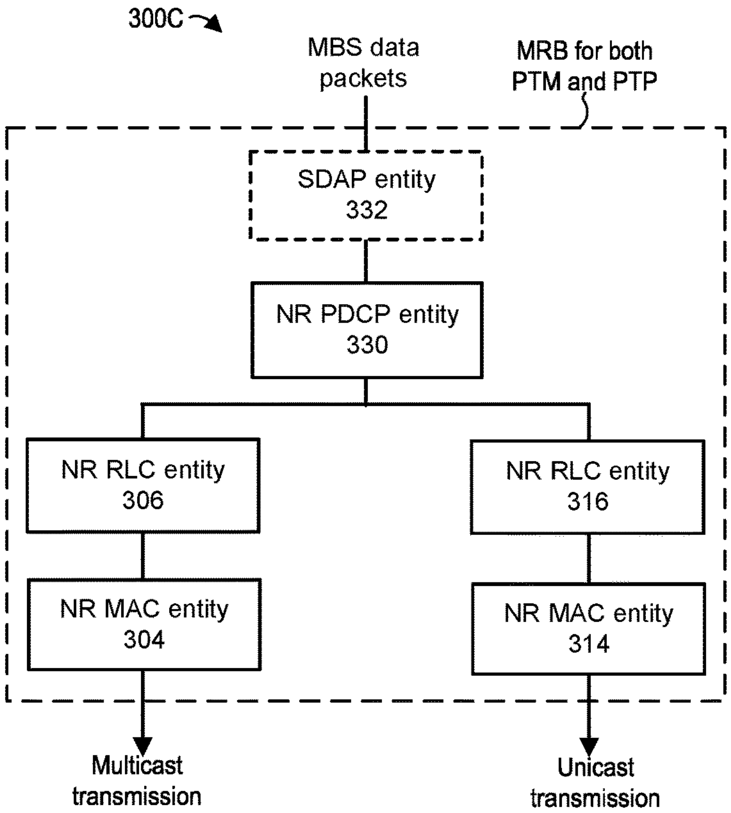
Figure 4C:
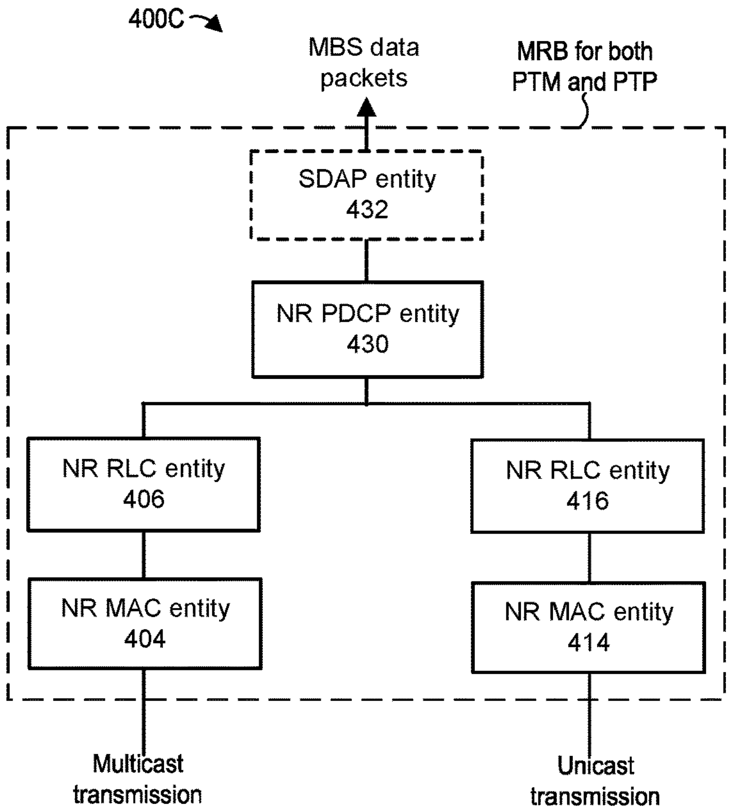

Referring next to FIG. 3C, in an alternative protocol architecture 300C, the base station uses the same MRB for both PTM (multicast) and PTP (unicast) transmissions associated with an MBS. However, the base station uses separate lower layer entities. In particular, for multicast transmission of MBS information on the MRB, the base station implements an NR MAC entity 304, an NR RLC entity 306, an NR PDCP entity 330, and (optionally) an SDAP entity 332. Conversely, for unicast transmission of MBS information on the MRB, the base station implements a different NR MAC entity 314 and a different NR RLC entity 316, but the same NR PDCP entity 330 and (optionally) the same SDAP entity 332. FIG. 4C indicates the corresponding entities at the UE, in a protocol architecture 400C. In particular, for receiving multicast MBS information on the MRB, the UE implements an NR MAC entity 404, an NR RLC entity 406, an NR PDCP entity 430, and (optionally) an SDAP entity 432. Conversely, for receiving unicast MBS information on the MRB, the UE implements a different NR MAC entity 414 and a different NR RLC entity 416, but the same NR PDCP entity 430 and (optionally) the same SDAP entity 432.

Figure 3D:
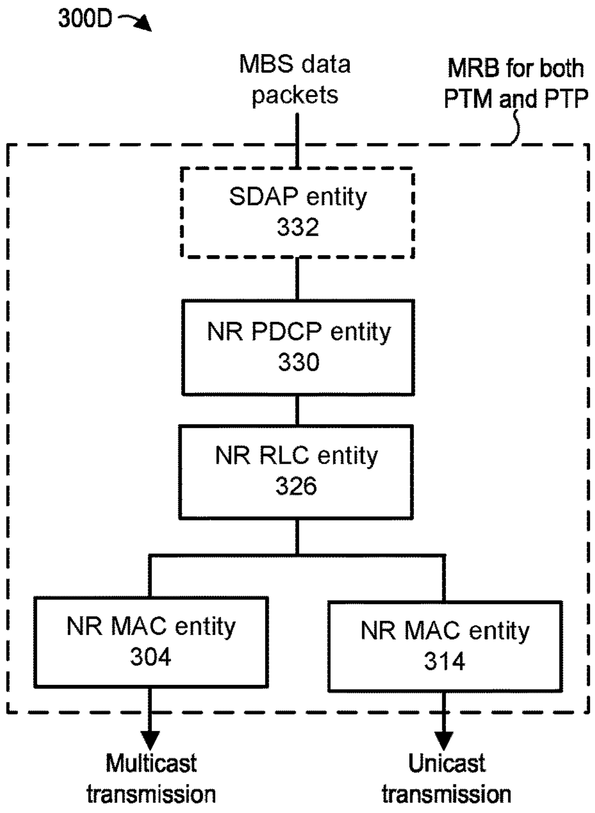
Figure 4D:
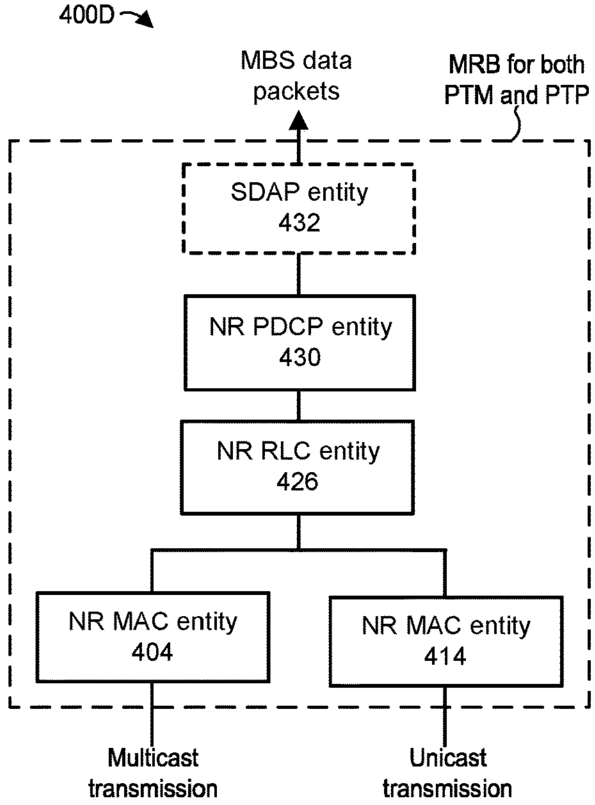

Referring next to FIG. 3D, in an alternative protocol architecture 300D, the base station again uses the same MRB for both PTM (multicast) and PTP (unicast) transmissions associated with an MBS. However, the base station only uses separate MAC layer entities. In particular, for multicast transmission of MBS information on the MRB, the base station implements an NR MAC entity 304, an NR RLC entity 326, an NR PDCP entity 330, and (optionally) an SDAP entity 332. Conversely, for unicast transmission of MBS information on the MRB, the base station implements a different NR MAC entity 314, but the same NR RLC entity 326, the same NR PDCP entity 330, and (optionally) the same SDAP entity 332. FIG. 4D indicates the corresponding entities at the UE, in a protocol architecture 400D. In particular, for receiving multicast MBS information on the MRB, the UE implements an NR MAC entity 404, an NR RLC entity 426, an NR PDCP entity 430, and (optionally) an SDAP entity 432. Conversely, for receiving unicast MBS information on the MRB, the UE implements a different NR MAC entity 414, but the same NR RLC entity 426, the same NR PDCP entity 430, and (optionally) the same SDAP entity 432.

Figure 3E:
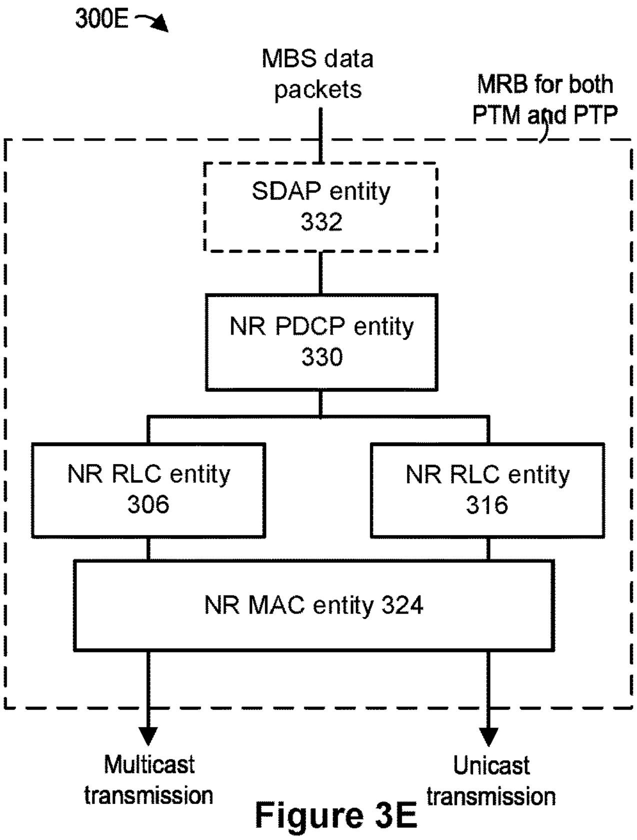
Figure 4E:
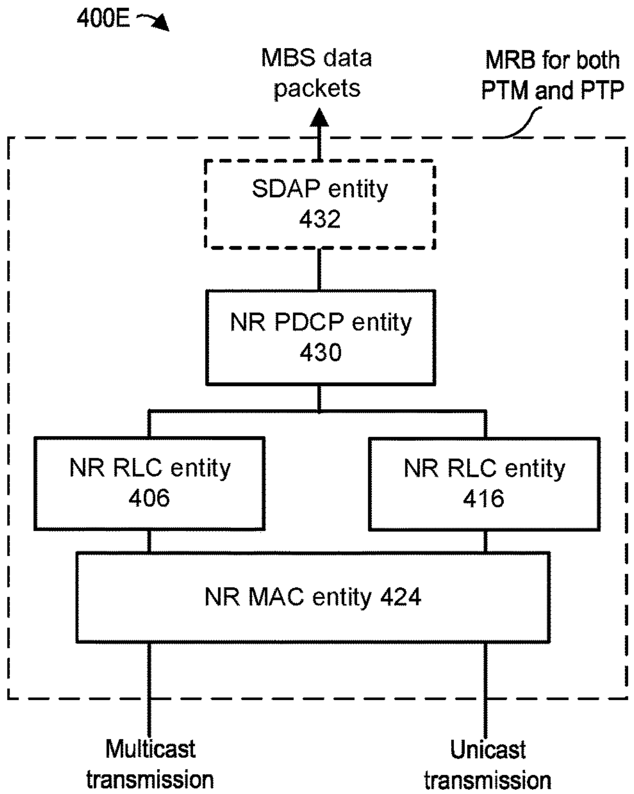

Referring next to FIG. 3E, in an alternative protocol architecture 300E, the base station again uses the same MRB for both PTM (multicast) and PTP (unicast) transmissions associated with an MBS. However, the base station only uses separate RLC layer entities. In particular, for multicast transmission of MBS information on the MRB, the base station implements an NR MAC entity 324, an NR RLC entity 306, an NR PDCP entity 330, and (optionally) an SDAP entity 332. Conversely, for unicast transmission of MBS information on the MRB, the base station implements a different NR RLC entity 316, but the same NR MAC entity 324, the same NR PDCP entity 330, and (optionally) the same SDAP entity 332. FIG. 4E indicates the corresponding entities at the UE, in a protocol architecture 400E. In particular, for receiving multicast MBS information on the MRB, the UE implements an NR MAC entity 424, an NR RLC entity 406, an NR PDCP entity 430, and (optionally) an SDAP entity 432. Conversely, for receiving unicast MBS information on the MRB, the UE implements a different NR RLC entity 416, but the same NR MAC entity 424, the same NR PDCP entity 430, and (optionally) the same SDAP entity 432.

Figure 3F:
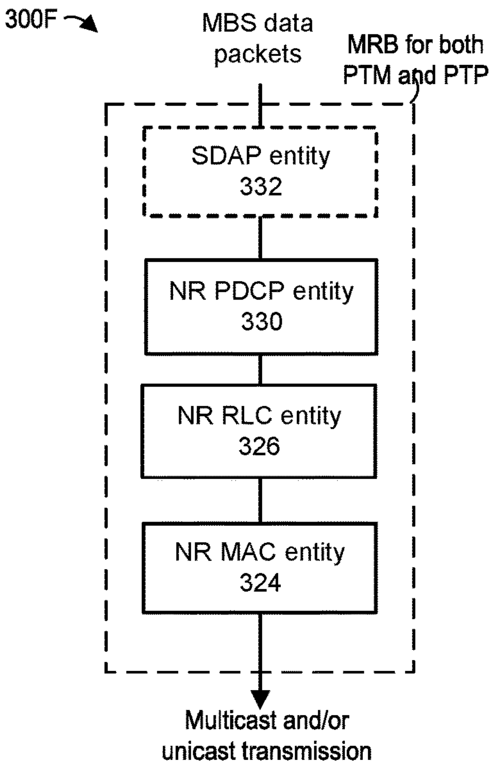
Figure 4F:
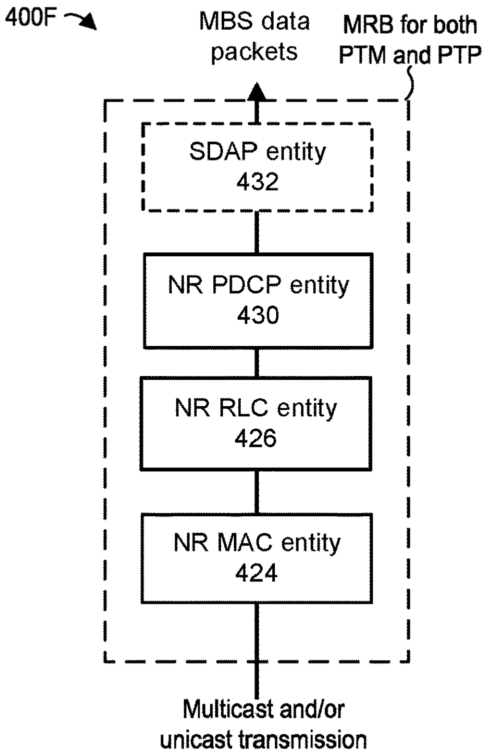

Referring next to FIG. 3F, in an alternative protocol architecture 300F, the base station again uses the same MRB for both PTM (multicast) and PTP (unicast) transmissions associated with an MBS. In this implementation, however, the base station shares entities at each layer. In particular, for both multicast and unicast transmissions of MBS information on the MRB, the base station implements an NR MAC entity 324, an NR RLC entity 326, an NR PDCP entity 330, and (optionally) an SDAP entity 332. FIG. 4F indicates the corresponding entities at the UE, in a protocol architecture 400F. In particular, for receiving both multicast and unicast MBS information on the MRB, the UE implements an NR MAC entity 424, an NR RLC entity 426, an NR PDCP entity 430, and (optionally) an SDAP entity 432.

FIGS. 5A-8C are messaging diagrams of example implementations and scenarios in which a base station, CN, and UE communicate MBS information. Generally speaking, events in FIGS. 5A-8C that may be similar are labeled with similar reference numbers (e.g., event 550A may be similar to event 550B, 650A, 650B, 650C, 750A, 750B, 850A, 850B, 850C, etc.), with differences discussed below where appropriate. With the exception of the differences shown in the figures and discussed below, any of the alternative implementations discussed with respect to a particular event (e.g., for messaging and processing) may apply to events labeled with similar reference numbers in other figures.

Figure 5A:
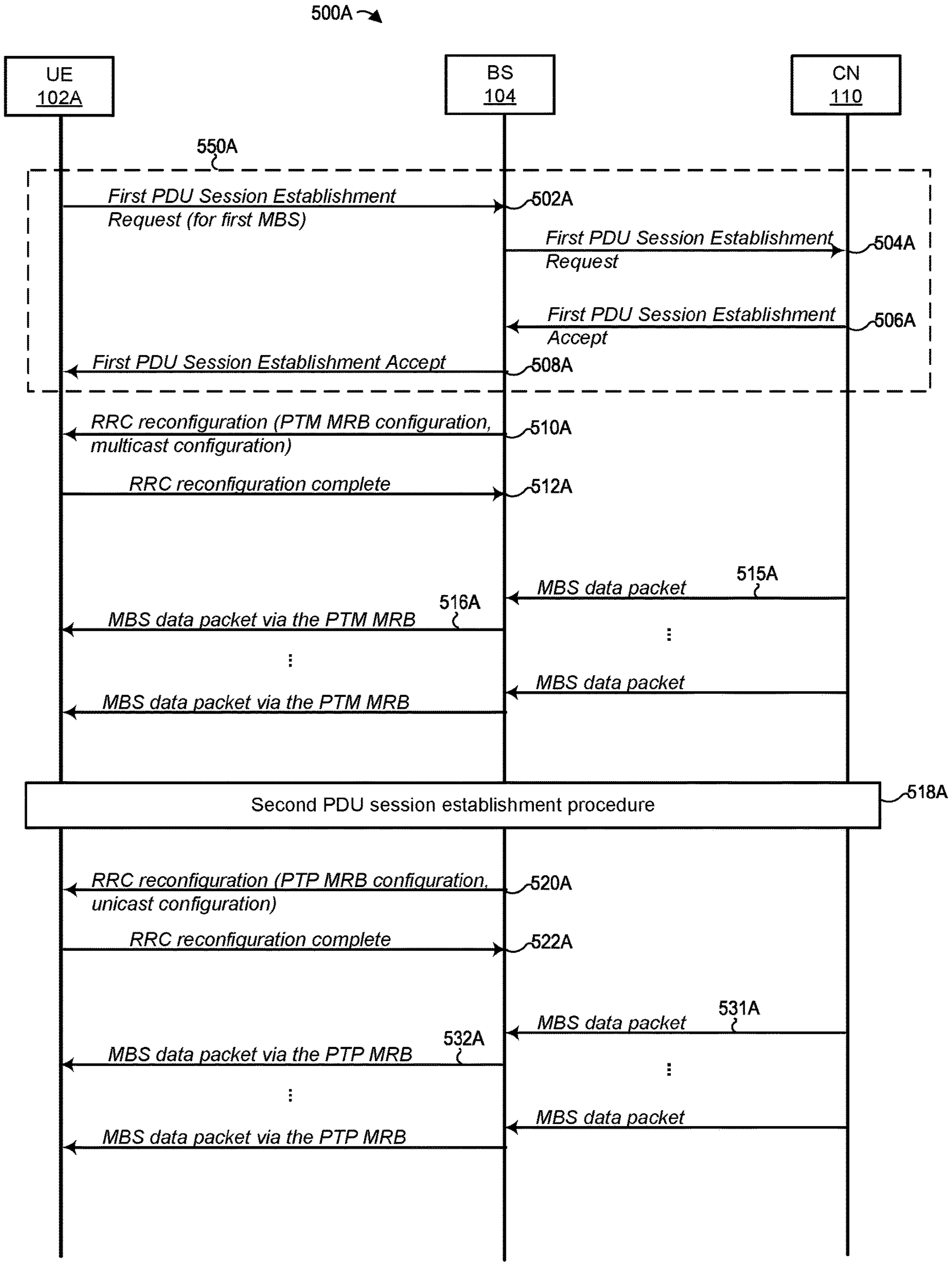
FIGS. 5A-5C are messaging diagrams of example implementations and scenarios in which a UE requests different MBSs associated with multicast and unicast transmissions, respectively.
Figure 5B:
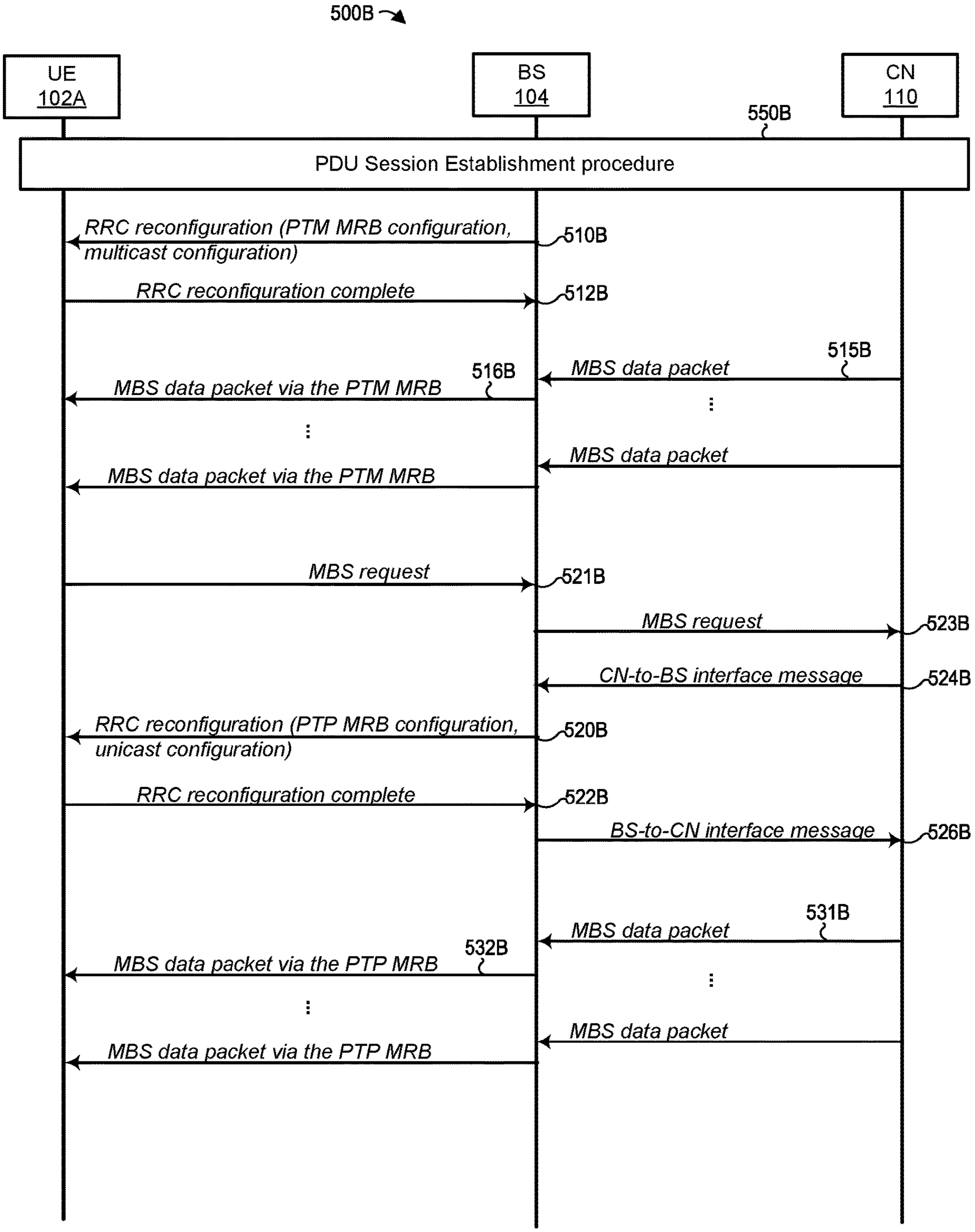
Figure 5C:
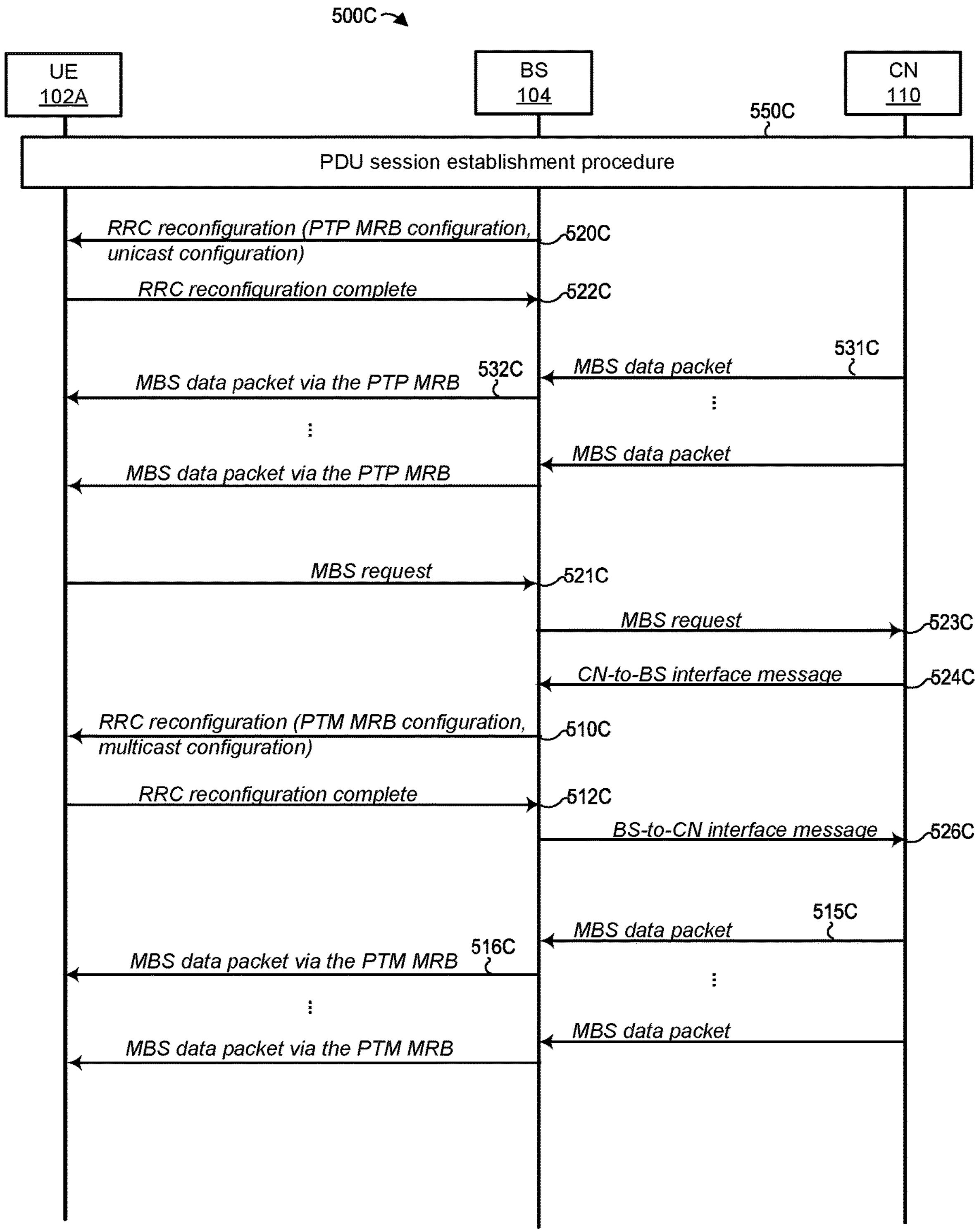
Figure 6A:
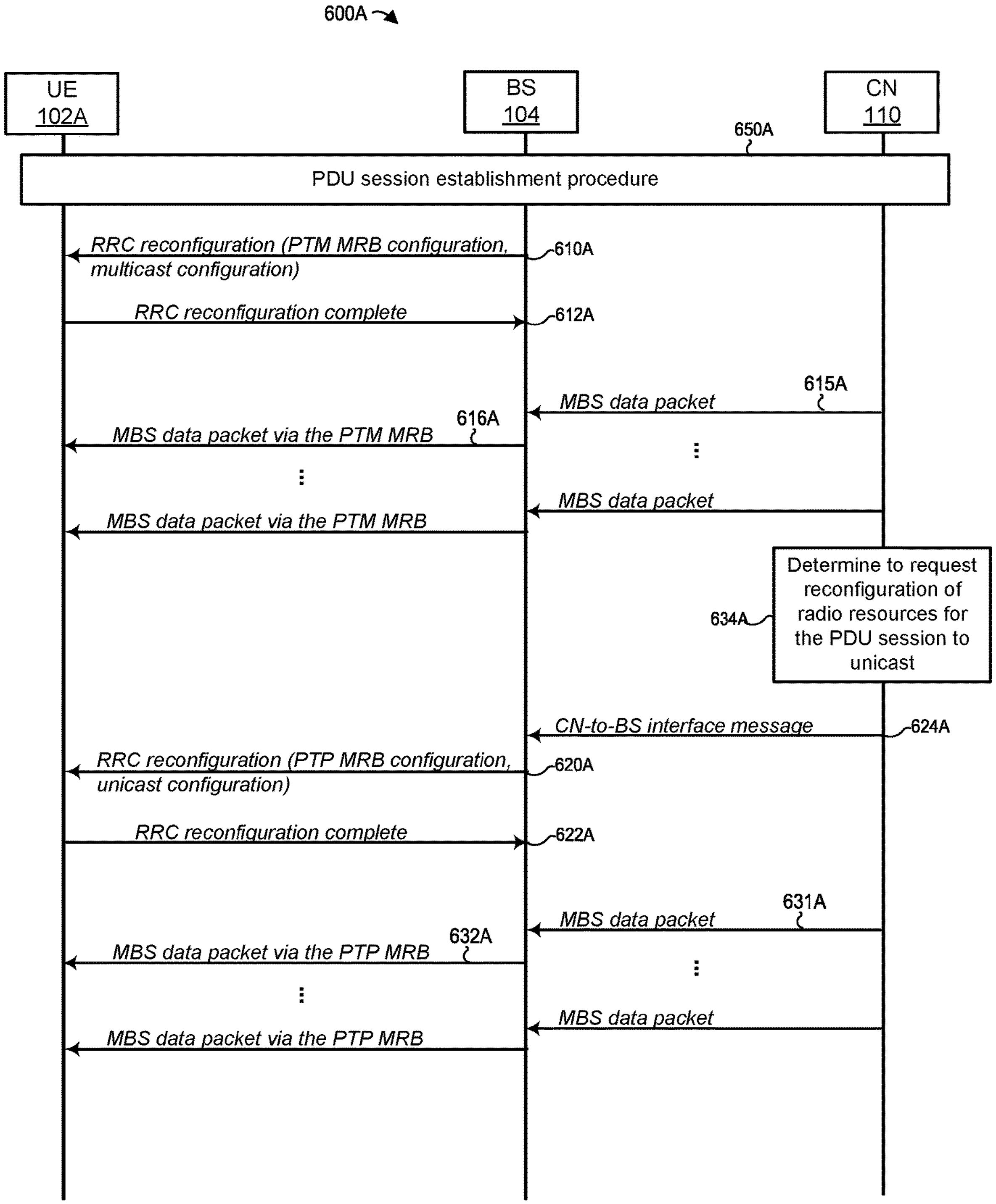
FIGS. 6A-6C are messaging diagrams of example implementations and scenarios in which a UE requests an MBS that is initially associated with multicast transmission, but changes to unicast transmission.
Figure 6B:
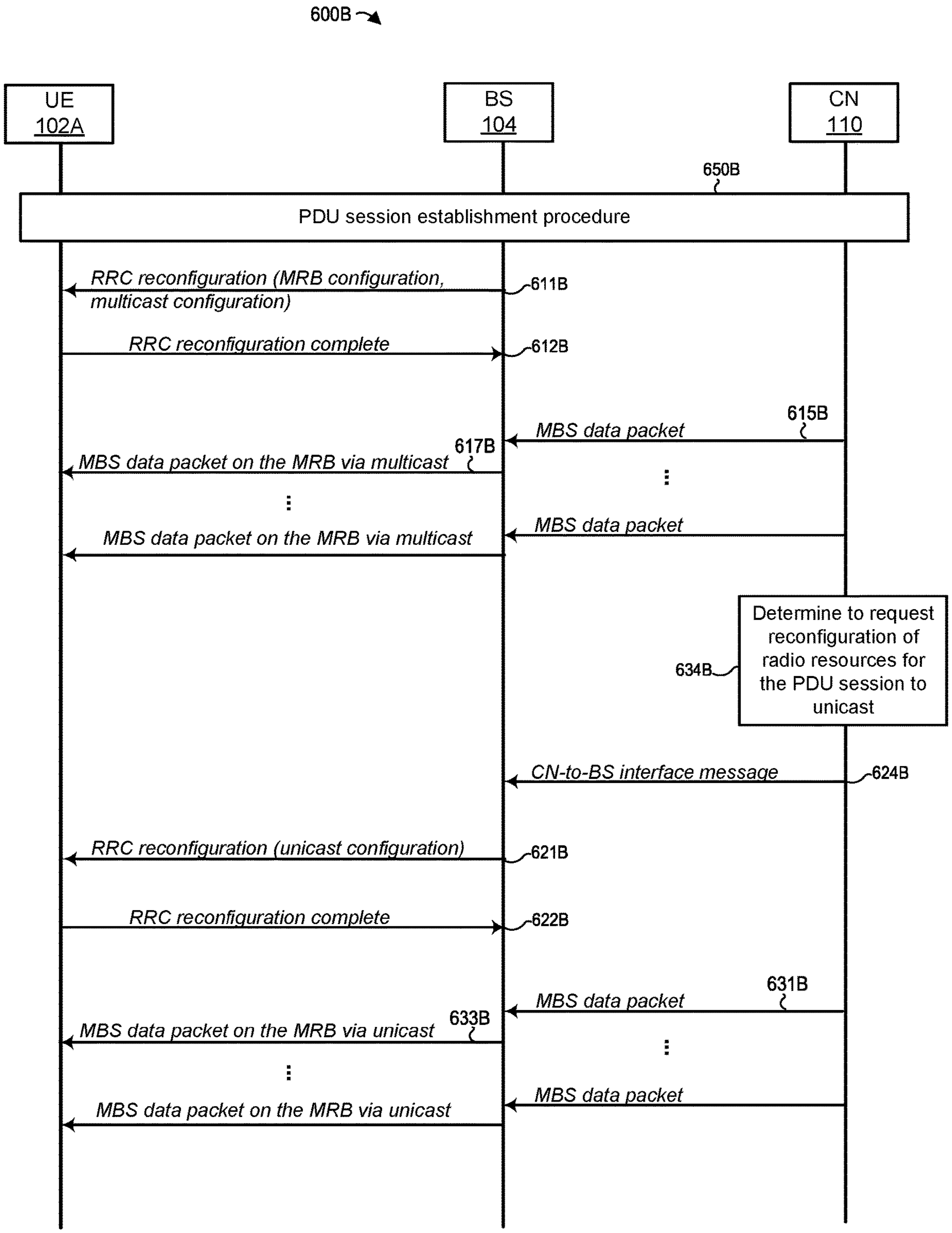
Figure 6C:
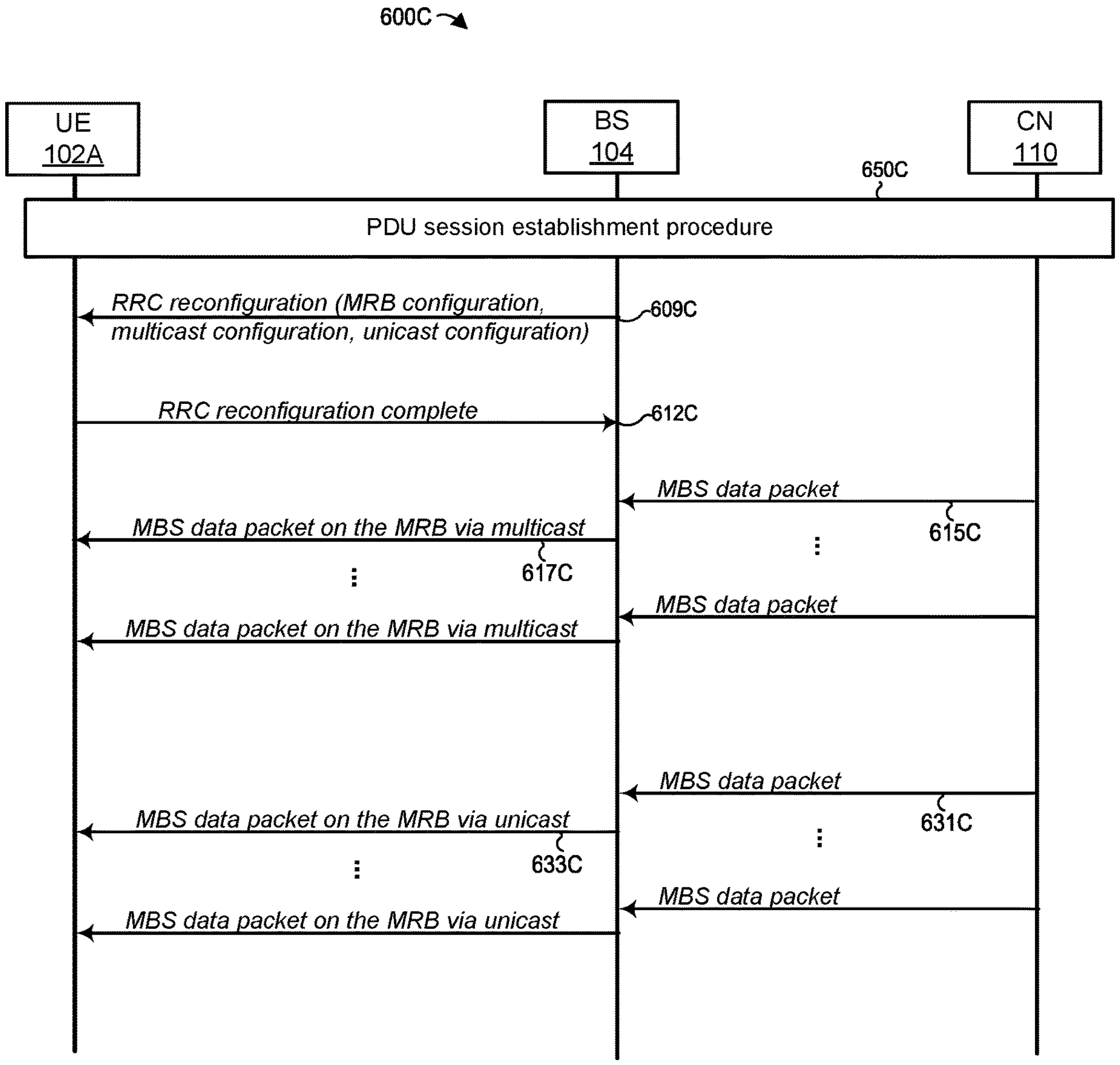
Figure 7A:
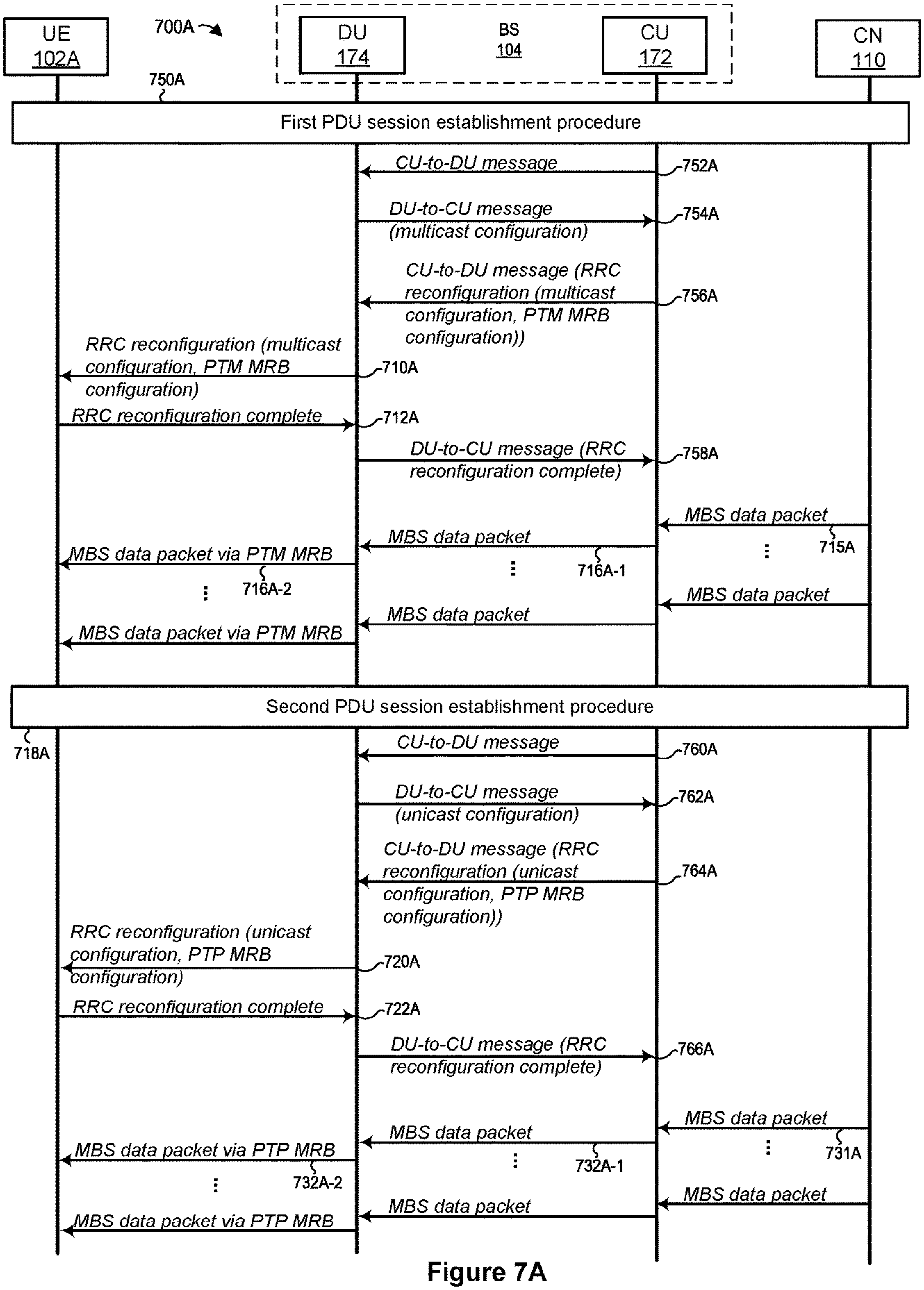
FIGS. 7A and 7B are messaging diagrams of example implementations and scenarios similar to FIGS. 5A and 5B, but in which the base station is a distributed base station.
Figure 7B:
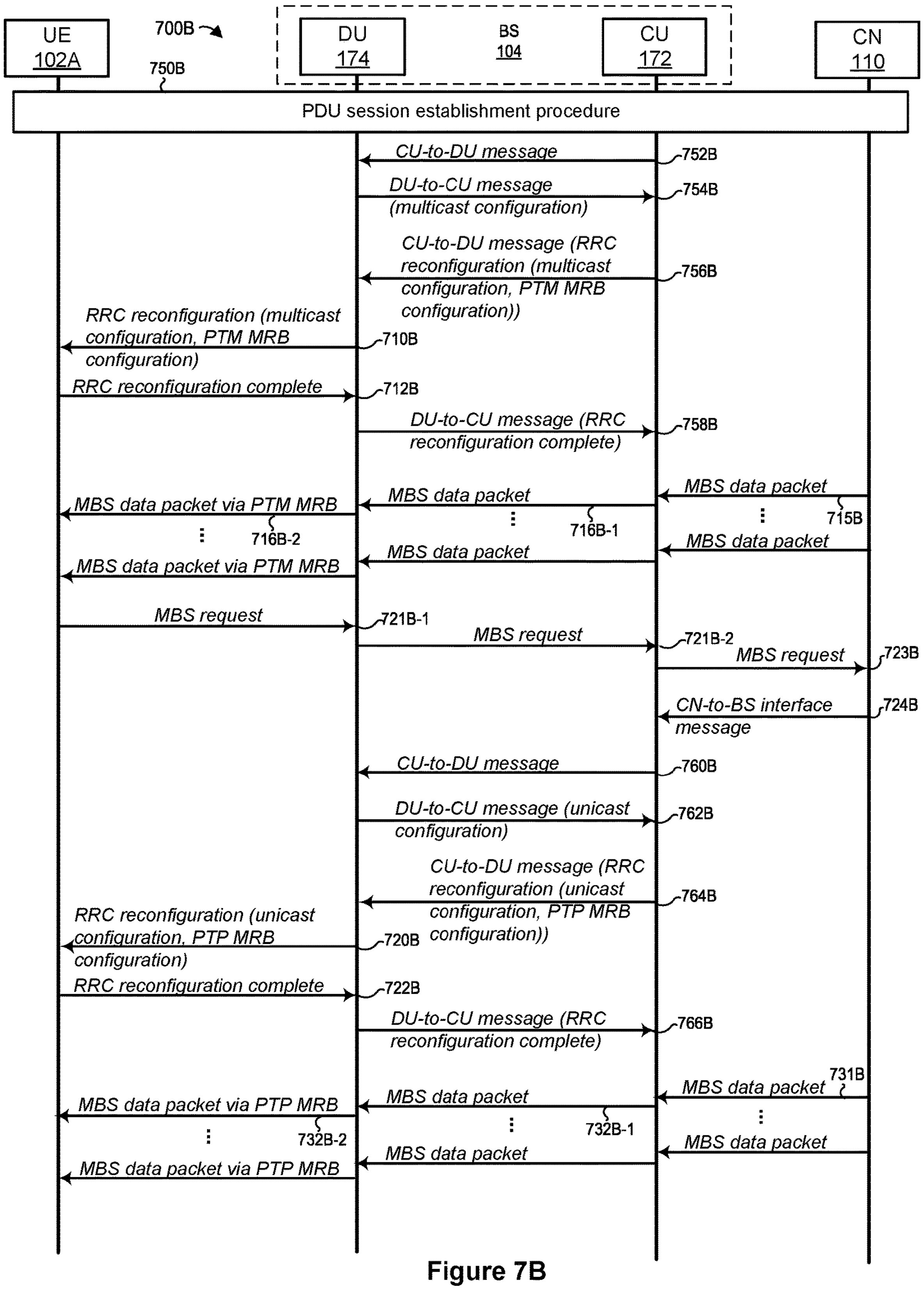
Figure 8A:
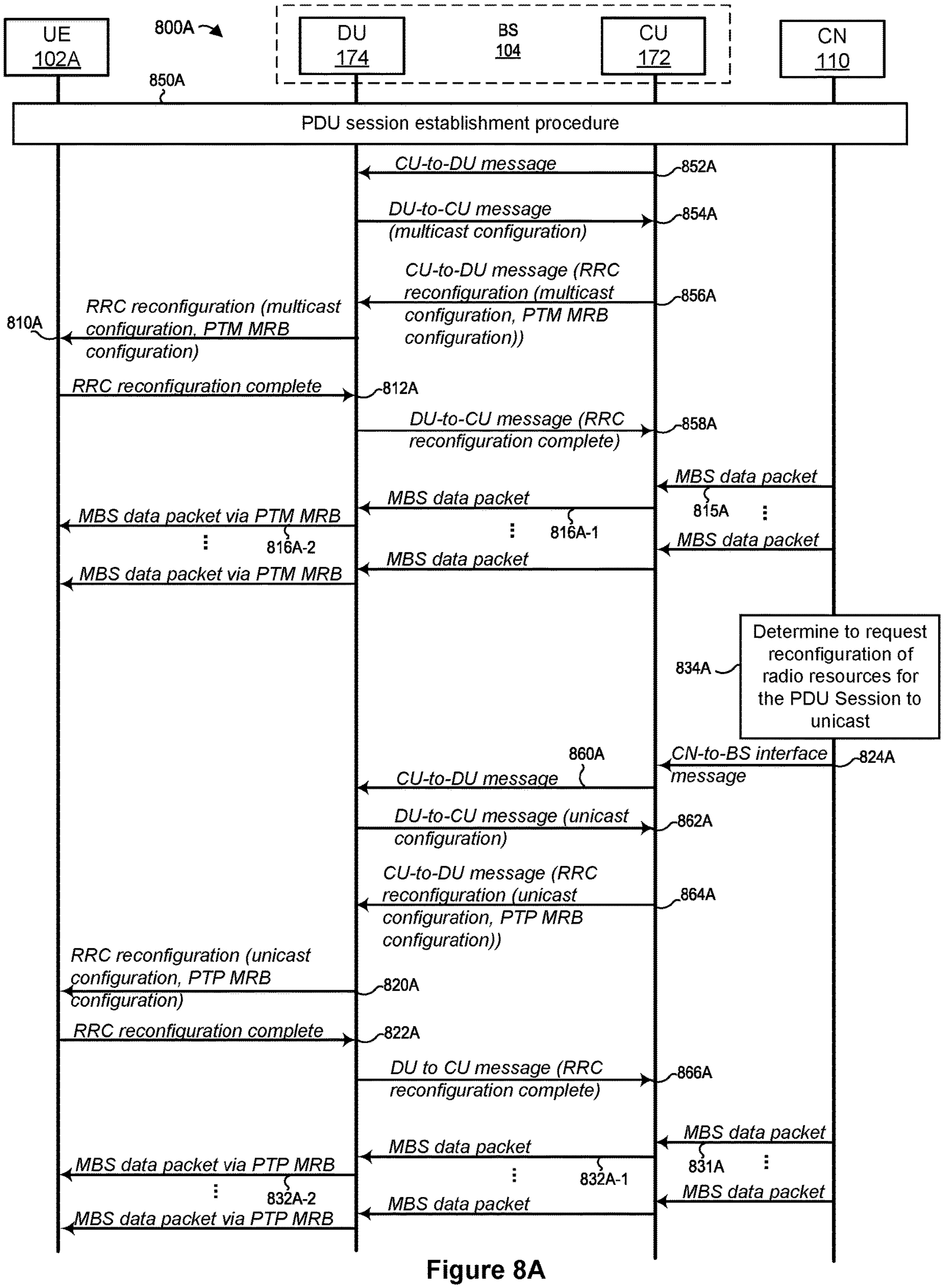
FIGS. 8A-8C are messaging diagrams of example implementations and scenarios similar to FIGS. 6A-6C, but in which the base station is a distributed base station.
Figure 8B:
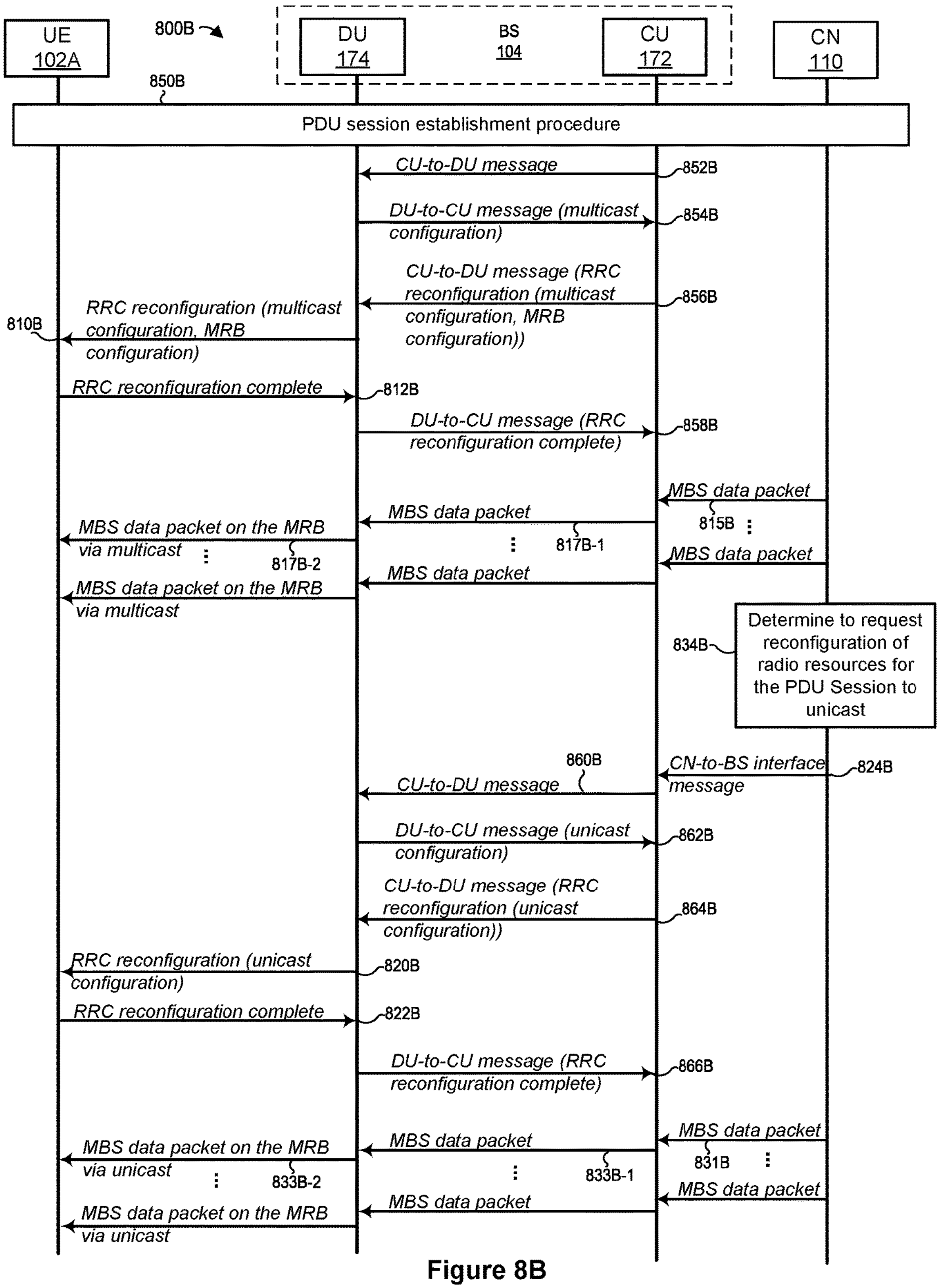
Figure 8C:
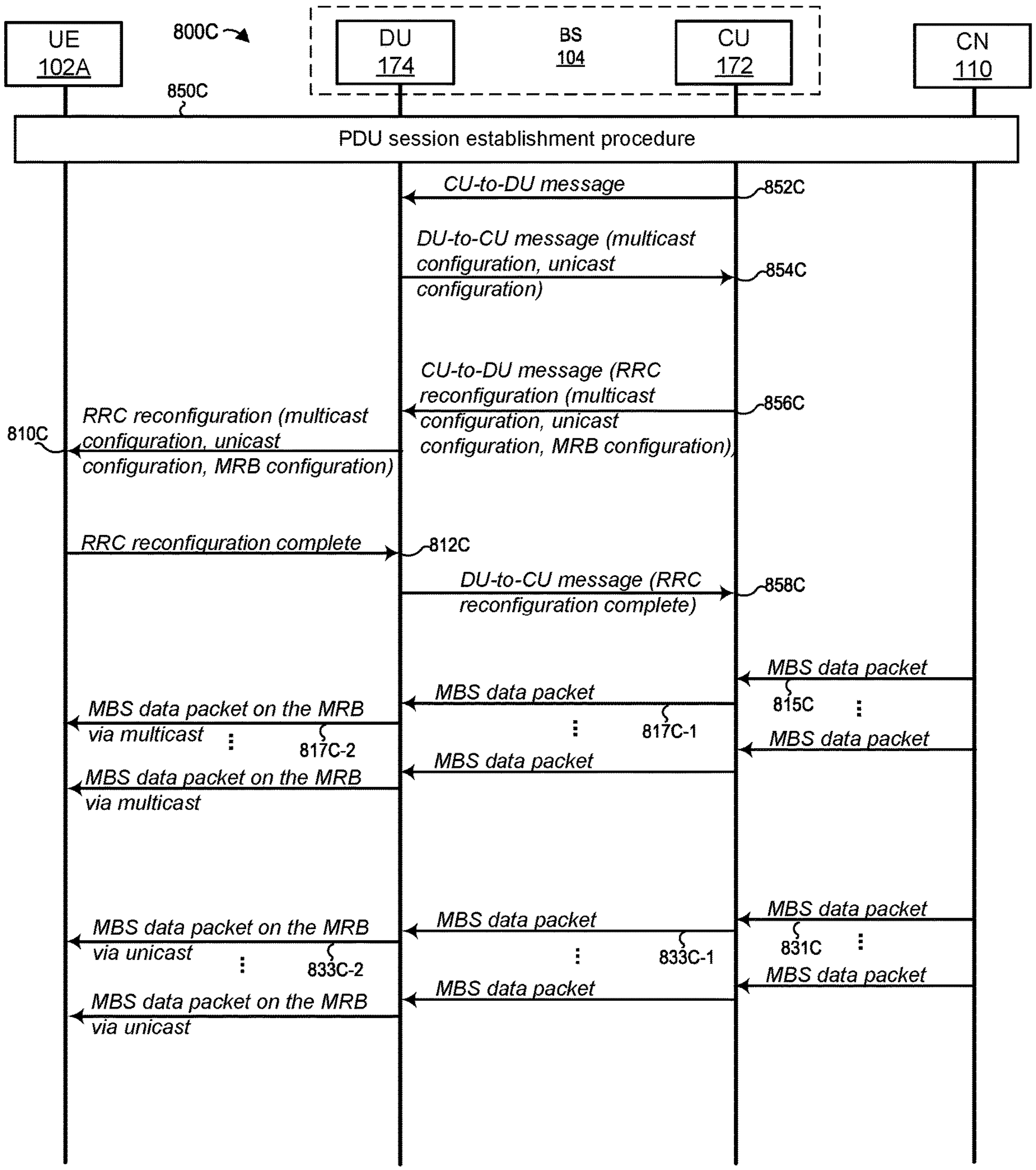

In particular, FIGS. 5A-5C are messaging diagrams of example implementations and scenarios in which a UE requests different MBSs associated with multicast and unicast transmissions (respectively), FIGS. 6A-6C are messaging diagrams of example implementations and scenarios in which a UE requests an MBS that is initially associated with multicast transmission, but changes to unicast transmission, FIGS. 7A and 7B are messaging diagrams of example implementations and scenarios that are similar to FIGS. 5A and 5B, but in which the base station is a distributed base station, and FIGS. 8A-8C are messaging diagrams of example implementations and scenarios that are similar to FIGS. 6A-6C, but in which the base station is a distributed base station.

Referring first to the scenario 500A shown in FIG. 5A, the UE 102A initially transmits 502A to the base station (BS) 104 a first PDU Session Establishment Request message for establishing a first PDU session for a first MBS. To indicate that the UE 102A is requesting an MRB for receiving MBS information, the UE 102A in some implementations includes a flag or other indication in the first PDU Session Establishment Request message. For example, the flag may be a data network name (DNN) field that is set to "MBS" or corresponds to an MBS service. In another example, the flag or indication may be an MBS flag. The CN 110 can include an indication in the first PDU Session Establishment Accept message to grant the UE 102A the ability to receive MBS for the first PDU session. If the CN 110 determines that the UE 102A is not a valid UE to receive MBS (e.g., the UE 102A does not subscribe to MBS), the CN 110 can exclude the indication in the first PDU Session Establishment Accept message. Thus, the UE 102A does not receive MBS for the first PDU session. However, the UE 102 may receive non-MBS services for the first PDU session. In this case, a DNN may be common for unicast services and MBS. For example, the UE 102 may set the same DNN (i.e., set to a name other than "MBS") for the first PDU session in the first PDU Session Establishment Request message and in a third PDU Session Establishment Request message for a third PDU session for non-MBS service(s) (as discussed below). The UE 102 does not include the flag or indication in the third PDU Session Establishment Request message.

In still other implementations, the first PDU Session Establishment Request message is an MBS-specific variant of a PDU Session Establishment Request message. In some implementations, before event 502A, the UE 102A initially operates in an idle state or an inactive state (e.g., an RRC_IDLE or RRC_INACTIVE state), or more generally in a state in which there is no active radio connection between the UE 102A and the base station 104. Alternatively, the UE 102A initially operates in an RRC_CONNECTED state, or more generally in a state in which there is an active radio connection between the UE 102A and the base station 104.

The base station 104 in turn sends 504A the first PDU Session Establishment Request message to the CN 110 (e.g., AMF 164 and/or SMF 166). In some implementations, the base station 104 sends 504A to the CN 110 a BS-to-CN interface message (e.g., an NG interface message, an INITIAL UE MESSAGE, or an UPLINK NAS TRANSPORT message) that includes the first PDU Session Establishment Request message.

In response to the first PDU Session Establishment Request message, the CN 110 sends 506A a first PDU Session Establishment Accept message to the base station 104, which in turn sends 508A the first PDU Session Establishment Accept message to the UE 102A. In some implementations, the CN 110 sends 506A to the base station 104 a first CN-to-BS interface message (e.g., an NG interface message or a PDU SESSION RESOURCE SETUP REQUEST message) that includes the first PDU Session Establishment Accept message.

Collectively, events 502A, 504A, 506A, and 508A form a first PDU session establishment procedure 550A.

During or after the first PDU session establishment procedure 550A, the base station 104 generates a first RRC reconfiguration message including multicast configuration parameters, and also including a PTM MRB configuration for a PTM MRB associated with the first PDU session. The base station 104 can generate the first RRC reconfiguration message after (e.g., in response to) receiving the first CN-to-BS interface message at event 506A or an additional interface message from the CN 110 (e.g., an NG interface message or a PDU SESSION RESOURCE MODIFY REQUEST message). The base station 104 then transmits 510A the first RRC reconfiguration message to the UE 102A. In some implementations, the base station 104 can include the first PDU Session Establishment Accept message in the first RRC reconfiguration message that the base station 104 transmits at event 510A. In other implementations, the base station 104 transmits a downlink (DL) RRC message that includes the first PDU Session Establishment Accept message to the UE 102A at event 508A. The DL RRC message can be a DLInformationTransfer message, an RRC reconfiguration message, or any suitable RRC message that can include a NAS PDU.

In some implementations, the base station 104 includes an MRB identity in the PTM MRB configuration in order to indicate the PTM MRB. Moreover, the base station 104 may include an identity of the first PDU session in the PTM MRB configuration. Thus, the UE 102A can determine that the PTM MRB is associated with the first PDU session based on the MRB and PDU session identities in the PTM MRB configuration.

In response to the first RRC reconfiguration message that the base station 104 transmits at event 510A, the UE 102A sends 512A the base station 104 a first RRC reconfiguration complete message. In some implementations, after sending 510A the first RRC reconfiguration message or receiving 512A the first RRC reconfiguration complete message, the base station 104 sends the CN 110 a first interface message (e.g., a PDU SESSION RESOURCE SETUP RESPONSE message or a PDU SESSION RESOURCE MODIFY RESPONSE message) to confirm that the base station 104 has configured radio resources for the UE 102A for the first PDU session (or an associated quality of service (QoS) flow, as described below).

In some implementations, the CN 110 can determine that the UE 102A has been configured with radio resources for the first PDU session based on a BS-to-CN interface message (not shown in FIG. 5A) received from the base station 104. At some time thereafter, the CN 110 may send 515A MBS data packets of the first MBS to the base station 104, which in turn sends 516A the MBS data packets of the first MBS to the UE 102A via the PTM MRB and multicast radio resources. The UE 102A receives 516A the MBS data packets of the first MBS using the PTM MRB configuration and multicast configuration that the UE 102A received at event 510A. In cases involving a group of UEs (e.g., the UE 102A, 102B, and/or one or more other UEs), the CN 110 may in some implementations send 515A MBS data packets of the particular MBS service (i.e., the first MBS) to the base station 104 irrespective of whether the UE 102A has been configured with radio resources for the first PDU session. In these implementations, after receiving 515A the MBS data packets from the CN 110, the base station 104 transmits (i.e., multicasts) 516A the MBS data packets to the group of UEs via the PTM MRB on multicast radio resources in accordance with the multicast configuration.

In some implementations and/or scenarios, the CN 110 and/or base station 104 transmits (515A and/or 516A) to the base station 104 and/or the UE 102A the MBS data packets on a first QoS flow. That is, the CN 110 associates the MBS data packets with a first QoS profile of the first QoS flow, where the first QoS profile includes a first plurality of QoS parameters. The CN 110 and the base station 104 can enforce the first QoS profile on transmissions of the MBS data packets at events 515A and 516A, respectively. In some implementations, the CN 110 can indicate the first QoS profile in the first CN-to-BS interface message (at event 506A) or an additional CN-to-BS interface message. The base station 104 may then determine to configure the PTM MRB configuration and multicast configuration based on the first QoS profile. In other implementations, the CN 110 can include the first PDU session identity in the first CN-to-BS interface message (at event 506A) or an additional CN-to-BS interface message, and the base station 104 may determine the PTM MRB configuration and multicast configuration based on the first PDU session identity. In still other implementations, the CN 110 can include a first QoS flow identity of the first QoS flow in the first CN-to-BS interface message (at event 506A) or an additional CN-to-BS interface message, and the base station 104 may determine the PTM MRB configuration and multicast configuration based on the first QoS flow identity.

In some implementations where the base station 104 and UE 102A use the protocol architectures of FIGS. 3A and 4A, the PTM MRB configuration sent by the base station 104 at event 510A includes PDCP configuration parameters. The base station 104 can configure a first NR PDCP entity (e.g., the NR PDCP entity 310 in FIG. 3A) in accordance with the PDCP configuration parameters, and the UE 102A can configure a second NR PDCP entity (e.g., the NR PDCP entity 410 in FIG. 4A) in accordance with the PDCP configuration parameters. The base station 104 (e.g., the first NR PDCP entity) transmits 516A PDCP PDUs including the MBS data packets in accordance with the PDCP configuration parameters, and the UE 102A (e.g., the second NR PDCP entity) receives 516A the PDCP PDUs in accordance with the PDCP configuration parameters.

In some of these implementations, the PTM MRB configuration does not include SDAP configuration parameters. In other implementations, however, the PTM MRB configuration additionally includes SDAP configuration parameters. In these implementations, the base station 104 can configure a first SDAP entity (e.g., the SDAP entity 312 in FIG. 3A) in accordance with the SDAP configuration parameters, and the UE 102A can configure a second SDAP entity (e.g., the SDAP entity 412 in FIG. 4A) in accordance with the SDAP configuration parameters. If the base station 104 configures the SDAP header in the SDAP configuration parameters, the base station 104 (e.g., the first SDAP entity) generates SDAP PDUs including the MBS data packets in accordance with the SDAP configuration parameters. Then the base station 104 (e.g., the first NR PDCP entity) generates PDCP PDUs including the SDAP PDUs, and transmits 516A the PDCP PDUs to the UE 102A in accordance with the PDCP configuration parameters. The UE 102A (e.g., the second NR PDCP entity) receives 516A the PDCP PDUs and processes the PDCP PDUs to obtain the SDAP PDUs, in accordance with the PDCP configuration parameters. The UE 102A (e.g., the second SDAP entity) then processes the SDAP PDUs to obtain the MBS data packets in accordance with the SDAP configuration parameters.

In some implementations, the multicast configuration includes PHY configuration parameters, MAC configuration parameters, and/or RLC configuration parameters. The base station 104 can configure a first NR MAC entity (e.g., the NR MAC entity 304 or 324 in FIG. 3A) in accordance with the MAC configuration parameters, and configure a first NR RLC entity (e.g., the NR RLC entity 306 in FIG. 3A) in accordance with the RLC configuration parameters. Similarly, the UE 102A can configure a second NR MAC entity (e.g., the NR MAC entity 404 or 424 in FIG. 4A) in accordance with the MAC configuration parameters, and configure a second NR RLC entity (e.g., the NR RLC entity 406 if FIG. 4A) in accordance with the RLC configuration parameters. Thus, the base station 104 (e.g., the first NR RLC entity) transmits 516A RLC PDUs including the PDCP PDUs to the UE 102A in accordance with the RLC configuration parameters, and the UE 102A (e.g., the second NR RLC entity) receives 516A the RLC PDUs including the PDCP PDUs, and processes the RLC PDUs to obtain the PDCP PDUs, in accordance with the RLC configuration parameters. Similarly, the base station 104 (e.g., the first NR MAC entity) transmits 516A MAC PDUs including the RLC PDUs to the UE 102A in accordance with the MAC configuration parameters, and the UE 102A (e.g., the second NR MAC entity) receives 516A the MAC PDUs including the RLC PDUs, and processes the MAC PDUs to obtain the RLC PDUs, in accordance with the MAC configuration parameters. In some implementations, the base station 104 can include the PTM MRB identity in the RLC configuration parameters, and the UE 102A can associate the second NR PDCP entity with the second NR RLC entity in accordance with the PTM MRB identity.

In some implementations, the base station 104 can transmit a separate RRC reconfiguration message, with each message including both the PTM MRB configuration and the multicast configuration, to each of a group of UEs (e.g., the UE 102A, UE 102B, and/or one or more other UEs not shown in FIGS. 1A and 5A), at event 510A. In other implementations, the base station 104 can broadcast at least one RRC message including the PTM MRB configuration and multicast configuration at event 510A. Thus, some of a group of UEs in an idle or inactive state can receive the RRC reconfiguration message(s) to obtain the PTM MRB configuration and multicast configuration. After receiving the PTM MRB configuration and multicast configuration, each UE in the group of UEs receives (i.e., event 516A or a corresponding event for a different UE) the MBS data packets on the same multicast radio resources from the base station 104, using the PTM MRB configuration and multicast configuration. In some implementations, the RRC message(s) can be one or more system information blocks (SIB s) or one or more MBS-specific RRC messages.

In some implementations, the multicast configuration for the UE 102A to receive MBS data packets on multicast radio resources may include a radio network temporary identifier (RNTI). A group of the UEs or the UE 102A can use the RNTI to receive, on a physical downlink control channel (PDCCH), a downlink control information (DCI) with a cyclic redundancy check (CRC) scrambled with the RNTI and is assigned a physical downlink shared channel (PDSCH) in accordance with the DCI. The PDSCH can carry a partial MBS data packet and/or one or more full MBS data packet. In some implementations, the RNTI can be a group RNTI (G-RNTI) or an MBS-specific RNTI (MBS-RNTI). In some implementations, the configuration parameters, e.g., for the UE 102A to receive MBS data packets on the common radio resources, may include a DL BWP configuration that configures an MBS DL BWP.

Before or after the first PDU session establishment procedure 550A, the UE 102A and CN 110 (via the base station 104) can perform a second PDU session establishment procedure 518A for a second MBS, similar to the first PDU session establishment procedure 550A. During or after the second PDU session establishment procedure 518A, the base station 104 can transmit 520A to the UE 102A a second RRC reconfiguration message including a unicast configuration and a PTP MRB configuration configuring a PTP MRB for the UE 102A. In response to the second RRC reconfiguration message received at event 520A, the UE 102A can transmit 522A a second RRC reconfiguration complete message to the base station 104.

In some implementations, after event 520A and possibly also after event 522A, the base station 104 sends a second BS-to-CN interface message (e.g., a PDU SESSION RESOURCE SETUP RESPONSE message or a PDU SESSION RESOURCE MODIFY RESPONSE message) to the CN 110 to confirm that the base station 104 has configured radio resources for the UE 102A for the second PDU session. After receiving the second BS-to-CN interface message, the CN 110 sends 531A MBS data packets of the second MBS to the base station 104, which in turn sends 532A the MBS data packets of the second MBS to the UE 102A via the PTP MRB and unicast radio resources (i.e., radio resources dedicated to the UE 102A alone) in accordance with the PTP MRB configuration and unicast configuration. The UE 102A receives 532A the MBS data packets of the second MBS via the PTP MRB on the unicast radio resources using the PTP MRB configuration and unicast configuration.

In some implementations where the base station 104 and UE 102A use the protocol architectures of FIGS. 3A and 4A, the PTP MRB configuration sent by the base station 104 at event 520A includes PDCP configuration parameters. The base station 104 can configure a third PDCP entity (e.g., the NR PDCP entity 320 in FIG. 3A) in accordance with the PDCP configuration parameters, and the UE 102A can configure a fourth PDCP entity (e.g., the NR PDCP entity 420 in FIG. 4A) in accordance with the PDCP configuration parameters. The base station 104 (e.g., the third NR PDCP entity) transmits 532A PDCP PDUs including the MBS data packets in accordance with the PDCP configuration parameters, and the UE 102A (e.g., the fourth NR PDCP entity) receives 532A the PDCP PDUs in accordance with the PDCP configuration parameters.

In some of these implementations, the PTP MRB configuration does not include SDAP configuration parameters. In other implementations, however, the PTP MRB configuration additionally includes SDAP configuration parameters. In these implementations, the base station 104 can configure a third SDAP entity (e.g., the SDAP entity 322 in FIG. 3A) in accordance with the SDAP configuration parameters, and the UE 102A can configure a fourth PDCP entity (e.g., the SDAP entity 422 in FIG. 4A) in accordance with the SDAP configuration parameters. If the base station 104 configures the SDAP header in the SDAP configuration parameters, the base station 104 (e.g., the third SDAP entity) generates SDAP PDUs including the MBS data packets in accordance with the SDAP configuration parameters. Then the base station 104 (e.g., the third NR PDCP entity) generates PDCP PDUs including the SDAP PDUs and transmits 532A the PDCP PDUs to the UE 102A in accordance with the PDCP configuration parameters. The UE 102A (e.g., the fourth NR PDCP entity) receives 532A the PDCP PDUs and processes the PDCP PDUs to obtain the SDAP PDUs, in accordance with the PDCP configuration parameters. The UE 102A (e.g., the fourth SDAP entity) then processes the SDAP PDUs to obtain the MBS data packets in accordance with the SDAP configuration parameters.

In some implementations, the unicast configuration includes PHY configuration parameters, MAC configuration parameters, and/or RLC configuration parameters. The base station 104 can configure a first NR MAC entity (e.g., the NR MAC entity 314 or 324 in FIG. 3A) in accordance with the MAC configuration parameters, and configure a first NR RLC entity (e.g., the NR RLC entity 316) in accordance with the RLC configuration parameters. Similarly, the UE 102A can configure a second NR MAC entity (e.g., the NR MAC entity 414 or 424) in accordance with the MAC configuration parameters, and configure a second NR RLC entity (e.g., the NR RLC entity 416 in FIG. 4A) in accordance with the RLC configuration parameters. Thus, the base station 104 (e.g., the first NR RLC entity) transmits 532A RLC PDUs including the PDCP PDUs to the UE 102A in accordance with the RLC configuration parameters, and the UE 102A (e.g., the second NR RLC entity) receives 532A the RLC PDUs including the PDCP PDUs, and processes the RLC PDUs to obtain the PDCP PDUs, in accordance with the RLC configuration parameters. Similarly, the base station 104 (e.g., the first NR MAC entity) transmits 532A MAC PDUs including the RLC PDUs to the UE 102A in accordance with the MAC configuration parameters, and the UE 102A (e.g., the second NR MAC entity) receives 532A the MAC PDUs including the RLC PDUs, and processes the MAC PDUs to obtain the RLC PDUs, in accordance with the MAC configuration parameters. In some implementations, the base station 104 can include the PTP MRB identity in the RLC configuration parameters, and the UE 102A can associate the second NR PDCP entity with the second NR RLC entity in accordance with the PTP MRB identity.

In some implementations and/or scenarios, the CN 110 and/or base station 104 transmit (531A and/or 532A) to the base station 104 and/or the UE 102A the MBS data packets on a second QoS flow. That is, the CN 110 associates the MBS data packets with a second QoS profile of the second QoS flow, where the second QoS profile includes a second plurality of QoS parameters. The CN 110 and the base station 104 enforce the second QoS profile on transmissions of the MBS data packets at events 531A and 532A, respectively. In some implementations, the CN 110 can indicate the second QoS profile in a second CN-to-BS interface message (e.g., NG interface message or PDU SESSION RESOURCE SETUP REQUEST message) during the second PDU session establishment procedure 518A, similar to indicating the first QoS profile in the first CN-to-BS interface message at event 506A of the first PDU session establishment procedure 550A. In other implementations, the CN 110 can indicate the second QoS profile in an additional CN-to-BS interface message (e.g., a PDU SESSION RESOURCE MODIFY REQUEST message) that the CN 110 sends to the base station 104 after the second PDU session establishment procedure 518A. In either case, the base station 104 may then determine to configure the PTP MRB configuration and unicast configuration parameters based on the second QoS profile. In other implementations, the CN 110 can include the second PDU session identity in the second CN-to-BS interface message, or in another CN-to-BS interface message, and the base station 104 may determine the PTP MRB configuration and unicast configuration based on the second PDU session identity. In still other implementations, the CN 110 can include a second QoS flow identity of the second QoS flow in the second CN-to-BS interface message (or other CN-to-BS interface message), and the base station 104 may determine the PTP MRB configuration and unicast configuration based on the second QoS flow identity.

In some implementations, the first RRC reconfiguration message that the base station 104 transmits 510A to the UE 102A can include one or more MBS-specific information elements (IE(s)) indicating the parameters of the multicast configuration. In some implementations, the base station 104 configures the UE 102A to use an RLC unacknowledged mode (UM) for the PTM MRB in the RLC configuration parameters of the multicast configuration. In other implementations, the second RRC reconfiguration message that the base station 104 transmits 520A to the UE 102A can include a CellGroupConfigIE indicating the parameters of the unicast configuration. In some implementations, the base station 104 configures the UE 102A to use an RLC acknowledged mode (AM) for the PTP MRB in the RLC configuration parameters of the unicast configuration.

Before, during, or after the PDU session establishment procedures 550A and/or 518A, the UE 102A in some implementations and scenarios can perform a third PDU session establishment procedure with the base station 104 and the CN 110 (e.g., AMF 164 and/or SMF 166 or another AMF and/or SMF), which may be similar to the first PDU session establishment procedure 550A. In the third PDU session establishment procedure, the UE 102A transmits to the CN 110, via the base station 104, a third PDU Session Establishment Request message for establishing a third PDU session for one or more non-MBS (unicast) services. In response, the CN 110 sends a third PDU Session Establishment Accept message to the UE 102A via the base station 104. For example, the one or more unicast services may be a voice call, a video call, or an Internet service (e.g., a service for email, navigation, social media, streaming, gaming, web browsing, etc.). To indicate that the UE 102A is requesting a unicast service, the UE 102A in some implementations may include a flag or other indication in the third PDU Session Establishment Request message. For example, the flag or indication may be a data network name (DNN) field set to “internet” or “ims” or corresponding to a unicast service. In other implementations, the third PDU Session Establishment Request message is a unicast-specific PDU Session Establishment Request message. In still other implementations, the UE 102A indicates that a non-MBS unicast service is requested by excluding the MBS flag from the third PDU Session Establishment Request message.

In some implementations, the CN 110 can indicate a third QoS profile in a third CN-to-BS interface message (e.g., an NG interface message or a PDU SESSION RESOURCE SETUP REQUEST message) during the third PDU session establishment procedure, similar to indicating the first QoS profile in the first CN-to-BS interface message or the second QoS profile. The base station 104 may determine a DRB configuration and a second unicast configuration for exchanging data packets of the unicast service(s) on a DRB between the UE 102A and base station 104 based on the third QoS profile. In other implementations, the CN 110 can include the third PDU Session identity in the third CN-to-BS interface message, the base station 104 may determine to configure the DRB configuration and second unicast configuration parameters based on the third PDU Session identity. In yet other implementations, the CN 110 can include a third QoS flow identity of the third QoS flow in the third CN-to-BS interface message, the base station 104 may determine the DRB MRB configuration and second unicast configuration based on the third QoS flow identity.

During or after the third PDU session establishment procedure, the base station 104 may transmit a third RRC reconfiguration message that includes the DRB configuration for the DRB and the second unicast configuration. In response, the UE 102A may transmit a third RRC reconfiguration complete message to the base station 104. In some implementations, after receiving the third RRC reconfiguration complete message, the base station 104 sends a third BS-to-CN interface message (e.g., a PDU SESSION RESOURCE SETUP RESPONSE message) to the CN 110 to confirm that the base station 104 has configured radio resources for the UE 102A for the third PDU session. After receiving the third BS-to-CN interface message, the CN 110 sends data packets of the unicast service(s) to the base station 104, which in turn transmits the data packets of the unicast service(s) to the UE 102A via the DRB and the second unicast radio resources (i.e., radio resources dedicated to the UE 102A alone) in accordance with the DRB configuration and the second unicast configuration.

In some implementations, the second unicast configuration includes PHY configuration parameters, MAC configuration parameters, and/or RLC configuration parameters configuring unicast radio resources. In accordance with the second unicast configuration, the base station 104 can assign unicast radio resources for data packets of the unicast service(s) to a particular UE (e.g., the UE 102A). That is, the unicast radio resources can be dedicated only to one particular UE. The base station 104 transmits data packets of the unicast service(s) on dedicated resources and the DRB to the particular UE, and the particular UE transmits data packets of the unicast service(s) on dedicated resources and the DRB to the base station 104.

In some implementations, the third RRC reconfiguration message can include a CellGroupConfigIE indicating the configuration parameters. The base station 104 can indicate that the DRB is associated with the third PDU session in the third RRC reconfiguration message. For example, the DRB configuration can include a PDU session identity of the third PDU session. In some implementations, the base station 104 configures the UE 102A to use an RLC AM or UM for the DRB in the RLC configuration parameters of the unicast configuration.

In some implementations, the UE 102A and CN 110 can perform a first PDU session release procedure via the base station 104, to release the first PDU session after the second PDU session establishment procedure 518A. In the first PDU session release procedure, the CN 110 sends a first PDU Session Release Command message to the UE 102A via the base station 104 to release the first PDU session. In response, the UE 102A sends a first PDU Session Release Complete message to the CN 110 via the base station 104. In one implementation, the UE 102A sends a first PDU Session Release Request message to the CN 110 via the base station 104 after (e.g., in response to) the second PDU establishment procedure 518A, to initiate the first PDU session release procedure. In response, the CN 110 sends the first PDU Session Release Command message to the UE 102A via the base station 104 to release the first PDU session. In an alternative implementation, the UE 102A does not send a PDU Session Release Request message to the CN 110 via the base station 104 to initiate the first PDU session release procedure. In this latter implementation, the CN 110 initiates the first PDU session release procedure after (e.g., in response to) performing the second PDU session establishment procedure 518A. In response to a fourth CN-to-BS interface message (e.g., a PDU Session Resource Release Command message) in the first PDU session release procedure, the base station 104 can send a fourth RRC reconfiguration message to the UE 102A to release the PTM MRB configuration and multicast configuration. The UE 102A releases the PTM MRB configuration and multicast configuration in response to the fourth RRC reconfiguration message. After releasing the PTM MRB configuration and multicast configuration, the UE 102A no longer receives MBS data packets of the first MBS.

In other implementations, the UE 102A and CN 110 do not perform a PDU session release procedure to release the first PDU session after the second PDU session establishment procedure 518A. In one of these implementations, the UE 102A may decide to stop receiving MBS data packets via the PTM MRB to save battery power. In another of these implementations, the UE 102A may continue receiving MBS data packets via the PTM MRB and multicast radio resources while receiving MBS data packets via the PTP MRB and unicast radio resources. In some implementations and scenarios, the UE 102A may receive MBS data packets via the PTM MRB and PTP MRB in parallel because the UE 102A operates as a hotspot device. For example, the UE 102A may present information associated with a first MBS to a user via a physical display device (and/or a speaker, etc.) of the UE 102A, and forward data packets of a second MBS to another device. In another example, the UE 102A may forward data packets of a first MBS to a first device and forward MBS data packets of a second MBS to a second device. In still another example, the UE 102A may present information associated with a first MBS in a first display area, and present information associated with a second MBS on a second display area. In this latter example, the UE 102A may have two physical display devices (e.g., screens) corresponding to the two display areas. Alternatively, the UE 102A may present both display areas on a single physical display device.

In some implementations, the UE 102A and CN 110 can perform a second PDU session release procedure via the base station 104 to release the second PDU session. In some scenarios and/or implementations, the UE 102A and CN 110 can perform the second PDU session release procedure in response to switching from receiving the second MBS to receiving the first MBS. In the second PDU session release procedure, the CN 110 sends a second PDU Session Release Command message to the UE 102A via the base station 104 to release the second PDU session. In response, the UE 102A sends a second PDU Session Release Complete message to the CN 110 via the base station 104. In one implementation, the UE 102A sends a second PDU Session Release Request message to the CN 110 via the base station 104 to initiate the second PDU session release procedure. In response, the CN 110 sends the second PDU Session Release Command message to the UE 102A via the base station 104 to release the second PDU session. In an alternative implementation, the UE 102A does not send a PDU Session Release Request message to the CN 110 via the base station 104 to initiate the second PDU session release procedure, and the CN 110 instead initiates the second PDU session release procedure. In response to a fourth CN-to-BS interface message (e.g., a PDU Session Resource Release Command message) in the second PDU session release procedure, the base station 104 can send a fourth RRC reconfiguration message to the UE 102A to release the PTP MRB configuration and unicast configuration. In response to the fourth RRC reconfiguration message, the UE 102A releases the PTP MRB configuration and unicast configuration, and transmits a fourth RRC reconfiguration complete message to the base station 104. After releasing the PTP MRB configuration and unicast configuration, the UE 102A no longer receives MBS data packets of the first MBS.

In other implementations, the UE 102A and CN 110 do not perform a PDU session release procedure to release the second PDU session. In one of these implementations, the UE 102A may decide to stop receiving MBS data packets via the PTP MRB to save battery power. In another of these implementations, the UE 102A may continue receiving MBS data packets via the PTP MRB and unicast radio resources while receiving MBS data packets via the PTM MRB and multicast radio resources, as described above.

In some implementations, the MBS data packets can be IP packets, TCP/IP packets, UDP/IP packets, Real-Time Transport Protocol (RTP)/UDP/IP packets or RTP/TCP/IP packets.

FIG. 5B illustrates a scenario 500B similar to the scenario 500A of FIG. 5A, but in which the UE 102A and CN 110 do not perform a PDU session establishment procedure to establish a PDU session for the second MBS. Initially, in the scenario 500B, the UE 102A and CN 110 perform a PDU session establishment procedure 550B to establish a PDU session for at least a first MBS via the base station 104. The procedure 550B may be similar to event 550A of FIG. 5A. During or after the PDU session establishment procedure 550B, the base station 104 sends 510B the UE 102A an RRC reconfiguration message that includes a PTM MRB configuration and a multicast configuration (e.g., similar to event 510A). The UE 102A responds by sending 512B the base station 104 an RRC reconfiguration complete message (e.g., similar to event 512B). Thereafter, the CN 110 sends 515B the base station 104 MBS data packets of the first MBS (e.g., similar to event 515A), which the UE 102A receives 516B from the base station 104 via multicast radio resources in accordance with the PTM MRB configuration and multicast configuration (e.g., similar to event 516A).

Later in time, and instead of requesting the establishment of a second PDU session (as in scenario 500A), the UE 102A generates an MBS request message to request a second MBS, and sends 521B the MBS request message to the base station 104. In the scenario 500B, the second MBS, like the first MBS, is supported by the initial PDU session. In response, the base station 104 sends 523B the MBS request message to the CN 110. In some implementations, the MBS request message can be a NAS message, a Session Initiation Protocol (SIP) message, or an HTTP message. In other implementations, the UE 102A transmits 521B and the base station 104 forwards/transmits 523B an IP packet, a TCP packet, or a UDP packet that includes the MBS request message. After (e.g., in response to) receiving 523B the MBS request message, the CN 110 sends 524B a CN-to-BS interface message (e.g., an NG interface message or a PDU SESSION RESOURCE MODIFY REQUEST message) to the base station 104. The CN-to-BS interface message may be similar to the additional CN-to-BS interface message described above for FIG. 5A.

After (e.g., in response to) receiving 524B the CN-to-BS interface message, the base station 104 transmits 520B an RRC reconfiguration message to the UE 102A. The RRC reconfiguration message includes a PTP MRB configuration and a unicast configuration. Event 520B may be similar to event 520A of FIG. 5A. In response, the UE 102A transmits 522B an RRC reconfiguration complete message to the base station 104 (e.g., similar to event 522A). After transmitting 520B the RRC reconfiguration message and/or after receiving the 522B the RRC reconfiguration complete message, the base station 104 sends 526B a BS-to-CN interface message to confirm that the base station 104 has configured radio resources for the UE 102A for the PDU session or the second MBS. After receiving 526B the BS-to-CN interface message, the CN 110 sends 531B MBS data packets of the second MBS to the base station 104, which in turn sends 532B the MBS data packets of the second MBS to the UE 102A via the PTP MRB and unicast radio resources in accordance with the PTP MRB configuration and unicast configuration. The UE 102A receives 532B the MBS data packets of the second MBS via the PTP MRB on the unicast radio resources using the PTP MRB configuration and unicast configuration.

FIG. 5C illustrates a scenario 500C similar to the scenario 500B of FIG. 5B. Whereas FIG. 5B illustrates a scenario 500B in which the first (earlier-requested) MBS is associated with PTM/multicast transmission and the second (later-requested) MBS is associated with PTP/unicast transmission, however, FIG. 5C illustrates a scenario 500C in which the first MBS is associated with PTP/unicast transmission and the second MBS is associated with PTM/multicast transmission. It is understood that, just as FIG. 5C shows the reverse order relative to FIG. 5B, the order of scenario 500A in FIG. 5A may also be reversed, such that the first (earlier-requested) MBS is associated with PTP/unicast transmission and the second (later-requested) MBS is associated with PTM/multicast transmission.

In the scenario 500C, the UE 102A and CN 110 initially perform a PDU session establishment procedure 550C to establish a PDU session for at least a first MBS via the base station 104. The procedure 550C may be similar to event 550A or 518A of FIG. 5A. During or after the PDU session establishment procedure 550C, the base station 104 sends 520C the UE 102A an RRC reconfiguration message that includes a PTP MRB configuration and a unicast configuration (e.g., similar to event 520A). The UE 102A responds by sending 522C the base station 104 an RRC reconfiguration complete message (e.g., similar to event 522A). Thereafter, the CN 510 sends 531C the base station 104 MBS data packets of the first MBS (e.g., similar to event 531A), which the UE 102A receives 532C from the base station 104 via unicast radio resources in accordance with the PTP MRB configuration and unicast configuration (e.g., similar to even 532A).

Later in time, the UE 102A generates an MBS request message to request a second MBS, and transmits 521C the MBS request message to the base station 104. In response, the base station 104 sends 523C the MBS request message to the CN 110. The MBS request message may be similar to the message sent at events 521B and 523B. After (e.g., in response to) receiving 523C the MBS request message, the CN 110 sends 524C a CN-to-BS interface message (e.g., an NG interface message or PDU SESSION RESOURCE MODIFY REQUEST message) to the base station 104. The interface message may be similar to the message sent at event 524C.

After (e.g., in response to) receiving 524C the CN-to-BS interface message, the base station 104 transmits 510C an RRC reconfiguration message to the UE 102A. The RRC reconfiguration message includes a PTM MRB configuration and a multicast configuration. Event 510C may be similar to event 510A of FIG. 5A. In response, the UE 102A transmits 512C an RRC reconfiguration complete message to the base station 104 (e.g., similar to event 512A). After transmitting 510C the RRC reconfiguration message and/or receiving 512C the RRC reconfiguration complete message, the base station 104 sends 526C a BS-to-CN interface message to confirm that the base station 104 has configured radio resources for the UE 102A for the PDU session or the second MBS (e.g., similar to event 526B). After receiving 526C the BS-to-CN interface message, the CN 110 sends 515C MBS data packets of the second MBS to the base station 104, which in turn sends 516C the MBS data packets of the second MBS to the UE 102A via the PTM MRB and multicast radio resources, in accordance with the PTM MRB configuration and multicast configuration. The UE 102A receives 532B the MBS data packets of the second MBS via the PTM MRB on the multicast radio resources using the PTM MRB configuration and multicast configuration.

As noted above, FIGS. 6A-6C are messaging diagrams of example implementations and scenarios in which the UE 102A requests an MBS that is initially associated with multicast transmission, but at some point changes (e.g., at the direction of the CN 110) to unicast transmission. It is understood that the order of multicast/unicast configuration and transmission in the scenarios shown in FIGS. 6A-6C may be reversed, such that the CN 110 and base station 104 initially provide MBS data packets via unicast transmission and then later provide MBS data packets via multicast transmission.

Referring first to FIG. 6A, in a scenario 600A, the UE 102A and CN 110 initially perform a PDU session establishment procedure 650A to establish a PDU session for an MBS via the base station 104. The procedure 650A may be similar to event 550A of FIG. 5A. During or after the PDU session establishment procedure 650A, the base station 104 generates a first RRC reconfiguration message including a multicast configuration and a PTM MRB configuration for a PTM MRB associated with the PDU session. The base station 104 then sends 610A the first RRC reconfiguration message to the UE 102A (e.g., similar to event 510A). The UE 102A responds by transmitting 612A an RRC reconfiguration complete message to the base station 104 (e.g., similar to event 512A). Thereafter, the CN 110 sends 615A the base station 104 MBS data packets (e.g., similar to event 515A), which the UE 102A receives 616A from the base station 104 via multicast radio resources in accordance with the PTM MRB configuration and multicast configuration (e.g., similar to event 516A).

Later in time, the CN 110 determines 634A to request that the base station 104 reconfigure radio resources for the PDU session from multicast to unicast. In some implementations, the CN 110 determines 634A to do so based on the number of existing PDU sessions (for different UEs) for the MBS. If the number of existing PDU sessions for the MBS is below a predetermined threshold number, the CN 110 in response sends 624A the base station 104 a CN-to-BS interface message requesting that the base station 104 reconfigure radio resources from multicast to unicast for the PDU session. If the number of existing PDU sessions for the MBS is not below the threshold number, the CN 110 in response does not request the base station 104 to reconfigure radio resources from multicast to unicast for the PDU session (i.e., event 624A is omitted). The CN-to-BS interface message may be an NG interface message or a PDU SESSION RESOURCE MODIFY REQUEST message, for example.

In some implementations, the CN 110 can include a PDU session identity of the PDU session in the CN-to-BS interface message of event 624A, and indicates or includes a QoS profile or QoS flow identity (e.g., similar to the second QoS profile or second QoS flow identity discussed in connection with FIG. 5A) to request the base station 104 to reconfigure radio resources from multicast to unicast for the PDU session. Thus, the base station 104 can determine a PTP MRB configuration and unicast configuration for the PDU session based on the QoS profile or QoS flow identity, and send 620A the UE 102A an RRC reconfiguration message including the PTP MRB configuration and unicast configuration (e.g., similar to event 520A). In other implementations, the base station 104 does not determine the PTP MRB configuration or unicast configuration for the PDU session based on QoS profile or QoS flow identity.

After receiving 620A the RRC reconfiguration message 620A, the UE 102A sends 622A the base station 104 an RRC reconfiguration complete message (e.g., similar to event 522A). At some point thereafter, the CN 110 sends 631A MBS data packets to the base station 104 (e.g., similar to event 531A), which in turn sends 632A the MBS data packets to the UE 102A via the PTP MRB and unicast radio resources in accordance with the PTP MRB configuration and unicast configuration (e.g., similar to event 532A). The UE 102A receives 632A the MBS data packets via the PTP MRB on the unicast radio resources using the PTP MRB configuration and unicast configuration.

In alternative implementations, the base station 104 can determine to reconfigure radio resources from multicast to unicast for the PDU session without receiving a CN-to-BS interface message requesting the reconfiguration (e.g., autonomously determine to reconfigure to unicast radio resources). In response to the determination, the base station 104 transmits 620A the RRC reconfiguration message to the UE 102A. In some of these implementations, the base station 104 determines to do so based on the number of existing PDU sessions (for different UEs) for the MBS. If the number of existing PDU sessions for the MBS is below a predetermined threshold number, the base station 104 determines to reconfigure radio resources from multicast to unicast for the PDU session. If the number of existing PDU sessions for the MBS is not below the threshold number, the base station 104 instead determines not to reconfigure radio resources from multicast to unicast for the PDU session (i.e., event 620A is omitted).

In some implementations, the base station 104 can indicate, in the RRC reconfiguration message of event 620A, that the UE 102A is to release the PTM MRB configuration and/or multicast configuration. In response to the RRC reconfiguration message or the indication therein, the UE 102A releases the PTM MRB configuration and/or multicast configuration. In some implementations, in response to the RRC reconfiguration message, the UE 102A releases the SDAP entity 412 (if existing), the NR PDCP entity 410, the NR RLC entity 406, and the NR MAC entity 404 (if existing). If the UE 102A uses the NR MAC entity 424 instead of the NR MAC entity 404, the UE 102A reconfigures the NR MAC entity 424 to release the multicast configuration parameters in response to the RRC reconfiguration message. Even if the base station 104 indicates that the UE 102A is to release the PTM MRB configuration and/or multicast configuration in the RRC reconfiguration message at event 620A, however, the base station 104 does not release the SDAP entity 312 (if existing), the NR PDCP entity 310, the NR RLC entity 306, and the NR MAC entity 304 (if existing), because those entities may still be used to multicast to other UEs (e.g., the UE 102B and/or one or more other UEs). In scenarios where the base station 104 indicates that the UE 102A is to release the multicast configuration in the RRC reconfiguration message at event 620A, and where the base station 104 uses the NR MAC entity 324 instead of the NR MAC entity 304, the base station 104 does not reconfigure the NR MAC entity 324 to release the multicast configuration. The base station 104 may, however, release the SDAP entity 312 (if existing), the NR PDCP entity 310, the NR RLC entity 306, and the NR MAC entity 304 (if existing), or reconfigure the NR MAC entity 324 to release the multicast configuration, if the number of PDU sessions for the MBS is zero, or if the base station 104 receives a request from the CN 110 to stop multicasting the MBS.

FIG. 6B illustrates a scenario 600B similar to the scenario 600A of FIG. 6A, but in which the base station 104 does not need to reconfigure the MRB when changing from multicast to unicast radio resources for the MBS. Initially, the UE 102A and CN 110 perform a PDU session establishment procedure 650B to establish a PDU session for an MBS via the base station 104. The procedure 650A may be similar to event 550A or 650A. During or after the PDU session establishment procedure 650B, the base station 104 generates a first RRC reconfiguration message including an MRB configuration and a multicast configuration, and sends 611B the RRC reconfiguration message to the UE 102A. The RRC reconfiguration message of event 611B may be similar to that of events 510A and 610A, but the MRB configuration is not specific to only PTM transmissions.

The UE 102A responds by sending 612B an RRC reconfiguration complete message to the base station 104 (e.g., similar to events 512A and 612A). Thereafter, the CN 110 sends 615B the base station 104 MBS data packets (e.g., similar to event 515A and 615A), which the UE 102A receives 617B from the base station 104 via multicast radio resources in accordance with the MRB configuration and multicast configuration (e.g., similar to events 516A and 616A, but without a PTM-specific MRB).

In some implementations where the base station 104 and UE 102A use the protocol architectures of FIGS. 3B and 4B, respectively, the MRB configuration includes PDCP configuration parameters. The base station 104 can configure a first NR PDCP entity (e.g., the NR PDCP entity 310 in FIG. 3B) in accordance with the PDCP configuration parameters, and the UE 102A can configure a second NR PDCP entity (e.g., the NR PDCP entity 410 in FIG. 4B) in accordance with the PDCP configuration parameters. The base station 104 (e.g., the first NR PDCP entity) then transmits 617B PDCP PDUs including the MBS data packets in accordance with the PDCP configuration parameters, and the UE 102A (e.g., the second NR PDCP entity 410) receives 617B the PDCP PDUs in accordance with the PDCP configuration parameters.

The MRB configuration may also include PDCP configuration parameters in other implementations where the base station 104 and UE 102A use the protocol architectures of any one of FIGS. 3C-3F and any corresponding one of 4C-4F, respectively. The base station 104 can configure a first NR PDCP entity (e.g., the NR PDCP entity 330 in any of FIGS. 3C-3F) in accordance with the PDCP configuration parameters, and the UE 102A can configure a second NR PDCP entity (e.g., the NR PDCP entity 430 in any of FIGS. 4C-4F) in accordance with the PDCP configuration parameters. The base station 104 (e.g., the first NR PDCP entity) then transmits 617B PDCP PDUs including the MBS data packets (without SDAP headers) in accordance with the PDCP configuration parameters, and the UE 102A (e.g., the second NR PDCP entity) receives 617B the PDCP PDUs in accordance with the PDCP configuration parameters.

In some implementations where the base station 104 and UE 102A use the protocol architectures of any one of FIGS. 3B-3F and any corresponding one of FIGS. 4B-4F, respectively, the MRB configuration can additionally include SDAP configuration parameters. The base station 104 can configure a first SDAP entity (e.g., the SDAP entity 332 in any of FIGS. 3B-3F) in accordance with the SDAP configuration parameters. The UE 102A can configure a second SDAP entity (e.g., the SDAP entity 432 in any of FIGS. 4B-4F) in accordance with the SDAP configuration parameters. Alternatively, the MRB configuration does not include SDAP configuration parameters. In this case, the UE 102A (e.g., the second NR PDCP entity) receives 617B the PDCP PDUs, and processes the PDCP PDUs to obtain the MBS data packets, in accordance with the PDCP configuration parameters. If the base station 104 configures the SDAP header in the SDAP configuration parameters, the base station 104 generates SDAP PDUs including the MBS data packets in accordance with the SDAP configuration parameters. Thereafter, the base station 104 (e.g., the first NR PDCP entity) generates PDCP PDUs including the SDAP PDUs, and transmits 617B the PDCP PDUs to the UE 102A in accordance with the PDCP configuration parameters. The UE 102A (e.g., the second NR PDCP entity) receives 617B the PDCP PDUs, and processes the PDCP PDUs to obtain the SDAP PDUs, in accordance with the PDCP configuration parameters. The UE 102A (e.g., the second SDAP entity) processes the SDAP PDUs to obtain the MBS data packets in accordance with the SDAP configuration parameters.

In some implementations, the multicast configuration includes PHY configuration parameters, MAC configuration parameters, and/or RLC configuration parameters. The base station 104 can configure a first NR MAC entity (e.g., the NR MAC entity 304 in any of FIGS. 3B-3D and the NR MAC entity 324 in FIG. 3E or 3F) in accordance with the MAC configuration parameters, and configure a first NR RLC entity (e.g., the NR RLC entity 306 in any of FIG. 3B, 3C, or 3E or the NR RLC entity 326 in FIG. 3D or 3F) in accordance with the RLC configuration parameters. Similarly, the UE 102A can configure a second NR MAC entity (e.g., the NR MAC entity 404 in any of FIGS. 4B-4D and the NR MAC entity 424 in FIG. 4E or 4F) in accordance with the MAC configuration parameters, and configure a second NR RLC entity (e.g., the NR RLC entity 406 in any of FIG. 4B, 4C, or 4E or the NR RLC entity 426 in FIG. 3D or 3F) in accordance with the RLC configuration parameters. Thus, the base station 104 (e.g., the first NR RLC entity) transmits 617B RLC PDUs including the PDCP PDUs to the UE 102A in accordance with the RLC configuration parameters, and the UE 102A (e.g., the second NR RLC entity) receives 617B the RLC PDUs including the PDCP PDUs, and processes the RLC PDUs to obtain the PDCP PDUs, in accordance with the RLC configuration parameters. Similarly, the base station 104 (e.g., the NR MAC entity 304 or 324) transmits 617B MAC PDUs including the RLC PDUs to the UE 102A in accordance with the MAC configuration parameters, and the UE 102A (e.g., the NR RLC entity 404) receives 617B the MAC PDUs including the RLC PDUs, and processes the MAC PDUs to obtain the RLC PDUs, in accordance with the MAC configuration parameters. In some implementations, the base station 104 can include an MRB identity of the MRB in the RLC configuration parameters, and the UE 102A can associate the second NR PDCP entity with the second NR RLC entity in accordance with the MRB identity.

In some implementations, the base station 104 can transmit a separate RRC reconfiguration message, with each message including both the MRB configuration and the multicast configuration, to each of a group of UEs (e.g., UE 102A, UE 102B, and/or one or more other UEs not shown in FIG. 1A and FIG. 6B), at event 611B. In other implementations, the base station 104 can broadcast at least one RRC message including the MRB configuration and multicast configuration at event 611B. Thus, some of a group of UEs in an idle or inactive state can receive the RRC reconfiguration message(s) to obtain the MRB configuration and multicast configuration. After receiving the MRB configuration and multicast configuration, each UE in the group of UEs receives (i.e., event 617B or a corresponding event for a different UE) the MBS data packets on the same multicast radio resources from the base station 104, using the MRB configuration and multicast configuration. In some implementations, the RRC message(s) can be SIB s or one or more MBS-specific RRC messages.

Later in time, the CN 110 determines 634B to request that the base station 104 reconfigure radio resources for the PDU session from multicast to unicast. In some implementations, the CN 110 determines 634B to do so based on the number of existing PDU sessions (for different UEs) for the MBS. If the number of existing PDU sessions for the MBS is below a predetermined threshold number, the CN 110 in response sends 624B the base station 104 a CN-to-BS interface message requesting that the base station 104 reconfigure radio resources from multicast to unicast for the PDU session. If the number of existing PDU sessions for the MBS is not below the threshold number, the CN 110 in response does not request the base station 104 to reconfigure radio resources from multicast to unicast for the PDU session (i.e., event 624B is omitted). The CN-to-BS interface message may be an NG interface message or a PDU SESSION RESOURCE MODIFY REQUEST message, for example.

In some implementations, the CN 110 can include a PDU session identity of the PDU session in the CN-to-BS interface message of event 624B, and indicates or includes a QoS profile or a QoS flow identity (e.g., similar to the second QoS profile or second QoS flow identity described in connection with FIG. 5A) to request the base station 104 to reconfigure radio resources from multicast to unicast for the PDU session. Thus, the base station 104 can determine a unicast configuration for the MRB based on the QoS profile or QoS flow identity, and send 621B the UE 102A an RRC reconfiguration message including the unicast configuration. In other implementations, the base station 104 does not determine the unicast configuration for the PDU session based on QoS profile or QoS flow identity.

After receiving 621B the RRC reconfiguration message, the UE 102A sends 622B the base station 104 an RRC reconfiguration complete message (e.g., similar to event 522A). At some point thereafter, the CN 110 sends 631B MBS data packets to the base station 104 (e.g., similar to event 531A), which in turn sends 633B the MBS data packets to the UE 102A via the MRB and unicast radio resources in accordance with the MRB configuration (of event 611B) and unicast configuration (of event 621B). The UE 102A receives 633B the MBS data packets via the MRB on the unicast radio resources using the MRB configuration and unicast configuration.

In alternative implementations, the base station 104 can determine to reconfigure radio resources from multicast to unicast for the MRB without receiving a CN-to-BS interface message requesting the reconfiguration (e.g., autonomously determine to reconfigure to unicast radio resources). In response to the determination, the base station 104 transmits 621B the RRC reconfiguration message to the UE 102A. In some of these implementations, the base station 104 determines to do so based on the number of existing PDU sessions (for different UEs) for the MBS. If the number of existing PDU sessions for MBS the is below a predetermined threshold number, the base station 104 determines to reconfigure radio resources from multicast to unicast for the MRB. If the number of existing PDU sessions for MBS the is not below the threshold number, the base station 104 determines not to reconfigure radio resources from multicast to unicast for the MRB.

The base station 104 may or may not include an MRB configuration in the RRC reconfiguration message at event 621B. In some implementations where the base station 104 and UE 102A use the protocol architectures of any one of FIGS. 3C-3F and any corresponding one of FIGS. 4C-4F, respectively, the base station 104 does not include an MRB configuration in the RRC reconfiguration message at event 621B, and the UE 102A and base station 104 do not use SDAP to communicate MBS data packets at event 633B. In such implementations, the base station 104 (e.g., the first NR PDCP entity) transmits 633B PDCP PDUs including the MBS data packets (without SDAP headers) in accordance with the PDCP configuration parameters, and the UE 102A (e.g., the second NR PDCP entity) receives 633B the PDCP PDUs, and processes the PDCP PDUs to obtain the MBS data packets, in accordance with the PDCP configuration parameters.

In other of these implementations where the base station 104 does not include an MRB configuration in the RRC reconfiguration message at event 621B, but where the UE 102A and base station 104 use SDAP to communicate MBS data packets at event 617B, the base station 104 generates SDAP PDUs including the MBS data packets in accordance with the SDAP configuration parameters. The base station 104 (e.g., the first NR PDCP entity) then generates PDCP PDUs including the SDAP PDUs and transmits 633B the PDCP PDUs to the UE 102A in accordance with the PDCP configuration parameters. The UE 102A (e.g., the second NR PDCP entity) receives 633B the PDCP PDUs, and processes the PDCP PDUs to obtain the SDAP PDUs, in accordance with the PDCP configuration parameters. The UE 102A (e.g., the second SDAP entity) processes the SDAP PDUs to obtain the MBS data packets in accordance with the SDAP configuration parameters.

In some implementations, the base station 104 can continue PDCP sequence numbering to subsequently assign PDCP sequence numbers for the PDCP PDUs (or the SDAP PDUs or MBS data packets) that the base station 104 transmits at event 633B. For example, the base station 104 may assign PDCP sequence number N for the last PDCP PDU, and include the PDCP sequence number N in the last PDCP PDU at event 617B. The base station 104 may then assign PDCP sequence number N+1 in the first PDCP PDU at event 633B, where N is an integer greater than zero. In such implementations, the UE 102A also continues PDCP sequence numbering to receive 633B the PDCP PDUs. If the UE 102A receives the last PDCP PDU with PDCP sequence number L (e.g., L<=1V), and if a PDCP sequence number in the first PDCP PDU the UE 102A receives at event 633B is M (where M is an integer greater than N), the UE 102A can send a PDCP status report to the base station 104 to prompt the base station 104 to retransmit missing PDCP PDUs with PDCP sequence numbers (L+1), . . . , (M−1). In some implementations, the base station 104 retransmits the missing PDCP PDUs after (e.g., in response to) receiving the PDCP status report. In other implementations, the base station 104 retransmits a portion of the missing PDCP PDUs after (e.g., in response to) receiving the PDCP status report. In still other implementations, the base station 104 ignores the PDCP status report (e.g., the base station 104 does not retransmit any of the missing PDCP PDUs regardless of what the report indicates). In another alternative implementation, the UE 102A ignores missing PDCP PDUs with PDCP sequence numbers (L+1), . . . , (M−1), without sending the PDCP status report.

In other implementations, the base station 104 reinitializes PDCP sequence numbering for the PDCP PDUs (or the SDAP PDUs or MBS data packets) that the base station 104 transmits at event 633B. For example, the base station 104 may assign PDCP sequence number N for the last PDCP PDU, and include the PDCP sequence number N in the last PDCP PDU at event 617B. The base station 104 can then assign PDCP sequence number 0 in the first PDCP PDU at event 633B. In such implementations, the UE 102A also reinitializes PDCP sequence numbering to receive 633B the PDCP PDUs. If a PDCP sequence number in the first PDCP PDU the UE 102A receives at event 633B is M>0, the UE 102A can send a PDCP status report to the base station 104 to prompt the base station 104 to retransmit missing PDCP PDUs with PDCP sequence number 0, . . . , (M−1). In some implementations the base station 104 retransmits the missing PDCP PDUs after (e.g., in response to) receiving the PDCP status report. In other implementations, the base station 104 retransmits a portion of the missing PDCP PDUs after (e.g., in response to) receiving the PDCP status report. In still other implementations, the base station 104 ignores the PDCP status report (e.g., the base station 104 does not retransmit any of the missing PDCP PDUs regardless of what the report indicates). In another alternative implementation, the UE 102A ignores missing PDCP PDUs with PDCP sequence numbers 0, . . . , (M−1), without sending the PDCP status report.

In some implementations where the base station 104 and UE 102A use the protocol architectures of FIGS. 3B and 4B, respectively, the base station 104 can include, in the RRC reconfiguration message of event 621B, a second MRB configuration including second PDCP configuration parameters. The base station 104 can configure a third NR PDCP entity (e.g., the NR PDCP entity 320 in FIG. 3B) in accordance with the second PDCP configuration parameters, and the UE 102A can configure a fourth NR PDCP entity (e.g., the NR PDCP entity 420 in FIG. 4B) in accordance with the second PDCP configuration parameters. If the base station 104 configures the SDAP configuration parameters in the first MRB configuration, and if the second MRB configuration configures the UE 102A to continue applying the SDAP configuration parameters in the first MRB configuration, the base station 104 generates SDAP PDUs including the MBS data packets in accordance with the SDAP configuration parameters. The base station 104 (e.g., the third NR PDCP entity) then generates PDCP PDUs including the SDAP PDUs, and transmits 633B the PDCP PDUs to the UE 102A in accordance with the second PDCP configuration parameters. The UE 102A (e.g., the fourth NR PDCP entity) receives 633B the PDCP PDUs, and processes the PDCP PDUs to obtain the SDAP PDUs, in accordance with the second PDCP configuration parameters. The UE 102A (e.g., the second SDAP entity) processes the SDAP PDUs to obtain the MBS data packets in accordance with the SDAP configuration parameters. If the base station 104 configures second SDAP configuration parameters in the second MRB configuration, the UE 102A and base station 104 update the SDAP configuration parameters in the first MRB configuration in accordance with the second SDAP configuration parameters. In this case, the base station 104 (e.g., the first SDAP entity) generates SDAP PDUs including the MBS data packets in accordance with the updated SDAP configuration parameters. The base station 104 (e.g., the third NR PDCP entity) can then generate PDCP PDUs including the SDAP PDUs, and transmit 633B the PDCP PDUs to the UE 102A in accordance with the second PDCP configuration parameters. The UE 102A (e.g., the fourth NR PDCP entity) receives 633B the PDCP PDUs, and processes the PDCP PDUs to obtain the SDAP PDUs, in accordance with the second PDCP configuration parameters. The UE 102A (e.g., the second SDAP entity) processes the SDAP PDUs to obtain the MBS data packets in accordance with the updated SDAP configuration parameters.

In some implementations where the base station 104 and UE 102A use the protocol architectures of any one of FIGS. 3B-3F and any corresponding one of FIGS. 4B-4F, respectively, the unicast configuration includes PHY configuration parameters, MAC configuration parameters, and/or RLC configuration parameters. The base station 104 can configure a third NR MAC entity (e.g., the NR MAC entity 314 in any of FIGS. 3B-3D), or reconfigure the first NR MAC entity (e.g., the NR MAC entity 324 in FIG. 3E or 3F), in accordance with the MAC configuration parameters. If the unicast configuration does not include MAC configuration parameters, the base station 104 may or may not reconfigure the first NR MAC entity to transmit 633B MBS data packets via unicast transmission. The base station 104 can configure a third NR RLC entity (e.g., the NR RLC entity 316 in FIG. 3B, 3C, or 3E), or reconfigure the first NR RLC entity (e.g., the NR RLC entity 326 in FIG. 3D or 3F), in accordance with the RLC configuration parameters. If the unicast configuration parameters do not include RLC configuration parameters, the base station 104 may or may not reconfigure the first NR RLC entity to transmit 633B MBS data packets via unicast transmission.

Similarly, the UE 102A can configure a fifth NR MAC entity (e.g., the NR MAC entity 414 in any of FIGS. 4B-4D), or reconfigure the second NR MAC entity (e.g., the NR MAC entity 424 in FIG. 4E or 4F), in accordance with the MAC configuration parameters. If the unicast configuration parameters do not include MAC configuration parameters, the UE 102A may or may not reconfigure the second NR MAC entity to receive 633B MBS data packets via unicast transmission. The UE 102A can configure a fourth NR RLC entity (e.g., the NR RLC entity 416 in any of FIG. 4B, 4C, or 4E), or reconfigure the second NR RLC entity (e.g., the NR RLC entity 426 in FIG. 4D or 4F), in accordance with the RLC configuration parameters. If the unicast configuration parameters do not include RLC configuration parameters, the UE 102A may or may not reconfigure the second NR RLC entity to transmit 633B MBS data packets via unicast transmission. The base station 104 (e.g., the third or first NR RLC entity) then transmits 633B RLC PDUs including the PDCP PDUs to the UE 102A in accordance with the RLC configuration parameters, and the UE 102A (e.g., the fourth or second NR RLC entity) receives 633B the RLC PDUs including the PDCP PDUs, and processes the RLC PDUs to obtain the PDCP PDUs, in accordance with the RLC configuration parameters. Similarly, the base station 104 (e.g., the third or first NR MAC entity) transmits 633B MAC PDUs including the RLC PDUs to the UE 102A in accordance with the MAC configuration parameters, and the UE 102A (e.g., the fourth or second NR MAC entity) receives 633B the MAC PDUs including the RLC PDUs, and processes the MAC PDUs to obtain the RLC PDUs, in accordance with the MAC configuration parameters. In some implementations, the base station 104 can include the MRB identity in the RLC configuration parameters, and the UE 102A can associate the second or fourth NR PDCP entity with the second or fourth NR RLC entity based on the MRB identity.

In some implementations where the base station 104 and UE 102A use the protocol architectures of any one of FIGS. 3B-3F and any corresponding one of FIGS. 4B-4F, respectively, the base station 104 can indicate in the RRC reconfiguration message of event 621B that the UE 102A is to release the multicast configuration of event 611B. In response to the RRC reconfiguration message or the indication therein, the UE 102A releases the multicast configuration. In some implementations, the UE 102A releases the NR RLC entity 406 and NR MAC entity 404 (if existing) in response to the RRC reconfiguration message. If the UE 102A uses the NR MAC entity 424 instead of the NR MAC entity 404, the UE 102A reconfigures the NR MAC entity 424 to release the multicast configuration parameters in response to the RRC reconfiguration message. If the base station 104 indicates in the RRC reconfiguration message at event 621B that the UE 102A is to release the multicast configuration, the base station 104 does not release the NR RLC entity 306 and NR MAC entity 304 (if existing). If the base station 104 indicates in the RRC reconfiguration message at event 621B that the UE 102A is to release the multicast configuration, but the base station 104 uses the NR MAC entity 324 instead of the NR MAC entity 304, the base station 104 does not reconfigure the NR MAC entity 324 to release the multicast configuration.

FIG. 6C illustrates a scenario 600C similar to the scenario 600A of FIG. 6A, but in which the base station 104 does not need to reconfigure the MRB or lower-layer radio resources when changing from multicast to unicast radio resources for the MBS. Initially, the UE 102A and CN 110 perform a PDU session establishment procedure 650C to establish a PDU session for an MBS via the base station 104. The procedure 650C may be similar to event 550A or 650A. During or after the PDU session establishment procedure 650C, the base station 104 generates a first RRC reconfiguration message including an MRB configuration, a multicast configuration, and a unicast configuration, and sends 609C the RRC reconfiguration message to the UE 102A. The RRC reconfiguration message of event 609C may be similar to that of events 510A and 610A, but the MRB configuration is not specific to only PTM transmissions, and the message includes both multicast and unicast configurations. The MRB configuration, multicast configuration, and unicast configuration may be similar to any of the MRB configurations, multicast configurations, and unicast configurations discussed above in connection with other messaging diagrams.

The UE 102A responds by sending 612C an RRC reconfiguration complete message to the base station 104 (e.g., similar to events 512A and 612A). Thereafter, the CN 110 sends 615C the base station 104 MBS data packets (e.g., similar to event 515A and 615A), which the UE 102A receives 617C from the base station 104 via multicast radio resources in accordance with the MRB configuration and multicast configuration (e.g., similar to events 516A and 616A, but without a PTM-specific MRB).

At a later time, the base station 104 (autonomously, or based on a message from the CN 110) determines to begin transmitting the MBS data packets on the MRB using unicast radio resources instead of the original multicast radio resources. Thereafter, as the CN 110 continues to send 631C MBS data packets to the base station 104, the base station sends 633C the MBS data packets to the UE 102A on the MRB using unicast radio resources, in accordance with the MRB configuration and unicast configuration that were included in the RRC reconfiguration message of event 609C. The UE 102A receives 633C the MBS data packets on the MRB using the unicast radio resources, in accordance with the MRB configuration and unicast configuration.

As noted above, FIGS. 7A and 7B are messaging diagrams of example implementations and scenarios that are similar to FIGS. 5A and 5B, but in which the base station 104 is a distributed base station with a CU 172 and at least one DU 174. It is understood that the order of multicast/unicast configuration and transmission in the scenarios shown in FIGS. 7A and 7B may be reversed (e.g., similar to scenario 500C of FIG. 5C), such that base station 140 transmits data packets of the first MBS using unicast radio resources and transmits data packets of the second MBS using multicast radio resources.

Referring first to FIG. 7A, in a scenario 700A, the UE 102A and the CN 110 initially perform a PDU session establishment procedure 750A to establish a first PDU session for a first MBS via the base station 104. The procedure 750A may be similar to procedure 550A of FIG. 5A, but with additional messaging between the CU 172 and DU 174 as needed, with the DU 174 performing radio communications with the UE 102A and the CU 172 communicating with the CN 110 via an interface (e.g., an S1 or NG interface).

After the procedure 750A, the CU 172 can send 752A a CU-to-DU message to the DU 174 to request a multicast configuration. In response, the DU 174 generates a multicast configuration, which may be similar to the multicast configuration discussed above in connection with FIG. 5A, and sends 754A a DU-to-CU message including the multicast configuration to the CU 172. After (e.g., in response to) event 754A, the CU 172 generates a PTM MRB configuration for the first MBS, which may be similar to the PTM MRB configuration discussed above in connection with FIG. 5A, and sends 756A a CU-to-DU message including an RRC reconfiguration message to the DU 174. The RRC reconfiguration message, in turn, includes the multicast configuration and the PTM MRB configuration. In some implementations, the CU-to-DU message 752A is a UE Context Setup Request message, a UE Context Modification Request message, or an MBS-specific message (e.g., F1AP message). In some implementations, the CU-to-DU message 754A is a UE Context Setup Response message, a UE Context Modification Response message, a UE Context Modification Required message, or an MBS-specific message (e.g., F1AP message). In some implementations, the CU-to-DU message 756A is a DL RRC Message Transfer message or a UE Context Modification Request message. In some implementations, the CU-to-DU message 758A is a UL RRC Message Transfer message or a UE Context Modification Response message.

The DU 174 then sends 710A the RRC reconfiguration message including the multicast configuration and PTM MRB configuration to the UE 102A, and the UE 102A responds by sending 712A the DU 174 an RRC reconfiguration complete message. After (e.g., in response to) event 712A, the DU 174 sends 758A the CU 172 a DU-to-CU message that includes the RRC reconfiguration complete message. At some time thereafter, the CN 110 may send 715A MBS data packets of the first MBS to the CU 172 (e.g., similar to event 515A). The CU 172 sends 716A-1 the MBS data packets to the DU 174, which in turn sends 716A-2 the MBS data packets to the UE 102A via the PTM MRB and multicast radio resources (e.g., similar to event 516A). The UE 102A receives 716A-2 the MBS data packets of the first MBS using the PTM MRB configuration and multicast configuration that the UE 102A received at event 710A.

At some time during or after event 716A-1 and/or 716A-2, the UE 102A and CN 110 (via the base station 104) can perform a second PDU session establishment procedure 718A for a second MBS (e.g., similar to the procedure 750A but for a different MBS, and similar to procedure 518A but with messaging between the CU 172 and DU 174 as needed). During or after the second PDU session establishment procedure 718A, the CU 172 sends 760A the DU 174 a CU-to-DU message to request a unicast configuration. In response, the DU 174 generates a unicast configuration, which may be similar to the unicast configuration discussed above in connection with FIG. 5A, and sends 762A a DU-to-CU message including the unicast configuration to the CU 172. After (e.g., in response to) event 762A, the CU 172 generates a PTP MRB configuration for the second MBS, which may be similar to the PTP MRB configuration discussed above in connection with FIG. 5A, and sends 764A a CU-to-DU message including an RRC reconfiguration message to the DU 174. The RRC reconfiguration message, in turn, includes the unicast configuration and the PTP MRB configuration.

The DU 174 then sends 720A the RRC reconfiguration message including the unicast configuration and PTP MRB configuration to the UE 102A, and the UE 102A responds by sending 722A the DU 174 an RRC reconfiguration complete message. After (e.g., in response to) event 722A, the DU 174 sends 766A the CU 172 a DU-to-CU message that includes the RRC reconfiguration complete message. At some time thereafter, the CN 110 may send 731A MBS data packets of the second MBS to the CU 172 (e.g., similar to event 531A). The CU 172 sends 732A-1 the MBS data packets to the DU 174, which in turn sends 732A-2 the MBS data packets to the UE 102A via the PTP MRB and unicast radio resources (e.g., similar to event 532A). The UE 102A receives 732A-2 the MBS data packets of the second MBS using the PTP MRB configuration and unicast configuration that the UE 102A received at event 720A. Example implementations of the CU-to-DU messages 760A, 762A, 764A, and 766A are similar to the example implementations of CU-to-DU messages 752A, 754A, 756A, and 758A, respectively.

FIG. 7B illustrates a scenario 700B similar to the scenario 700A of FIG. 7A, but in which (similar to the scenario 500B) the UE 102A and CN 110 do not perform a PDU session establishment procedure to establish a PDU session for the second MBS. Initially, in the scenario 700B, the UE 102A and CN 110 perform a PDU session establishment procedure 750B to establish a PDU session for at least a first MBS via the base station 104. The procedure 750B may be similar to event 550B of FIG. 5B, but with additional messaging between the CU 172 and DU 174 as needed, with the DU 174 performing radio communications with the UE 102A and the CU 172 communicating with the CN 110 via an interface (e.g., an S1 or NG interface).

After the procedure 750B, the CU 172 can send 752B a CU-to-DU message to the DU 174 to request a multicast configuration. In response, the DU 174 generates a multicast configuration, which may be similar to the multicast configuration discussed above in connection with FIG. 5A, and sends 754B a DU-to-CU message including the multicast configuration to the CU 172. After (e.g., in response to) event 754B, the CU 172 generates a PTM MRB configuration for the first MBS, which may be similar to the PTM MRB configuration discussed above in connection with FIG. 5A, and sends 756B a CU-to-DU message including an RRC reconfiguration message to the DU 174. The RRC reconfiguration message, in turn, includes the multicast configuration and the PTM MRB configuration.

The DU 174 then sends 710B the RRC reconfiguration message including the multicast configuration and PTM MRB configuration to the UE 102A, and the UE 102A responds by sending 712B the DU 174 an RRC reconfiguration complete message. After (e.g., in response to) event 712B, the DU 174 sends 758B the CU 172 a DU-to-CU message that includes the RRC reconfiguration complete message. At some time thereafter, the CN 110 may send 715B MBS data packets of the first MBS to the CU 172 (e.g., similar to event 515A). The CU 172 sends 716B-1 the MBS data packets to the DU 174, which in turn sends 716B-2 the MBS data packets to the UE 102A via the PTM MRB and multicast radio resources (e.g., similar to event 516A). The UE 102A receives 716B-2 the MBS data packets of the first MBS using the PTM MRB configuration and multicast configuration that the UE 102A received at event 710B.

Later in time, and instead of requesting the establishment of a second PDU session (as in scenario 700A), the UE 102A generates an MBS request message to request a second MBS, and sends 721B-1 the MBS request message to the DU 174. The DU 174 then sends 721B-2 the MBS request message to the CU 172. In the scenario 700B, the second MBS, like the first MBS, is supported by the initial PDU session. In response to receiving 721B-2 the MBS request message, the base station 104 forwards/sends 723B the MBS request message to the CN 110. The MBS request message may be similar to the MBS request message described above in connection with FIG. 5B. After (e.g., in response to) receiving 723B the MBS request message, the CN 110 sends 724B a CN-to-BS interface message (e.g., an NG interface message or a PDU SESSION RESOURCE MODIFY REQUEST message) to the CU 172. The CN-to-BS interface message may be similar to the additional CN-to-BS interface message described above for FIG. 5A.

After (e.g., in response to) receiving 724B the CN-to-BS interface message, the CU 172 sends 760B a CU-to-DU message to the DU 174, to request a unicast configuration. In response, the DU 174 generates a unicast configuration, which may be similar to the unicast configuration discussed above in connection with FIG. 5A, and sends 762B a DU-to-CU message including the unicast configuration to the CU 172. After (e.g., in response to) event 762B, the CU 172 generates a PTP MRB configuration for the second MBS, which may be similar to the PTP MRB configuration discussed above in connection with FIG. 5A, and sends 764B a CU-to-DU message including an RRC reconfiguration message to the DU 174. The RRC reconfiguration message, in turn, includes the unicast configuration and the PTP MRB configuration.

The DU 174 then sends 720B the RRC reconfiguration message including the unicast configuration and PTP MRB configuration to the UE 102A, and the UE 102A responds by sending 722B the DU 174 an RRC reconfiguration complete message. After (e.g., in response to) event 722B, the DU 174 sends 766B the CU 172 a DU-to-CU message that includes the RRC reconfiguration complete message. At some time thereafter, the CN 110 may send 731B MBS data packets of the second MBS to the CU 172 (e.g., similar to event 531A). The CU 172 sends 732B-1 the MBS data packets to the DU 174, which in turn sends 732B-2 the MBS data packets to the UE 102A via the PTP MRB and unicast radio resources (e.g., similar to event 532A). The UE 102A receives 732B-2 the MBS data packets of the second MBS using the PTP MRB configuration and unicast configuration that the UE 102A received at event 720B.

As noted above, FIGS. 8A-8C are messaging diagrams of example implementations and scenarios that are similar to FIGS. 6A-6C, but in which the base station 104 is a distributed base station with a CU 172 and at least one DU 174. It is understood that the order of multicast/unicast configuration and transmission in the scenarios shown in FIGS. 8A-8C may be reversed, such that the CN 110 and base station 104 initially provide MBS data packets via unicast transmission and then later provide MBS data packets via multicast transmission.

Referring first to FIG. 8A, in a scenario 800A, the UE 102A and CN 110 initially perform a PDU session establishment procedure 850A to establish a PDU session for an MBS via the base station 104 (including the CU 172 and DU 174). The procedure 850A may be similar to event 550A of FIG. 5A, but with additional messaging between the CU 172 and DU 174 as needed, with the DU 174 performing radio communications with the UE 102A and the CU 172 communicating with the CN 110 via an interface (e.g., an S1 or NG interface).

After the procedure 850A, the CU 172 can send 852A a CU-to-DU message to the DU 174 to request a multicast configuration. In response, the DU 174 generates a multicast configuration, which may be similar to the multicast configuration discussed above in connection with FIG. 5A, and sends 854A a DU-to-CU message including the multicast configuration to the CU 172. After (e.g., in response to) event 854A, the CU 172 generates a PTM MRB configuration for the MBS, which may be similar to the PTM MRB configuration discussed above in connection with FIG. 5A, and sends 856A a CU-to-DU message including an RRC reconfiguration message to the DU 174. The RRC reconfiguration message, in turn, includes the multicast configuration and the PTM MRB configuration.

The DU 174 then sends 810A the RRC reconfiguration message including the multicast configuration and PTM MRB configuration to the UE 102A, and the UE 102A responds by sending 812A the DU 174 an RRC reconfiguration complete message. After (e.g., in response to) event 812A, the DU 174 sends 858A the CU 172 a DU-to-CU message that includes the RRC reconfiguration complete message. At some time thereafter, the CN 110 may send 815A MBS data packets of the MBS to the CU 172 (e.g., similar to event 515A). The CU 172 sends 816A-1 the MBS data packets to the DU 174, which in turn sends 816A-2 the MBS data packets to the UE 102A via the PTM MRB and multicast radio resources (e.g., similar to event 516A). The UE 102A receives 816A-2 the MBS data packets using the PTM MRB configuration and multicast configuration that the UE 102A received at event 810A.

Later in time, the CN 110 determines 834A to request that the base station 104 reconfigure radio resources for the PDU session from multicast to unicast. In some implementations, the CN 110 determines 834A to do so based on the number of existing PDU sessions (for different UEs) for the MBS. If the number of existing PDU sessions for the MBS is below a predetermined threshold number, the CN 110 in response sends 824A the CU 172 a CN-to-BS interface message requesting that the base station 104 reconfigure radio resources from multicast to unicast for the PDU session. If the number of existing PDU sessions for the MBS is not below the threshold number, the CN 110 in response does not request the base station 104 to reconfigure radio resources from multicast to unicast for the PDU session (i.e., event 824A is omitted). The CN-to-BS interface message may be an NG interface message or a PDU SESSION RESOURCE MODIFY REQUEST message, for example.

After (e.g., in response to) event 824A, the CU 172 sends 860A the DU 174 a CU-to-DU message to request a unicast configuration. In response, the DU 174 generates a unicast configuration, which may be similar to the unicast configuration discussed above in connection with FIG. 5A, and sends 862A a DU-to-CU message including the unicast configuration to the CU 172. After (e.g., in response to) event 862A, the CU 172 generates a PTP MRB configuration for the MBS, which may be similar to the PTP MRB configuration discussed above in connection with FIG. 5A, and sends 864A a CU-to-DU message including an RRC reconfiguration message to the DU 174. The RRC reconfiguration message, in turn, includes the unicast configuration and the PTP MRB configuration.

The DU 174 then sends 820A the RRC reconfiguration message including the unicast configuration and PTP MRB configuration to the UE 102A, and the UE 102A responds by sending 822A the DU 174 an RRC reconfiguration complete message. After (e.g., in response to) event 822A, the DU 174 sends 866A the CU 172 a DU-to-CU message that includes the RRC reconfiguration complete message. At some time thereafter, the CN 110 may send 831A MBS data packets to the CU 172 (e.g., similar to event 531A). The CU 172 sends 832A-1 the MBS data packets to the DU 174, which in turn sends 832A-2 the MBS data packets to the UE 102A via the PTP MRB and unicast radio resources (e.g., similar to event 532A). The UE 102A receives 832A-2 the MBS data packets using the PTP MRB configuration and unicast configuration that the UE 102A received at event 820A.

Example implementations of the CU-to-DU messages 852A, 854A, 856A, and 858A are similar to the example implementations of CU-to-DU messages 752A, 754A, 756A, and 758A, respectively. Example implementations of the CU-to-DU messages 860A, 862A, 864A, and 866A are similar to the example implementations of CU-to-DU messages 752A, 754A, 756A, and 758A, respectively.

FIG. 8B illustrates a scenario 800B similar to the scenario 800A of FIG. 8A, but in which the base station 104 does not need to reconfigure the MRB when changing from multicast to unicast radio resources for the MBS. Initially, the UE 102A and CN 110 perform a PDU session establishment procedure 850B to establish a PDU session for an MBS via the base station 104 (including the CU 172 and DU 174). The procedure 850B may be similar to event 550A of FIG. 5A, but with additional messaging between the CU 172 and DU 174 as needed, with the DU 174 performing radio communications with the UE 102A and the CU 172 communicating with the CN 110 via an interface (e.g., an S1 or NG interface).

After the procedure 850B, the CU 172 can send 852B a CU-to-DU message to the DU 174 to request a multicast configuration. In response, the DU 174 generates a multicast configuration, which may be similar to the multicast configuration discussed above in connection with FIG. 5A, and sends 854B a DU-to-CU message including the multicast configuration to the CU 172. After (e.g., in response to) event 854B, the CU 172 generates an MRB configuration for the MBS, which may be similar to the MRB configuration discussed above in connection with FIG. 5A or 6B, and sends 856B a CU-to-DU message including an RRC reconfiguration message to the DU 174. The RRC reconfiguration message, in turn, includes the multicast configuration and the MRB configuration.

The DU 174 then sends 810B the RRC reconfiguration message including the multicast configuration and MRB configuration to the UE 102A, and the UE 102A responds by sending 812B the DU 174 an RRC reconfiguration complete message. After (e.g., in response to) event 812B, the DU 174 sends 858B the CU 172 a DU-to-CU message that includes the RRC reconfiguration complete message. At some time thereafter, the CN 110 may send 815B MBS data packets of the MBS to the CU 172 (e.g., similar to event 515A). The CU 172 sends 817B-1 the MBS data packets to the DU 174, which in turn sends 817B-2 the MBS data packets to the UE 102A via the MRB and multicast radio resources (e.g., similar to event 617B). The UE 102A receives 817B-2 the MBS data packets using the MRB configuration and multicast configuration that the UE 102A received at event 810B.

Later in time, the CN 110 determines 834B to request that the base station 104 reconfigure radio resources for the PDU session from multicast to unicast. In some implementations, the CN 110 determines 834B to do so based on the number of existing PDU sessions (for different UEs) for the MBS. If the number of existing PDU sessions for the MBS is below a predetermined threshold number, the CN 110 in response sends 824B the CU 172 a CN-to-BS interface message requesting that the base station 104 reconfigure radio resources from multicast to unicast for the PDU session. If the number of existing PDU sessions for the MBS is not below the threshold number, the CN 110 in response does not request the base station 104 to reconfigure radio resources from multicast to unicast for the PDU session (i.e., event 824B is omitted). The CN-to-BS interface message may be an NG interface message or a PDU SESSION RESOURCE MODIFY REQUEST message, for example.

After (e.g., in response to) event 824B, the CU 172 sends 860B the DU 174 a CU-to-DU message to request a unicast configuration. In response, the DU 174 generates a unicast configuration, which may be similar to the unicast configuration discussed above in connection with FIG. 5A, and sends 862B a DU-to-CU message including the unicast configuration to the CU 172. After (e.g., in response to) event 862B, the CU 172 generates an RRC reconfiguration message including the unicast configuration, and sends 864B the RRC reconfiguration message to the DU 174 in another CU-to-DU message. The DU 174 then sends 820B the RRC reconfiguration message including the unicast configuration to the UE 102A, and the UE 102A responds by sending 822B the DU 174 an RRC reconfiguration complete message. After (e.g., in response to) event 822B, the DU 174 sends 866B the CU 172 a DU-to-CU message that includes the RRC reconfiguration complete message. At some time thereafter, the CN 110 may send 831B MBS data packets to the CU 172 (e.g., similar to event 531A). The CU 172 sends 833B-1 the MBS data packets to the DU 174, which in turn sends 833B-2 the MBS data packets to the UE 102A via the MRB and unicast radio resources (e.g., similar to event 633B). The UE 102A receives 833B-2 the MBS data packets using the MRB configuration and unicast configuration that the UE 102A received at event 820B.

FIG. 8C illustrates a scenario 800C similar to the scenario 800A of FIG. 8A, but in which the base station 104 does not need to reconfigure the MRB or lower-layer radio resources when changing from multicast to unicast radio resources for the MBS. Initially, the UE 102A and CN 110 perform a PDU session establishment procedure 850C to establish a PDU session for an MBS via the base station 104 (including the CU 172 and DU 174). The procedure 850C may be similar to event 550A of FIG. 5A, but with additional messaging between the CU 172 and DU 174 as needed, with the DU 174 performing radio communications with the UE 102A and the CU 172 communicating with the CN 110 via an interface (e.g., an S1 or NG interface).

After the procedure 850C, the CU 172 can send 852C a CU-to-DU message to the DU 174 to request a multicast configuration. In other implementations and/or scenarios, the CU-to-DU message requests both multicast and unicast configurations. In either implementation/scenario, the DU 174 responds to event 852C by generating both a multicast configuration and a unicast configuration, which may be similar to the multicast and unicast configurations discussed above in connection with FIG. 5A, and sends 854C a DU-to-CU message including the multicast and unicast configurations to the CU 172. After (e.g., in response to) event 854C, the CU 172 generates an MRB configuration for the MBS, which may be similar to the MRB configuration discussed above in connection with FIG. 5A or 6B, and sends 856C a CU-to-DU message including an RRC reconfiguration message to the DU 174. The RRC reconfiguration message, in turn, includes the multicast configuration, the unicast configuration, and the MRB configuration.

The DU 174 then sends 810C the RRC reconfiguration message including the multicast configuration, the unicast configuration, and the MRB configuration to the UE 102A, and the UE 102A responds by sending 812C the DU 174 an RRC reconfiguration complete message. After (e.g., in response to) event 812C, the DU 174 sends 858C the CU 172 a DU-to-CU message that includes the RRC reconfiguration complete message. At some time thereafter, the CN 110 may send 815C MBS data packets of the MBS to the CU 172 (e.g., similar to event 515A). The CU 172 sends 817C-1 the MBS data packets to the DU 174, which in turn sends 817C-2 the MBS data packets to the UE 102A via the MRB and multicast radio resources (e.g., similar to event 617B). The UE 102A receives 817C-2 the MBS data packets using the MRB configuration and multicast configuration that the UE 102A received at event 810C.

At a later time, the CU 172 (autonomously, or based on a message from the CN 110) determines to begin transmitting the MBS data packets on the MRB using unicast radio resources instead of the original multicast radio resources. Thereafter, as the CN 110 continues to send 831C MBS data packets to the base station 104, the base station sends 833C-1 the MBS data packets to the UE 102A on the MRB using unicast radio resources, in accordance with the MRB configuration and unicast configuration that were included in the RRC reconfiguration message of event 810C. The UE 102A receives 833C the MBS data packets on the MRB using the unicast radio resources, in accordance with the MRB configuration and unicast configuration.

FIGS. 9-21 are flow diagrams depicting various example methods according to the techniques disclosed herein, which may be implemented, for example, in the wireless communication system 100 of FIG. 1A. While the below description refers to specific components of the wireless communication system 100 (e.g., UE 102A and base station 104), the methods may instead be performed by components other than those shown in FIG. 1A.

Figure 9:
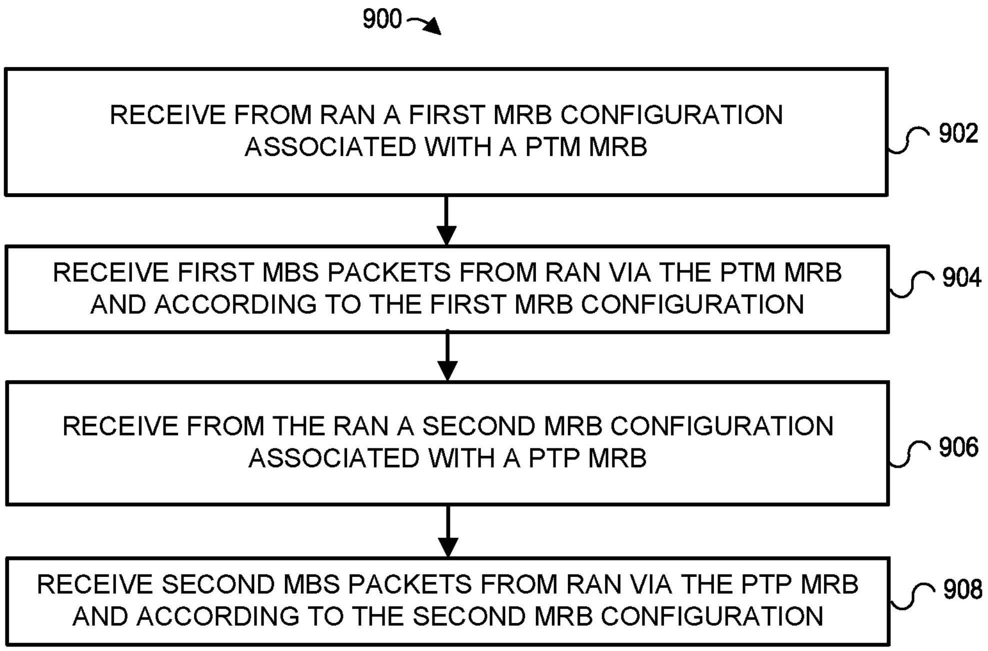
FIGS. 9 and 10 are flow diagrams of example methods for managing multicast and unicast MBS communications from the perspective of a UE and the perspective of one or more RAN nodes, respectively.
Figure 10:
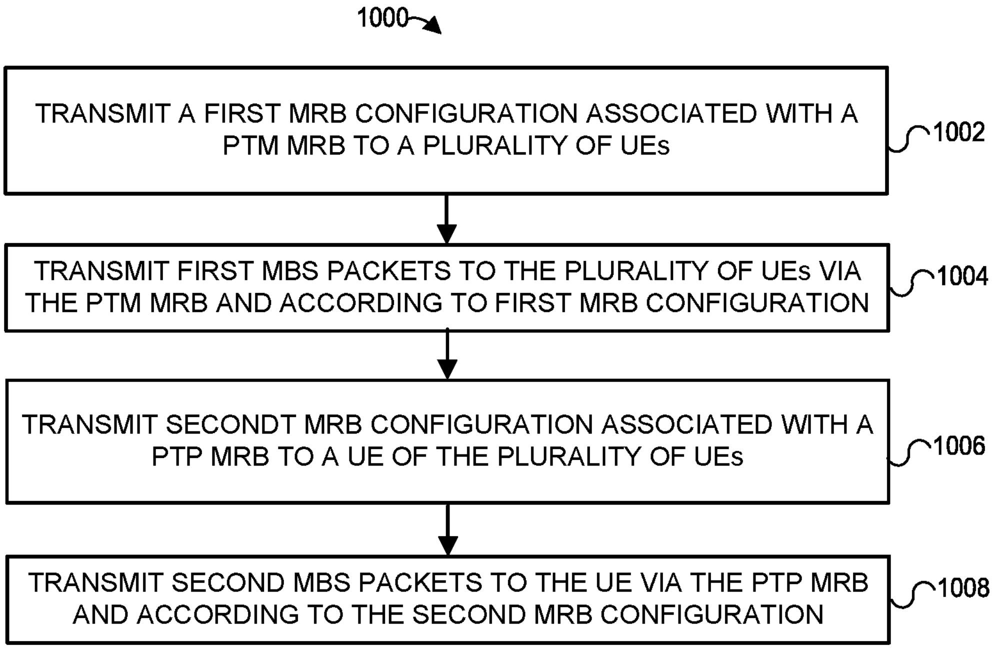

FIGS. 9 and 10 are flow diagrams of example methods for managing multicast and unicast MBS communications from the perspective of the UE 102A and the perspective of one or more nodes of the RAN 105 (e.g., the base station 104, or specifically the DU 174 and/or CU 172, etc.), respectively.

Referring first to FIG. 9, an example method 900 may be performed by the UE 102A or, in some implementations/scenarios, collectively by a group of UEs. At block 902 of the method 900, the UE 102A receives (510A, 510B, 510C, 610A, 710A, 710B, or 810A) from the RAN 105 a first MRB configuration associated with a PTM MRB. At block 904, and after block 902, the UE 102A receives (516A, 516B, 516C, 616A, 716A-2, or 816A-2) first MBS packets from the RAN 105 via the PTM MRB and according to the first MRB configuration.

At block 906, the UE 102A receives (520A, 520B, 520C, 620A, 720A, 720B, or 820A) from the RAN 105 a second MRB configuration associated with a PTP MRB. At block 908, and after block 906, the UE 102A receives (532A, 532B, 532C, 632A, 732A-2, 732B-2, or 832A-2) second MBS packets from the RAN 105 via the PTP MRB and according to the second MRB configuration.

In some scenarios, blocks 906 and 908 may occur before blocks 902 and 904.

Referring next to FIG. 10, an example method 1000 may be performed by one or more nodes of the RAN 105 (e.g., the base station 104). At block 1002 of the method 1000, the one or more RAN nodes transmit (510A, 510B, 510C, 610A, 710A, 710B, or 810A) to the UE 102A a first MRB configuration associated with a PTM MRB. At block 1004, and after block 1002, the RAN node(s) transmit (516A, 516B, 516C, 616A, 716A-2, or 816A-2) first MBS packets to the UE 102A via the PTM MRB and according to the first MRB configuration.

At block 1006, the RAN node(s) transmit (520A, 520B, 520C, 620A, 720A, 720B, or 820A) to the UE 102A a second MRB configuration associated with a PTP MRB. At block 1008, and after block 1006, the RAN node(s) transmit (532A, 532B, 532C, 632A, 732A-2, 732B-2, or 832A-2) second MBS packets to the UE 102A via the PTP MRB and according to the second MRB configuration.

In some scenarios, blocks 1006 and 1008 may occur before blocks 1002 and 1004.

Figure 11:
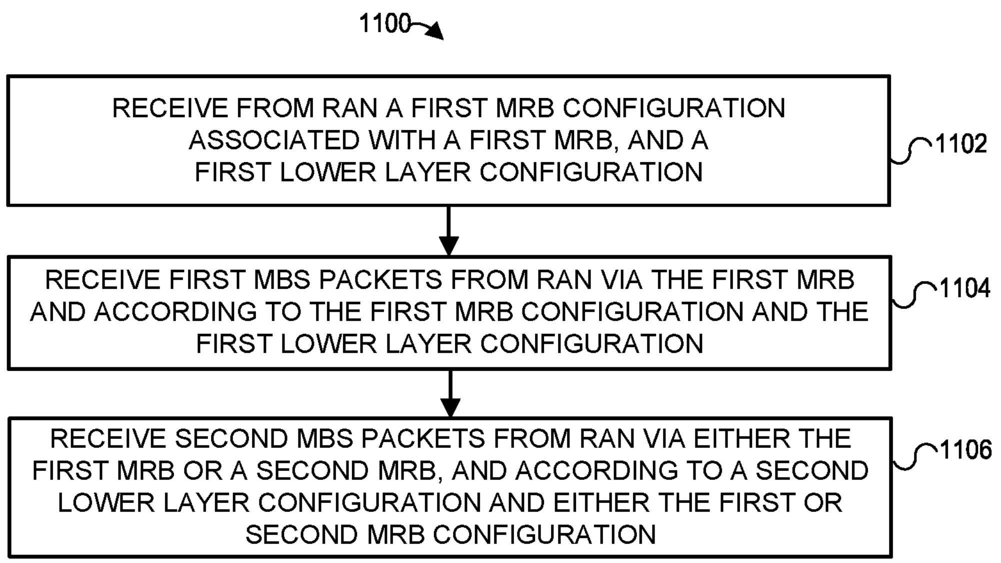
FIGS. 11 and 12 are flow diagrams of additional example methods for managing multicast and unicast MBS communications from the perspective of a UE and the perspective of one or more RAN nodes, respectively.
Figure 12:
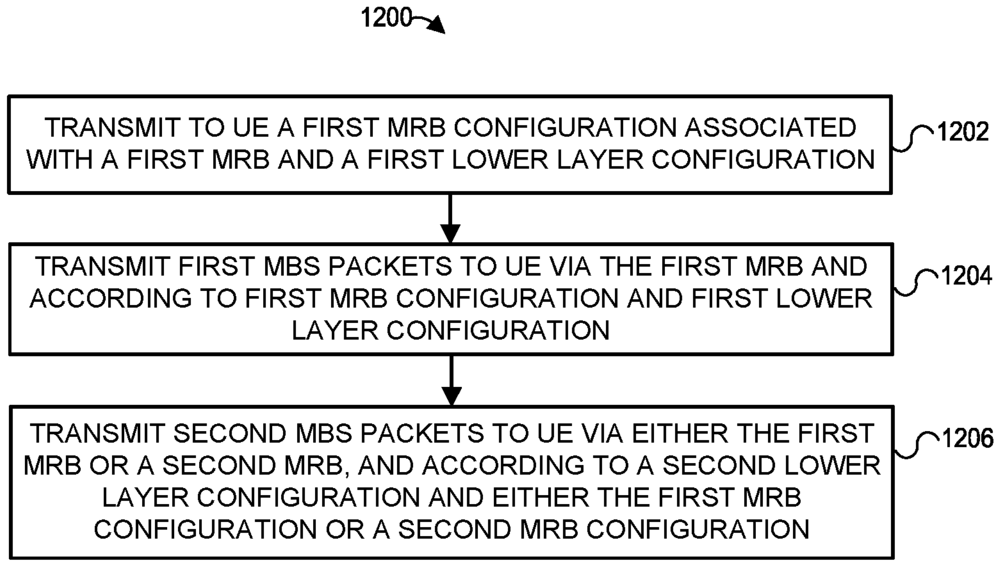

FIGS. 11 and 12 are flow diagrams of additional example methods for managing multicast and unicast MBS communications from the perspective of the UE 102A and the perspective of one or more nodes of the RAN 105 (e.g., the base station 104, or specifically the DU 174 and/or CU 172, etc.), respectively.

Referring first to FIG. 11, a method 1100 is performed by the UE 102. At block 1102, the UE 102A receives (610A, 611B, 611C, 810A, 810B, or 810C) from the RAN 105 a first MRB configuration associated with a first MRB, and a first lower layer configuration (i.e., unicast or multicast configuration). At block 1104, and after block 1102, the UE 102A receives (616A, 617B, 617C, 816A-2, 817B-2, or 817C-2) first MBS packets from the RAN 105 via the first MRB and according to the first MRB configuration and the first lower layer configuration. At block 1106, and after block 1104, the UE 102A receives (632A, 633B, 633C, 832A-2, 833B-2, or 833C-2) second MBS packets from the RAN via either the first MRB or a second MRB, and according to a second lower layer configuration (i.e., multicast configuration if the first lower layer configuration was unicast, or unicast configuration if the first lower layer configuration was multicast) and either the first or second MRB configuration.

Referring next to FIG. 12, a method 1200 is performed by one or more nodes of the RAN 105 (e.g., the base station 104). At block 1202, the RAN node(s) transmit 610A, 611B, 611C, 810A, 810B, or 810C to the UE 102A a first MRB configuration associated with a first MRB and a first lower layer (multicast or unicast) configuration. At block 1204, the RAN node(s) transmit (616A, 617B, 617C, 816A-2, 817B-2, or 817C-2) to the UE 102A first MBS packets via the first MRB and according to the first MRB configuration and the first lower layer configuration. At block 1206, the RAN node(s) transmit (632A, 633B, 633C, 832A-2, 833B-2, or 833C-2) second MBS packets to the UE 102A via either the first MRB or a second MRB, and according to a second lower layer configuration (i.e., multicast configuration if the first lower layer configuration was unicast, or unicast configuration if the first lower layer configuration was multicast) and either the first or second MRB configuration.

FIGS. 13-20B are flow diagrams of example methods for managing multicast and unicast MBS communications from the perspective of CU 172 or DU 174, according to various implementations and/or scenarios. It is understood that the order of multicast-then-unicast may be reversed from what is shown in any of FIGS. 13-20B, in other scenarios and/or other implementations.

Figure 13:
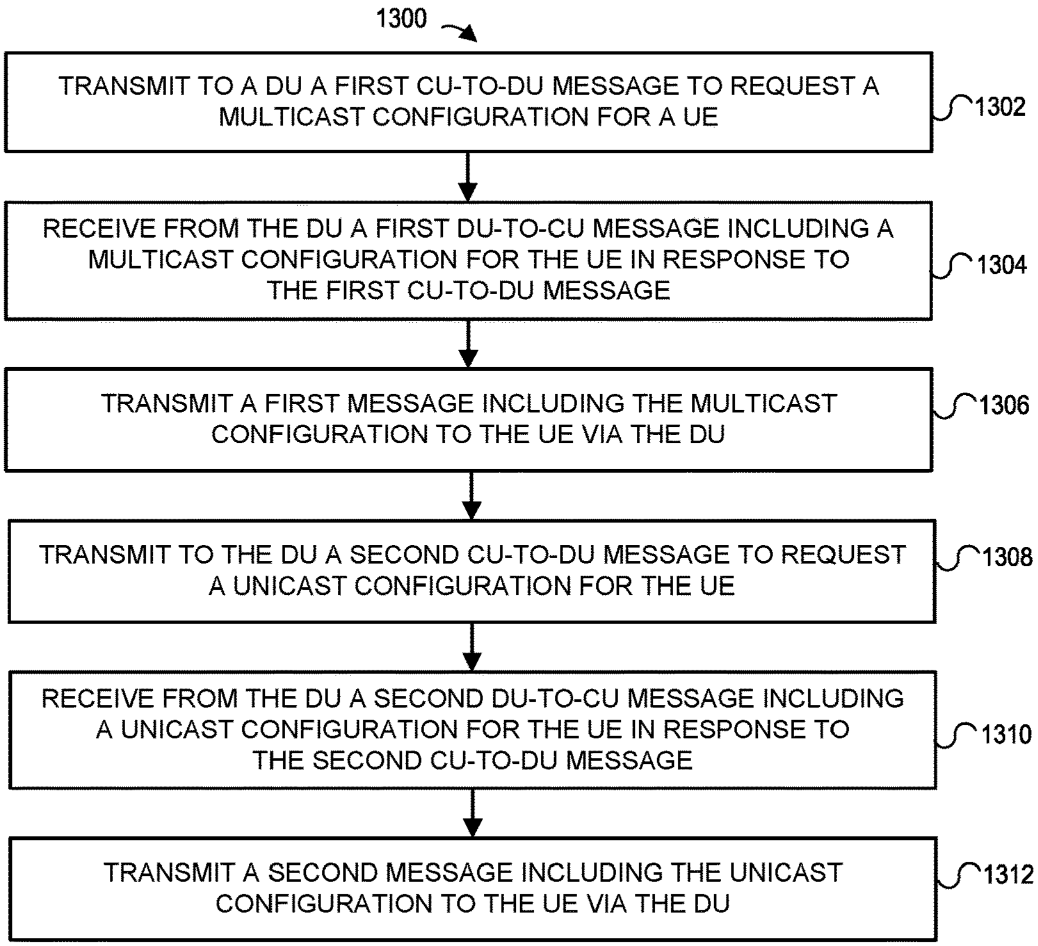

Referring first to FIG. 13, a method 1300 is performed by the CU 172. At block 1302, the CU 172 transmits (752A, 752B, 852A, or 852B) to the DU 174 a first CU-to-DU message to request a multicast configuration for the UE 102A. At block 1304, the CU 172 receives (754A, 754B, 854A, or 854B) from the DU 174 a first DU-to-CU message including a multicast configuration for the UE 102A in response to the first CU-to-DU message. At block 1306, the CU 172 transmits (756A/710A, 756B/710B, 856A/810A, or 856B/810B) a first message including the multicast configuration to the UE 102A via the DU 174. At block 1308, the CU 172 transmits (760A, 760B, 860A, or 860B) to the DU 174 a second CU-to-DU message to request a unicast configuration for the UE 102A. At block 1310 the CU 172 receives (762A, 762B, 862A, or 862B) from the DU 174 a second DU-to-CU message including a unicast configuration for the UE 102A, in response to the second CU-to-DU message. At block 1312, the CU 172 transmits (764A/720A, 764B/720B, 864A/820A, or 864B/820B) a second message including the unicast configuration to the UE 102A via the DU 174.

Figure 14:
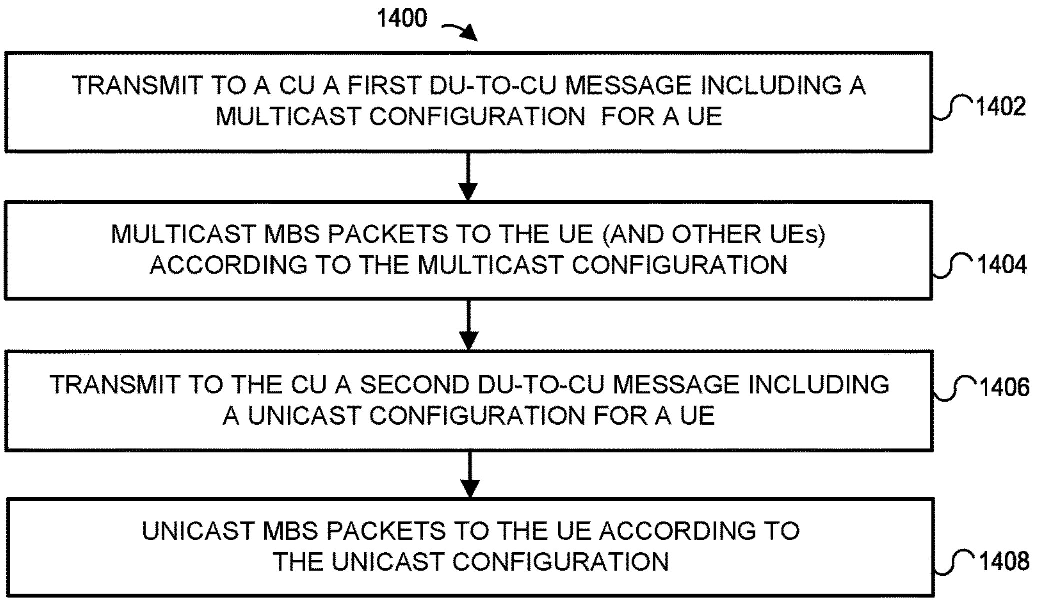

Referring next to FIG. 14, a method 1400 is performed by the DU 174. At block 1402, the DU 174 transmits (754A, 754B, 854A, or 854B) to the CU 172 a first DU-to-CU message including a multicast configuration for the UE 102A (e.g., in response to a request message from the CU 172). At block 1404, the DU 174 multicasts (710A, 710B, 810A, or 810B) MBS packets to the UE 102A and one or more other UEs according to the multicast configuration. At block 1406, the DU 174 transmits (762A, 762B, 862A, or 862B) to the CU 172 a second DU-to-CU message including a unicast configuration for the UE 102A (e.g., in response to another request message from the CU 172). At block 1408, the DU 174 unicasts (720A, 720B, 820A, or 820B) MBS packets to the UE 102A according to the unicast configuration.

Figure 15:
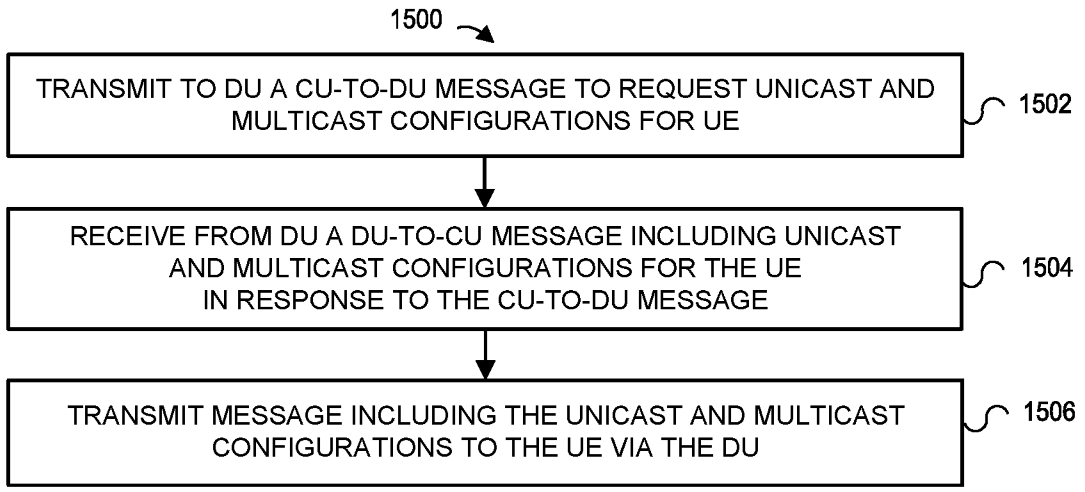

Referring next to FIG. 15, a method 1500 is performed by the CU 172. At block 1502, the CU 172 transmits (852C) to the DU 174 a CU-to-DU message to request unicast and multicast configurations for the UE 102A. At block 1504, the CU 172 receives (854C) from the DU 174 a DU-to-CU message including unicast and multicast configurations for the UE 102A, in response to the CU-to-DU message. In other implementations, the message transmitted at block 1502 only explicitly requests one type of configuration (unicast or multicast), or does not explicitly indicate a type of configuration, but the CU 172 responds with both unicast and multicast configurations regardless. At block 1506, the CU 172 transmits (856C/810C) a message including the unicast and multicast configurations to the UE 102A via the DU 174.

Figure 16:
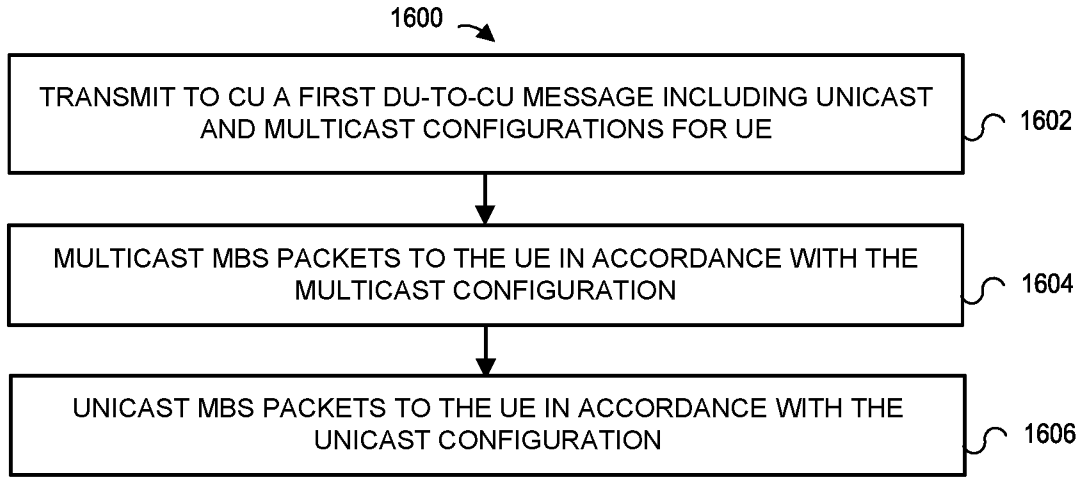

Referring next to FIG. 16, a method 1600 is performed by the DU 174. At block 1602, the DU 174 transmits (854C) to the CU 172 a first DU-to-CU message including unicast and multicast configurations for the UE 102A (e.g., in response to a request message from the CU 172). At block 1604, the DU 174 multicasts (817C-2) MBS packets to the UE 102A and one or more other UEs in accordance with the multicast configuration. At block 1606, the DU 174 unicasts (833C-2) MBS packets (for the same MBS) in accordance with the unicast configuration.

Figure 17:
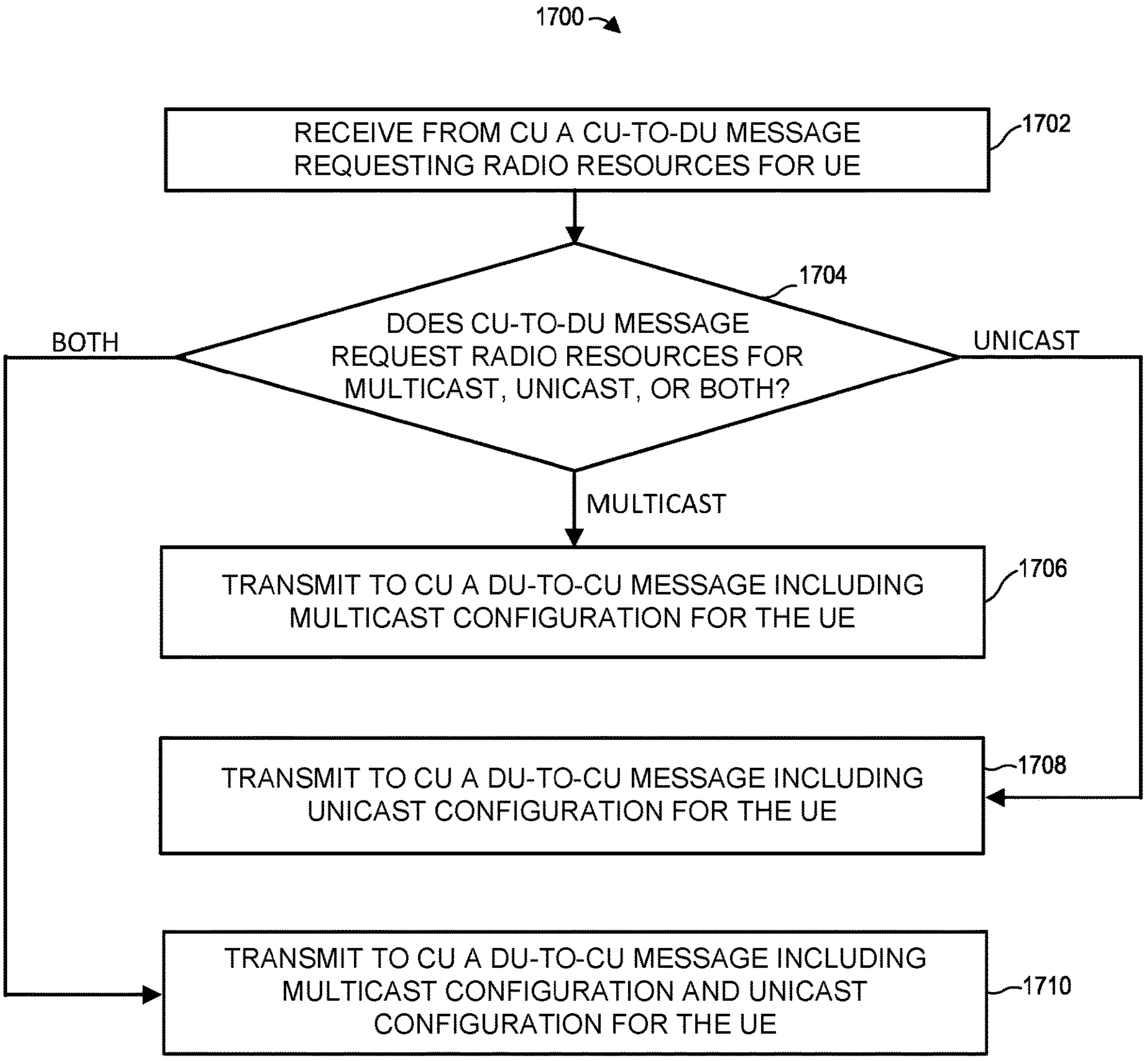

Referring next to FIG. 17, a method 1700 is performed by the DU 174. At block 1702, the DU 174 receives (752A, 760A, 752B, 760B, 752C, 852A, 860A, 852B, 860B, or 852C) from the CU 172 a CU-to-DU message requesting radio resources for the UE 102A. At block 1704, the DU 174 determines whether the CU-to-DU message requests radio resources for multicast communications, unicast communications, or both. If multicast, the DU 174 transmits (754A, 754B, 854A, or 854B) to the CU 172 a DU-to-CU message including a multicast configuration for the UE 102A, at block 1706. If unicast, the DU 174 transmits (762A, 762B, 862A, or 862B) to the CU 172 a DU-to-CU message including a unicast configuration for the UE 102A, at block 1708. If both multicast and unicast, the DU 174 transmits (854C) to the CU 172 a DU-to-CU message including both multicast and unicast configurations for the UE 102A, at block 1710.

Figure 18:
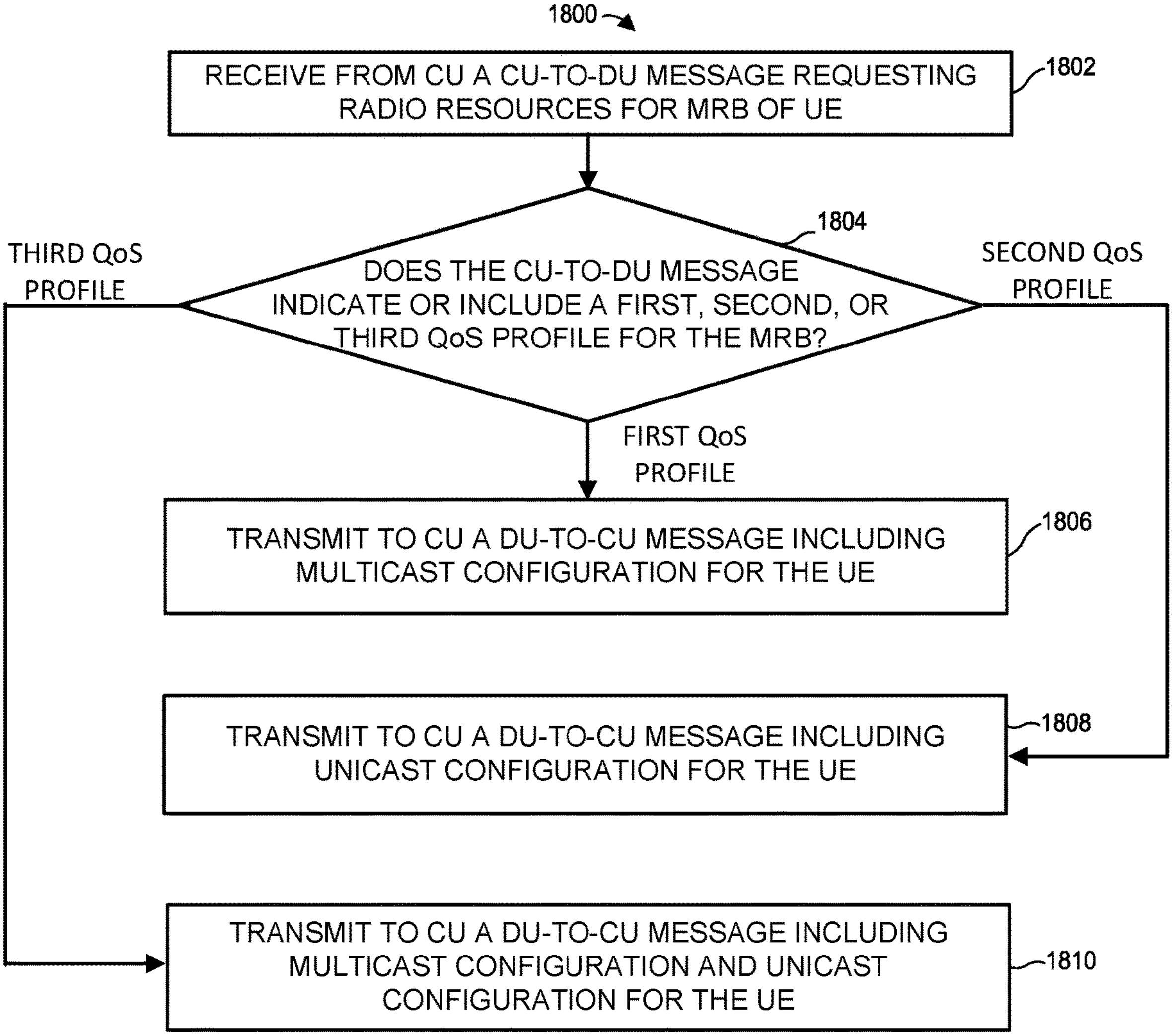

Referring next to FIG. 18, a method 1800 is performed by the DU 174. At block 1802, the DU 174 receives (752A, 760A, 752B, 760B, 752C, 852A, 860A, 852B, 860B, or 852C) from the CU 172 a CU-to-DU message requesting radio resources for the UE 102A. At block 1804, the DU 174 determines whether the CU-to-DU message indicates or includes a first, second, or third QoS profile for the MRB. If the first QoS profile, the DU 174 transmits (754A, 754B, 854A, or 854B) to the CU 172 a DU-to-CU message including a multicast configuration for the UE 102A, at block 1806. If the second QoS profile, the DU 174 transmits (762A, 762B, 862A, or 862B) to the CU 172 a DU-to-CU message including a unicast configuration for the UE 102A, at block 1808. If the third QoS profile, the DU 174 transmits (854C) to the CU 172 a DU-to-CU message including both multicast and unicast configurations for the UE 102A, at block 1810.

Referring next to FIG. 19, a method 1900 is performed by the CU 172. At block 1902, the CU 172 receives (724B,

824A, or 824B) from the CN 110 a CN-to-BS message requesting radio resources for the UE 102A. At block 1904, the CU 172 determines whether the CN-to-BS message indicates or includes a first, second, or third QoS profile for the MRB. If the first QoS profile, the CU 172 transmits to the DU 174 a CU-to-DU message to request a multicast configuration for the UE 102A, at block 1906. If the second QoS profile, the CU 172 transmits (760B, 860A, or 860B) to the DU 174 a CU-to-DU message to request a unicast configuration for the UE 102A, at block 1908. If the third QoS profile, the CU 172 transmits to the DU 174 a CU-to-DU message to request both multicast and unicast configurations for the UE 102A, at block 1910.

Figure 20A:
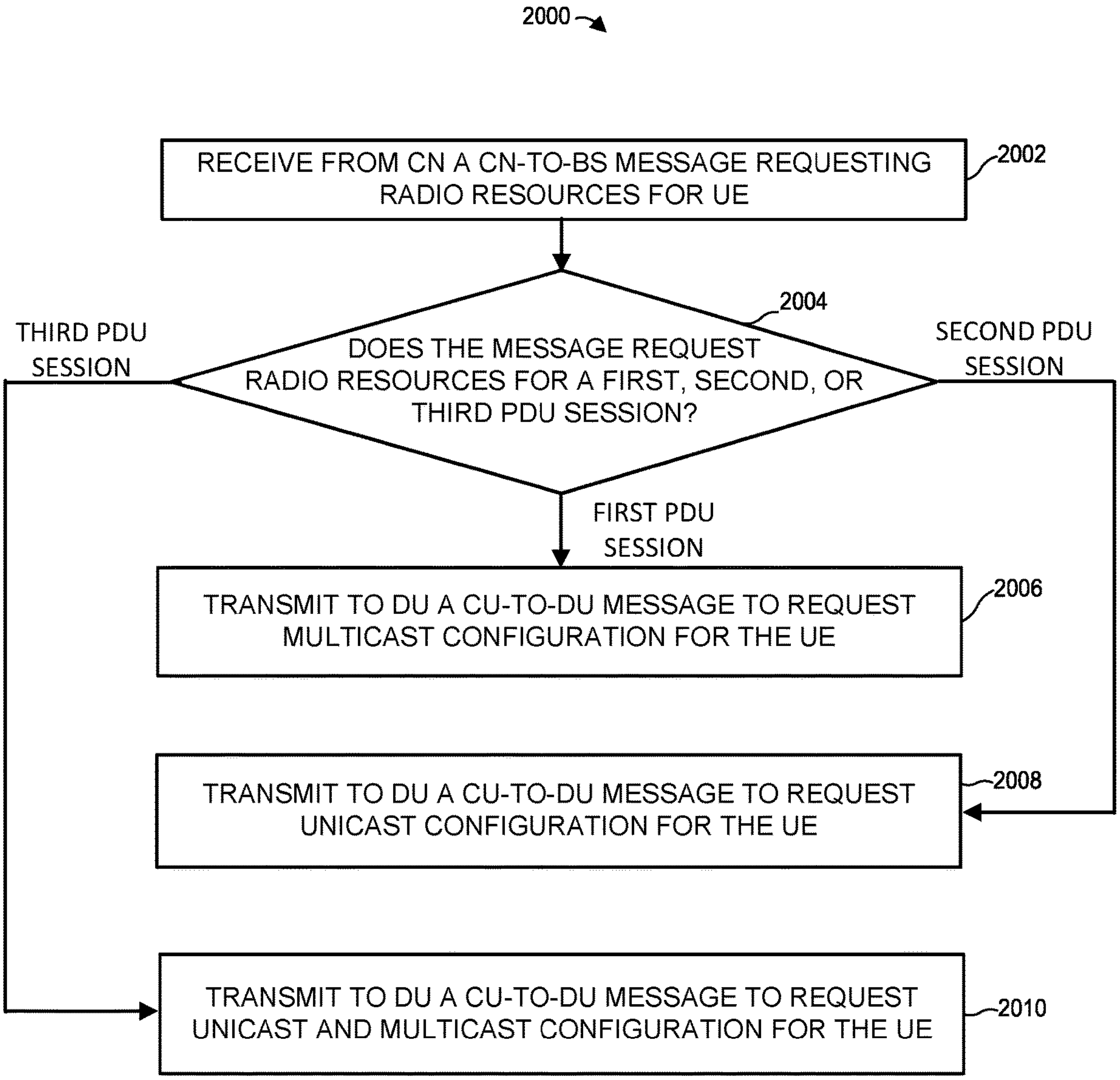

Referring next to FIG. 20A, a method 2000 is performed by the CU 172. At block 2002, the CU 172 receives (724B, 824A, or 824B) from the CN 110 a CN-to-BS message requesting radio resources for the UE 102A. At block 2004, the CU 172 determines whether the CN-to-BS message requests radio resources for a first, second, or third PDU session. If the first PDU session, the CU 172 transmits to the DU 174 a CU-to-DU message to request a multicast configuration for the UE 102A, at block 2006. If the second PDU session, the CU 172 transmits (760B, 860A, or 860B) to the DU 174 a CU-to-DU message to request a unicast configuration for the UE 102A, at block 2008. If the third PDU session, the CU 172 transmits to the DU 174 a CU-to-DU message to request both multicast and unicast configurations for the UE 102A, at block 2010.

Figure 20B:
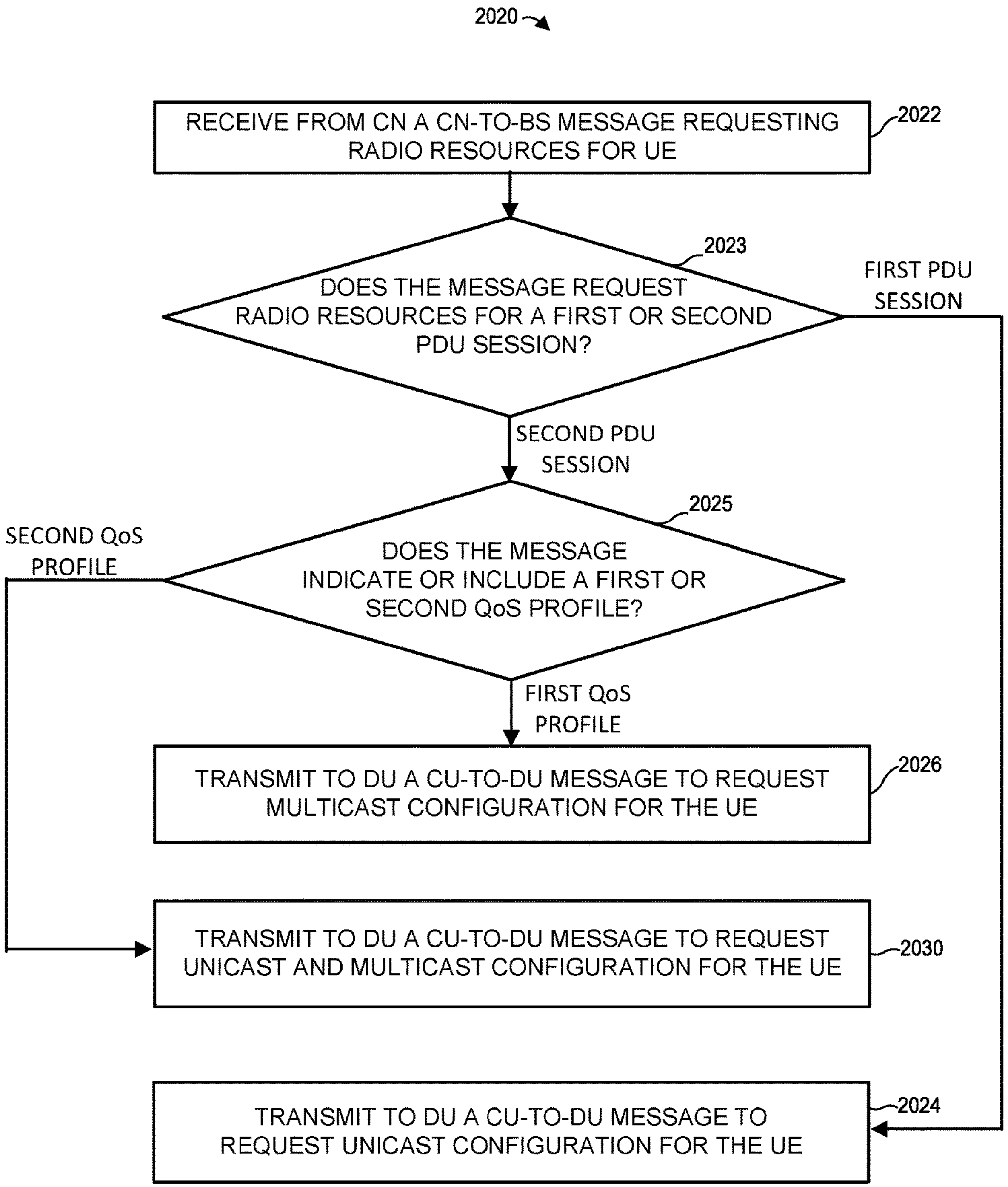

Referring next to FIG. 20B, a method 2020 is performed by the CU 172. At block 2022, the CU 172 receives (724B, 824A, or 824B) from the CN 110 a CN-to-BS message requesting radio resources for the UE 102A. At block 2024, the CU 172 determines whether the CN-to-BS message requests radio resources for a first or second PDU session. If the first PDU session, the CU 172 transmits (760B, 860A, or 860B) to the DU 174 a CU-to-DU message to request a unicast configuration for the UE 102A, at block 2024. If the second PDU session, the CU 172 determines whether the CN-to-BS message indicates or includes a first or a second QoS profile, at block 2025. If the first QoS profile, the CU 172 transmits to the DU 174 a CU-to-DU message to request a multicast configuration for the UE 102A, at block 2026. If the second QoS profile, the CU 172 transmits to the DU 174 a CU-to-DU message to request both unicast and multicast configurations for the UE 102A, at block 2030.

Figure 21:
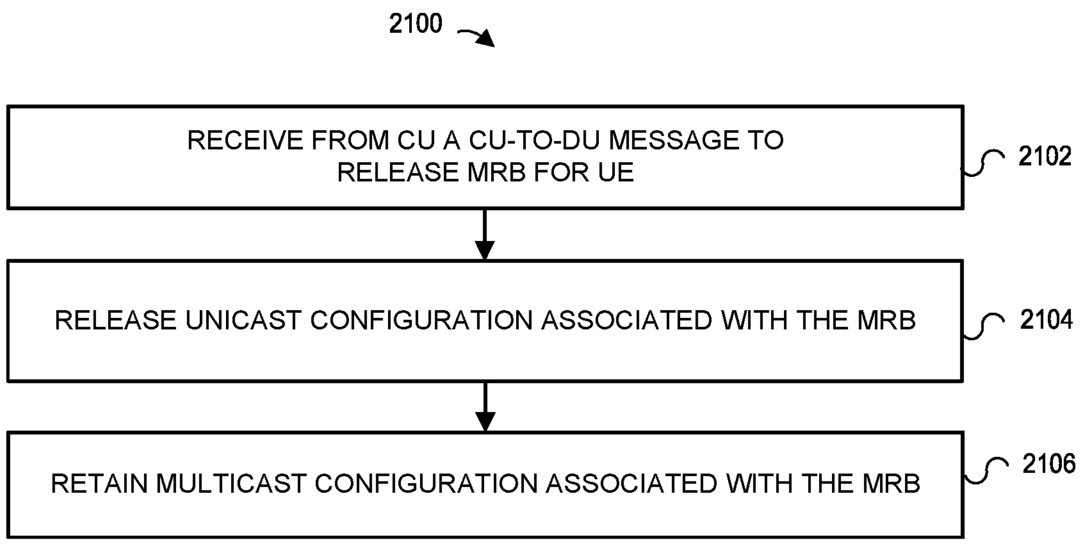
FIG. 21 is a flow diagram of an example method for managing lower layer configurations associated with an MRB at a CU.

FIG. 21 is a flow diagram of an example method 2100 for managing lower layer configurations associated with an MRB at the DU 174. At block 2102, the DU 174 receives from the CU 172 a CU-to-DU message to release the MRB for the UE 102A. In response to the CU-to-DU message, the DU 174 releases (at block 2104) a unicast configuration associated with the MRB, but retains (at block 2106) a multicast configuration associated with the MRB. In this manner, the DU 174 can continue to multicast to other UEs (i.e., other than the UE 102A) using the same multicast configuration.

The following list of aspects reflects a variety of the embodiments explicitly contemplated by the present disclosure.

Aspect 1. A method in one or more nodes of a radio access network (RAN), for managing multicast and/or broadcast services (MBS) communications, the method comprising: transmitting a first MBS radio bearer (MRB) configuration associated with a point-to-multipoint MRB to a plurality of user devices; transmitting first MBS packets to the plurality of user devices via the point-to-multipoint MRB and according to the first MRB configuration; transmitting a second MRB configuration associated with a point-to-point MRB to a user device of the plurality of user devices; and transmitting second MBS packets to the user device via the point-to-point MRB and according to the second MRB configuration.

Aspect 2. The method of aspect 1, further comprising: transmitting to the plurality of user devices a multicast configuration, wherein transmitting the first MBS packets via the point-to-multipoint MRB is according to both the first MRB configuration and the multicast configuration; and transmitting to the user device a unicast configuration, wherein transmitting the second MBS packets via the point-to-point MRB is according to both the second MRB configuration and the unicast configuration.

Aspect 3. The method of aspect 2, comprising: transmitting to the plurality of user devices a first radio resource control (RRC) message, wherein the first RRC message includes the first MRB configuration and the multicast configuration; and transmitting to the user device a second RRC message, wherein the second RRC message includes the second MRB configuration and the unicast configuration.

Aspect 4. The method of aspect 2 or 3, wherein: the first and second MRB configurations are associated with operations at a first one or more layers of a protocol stack; and the multicast and unicast configurations are associated with operations at a second one or more layers of the protocol stack, the first one or more layers being above the second one or more layers in the protocol stack.

Aspect 5. The method of aspect 4, wherein: the first one or more layers include packet data convergence protocol (PDCP) and service data adaptation protocol (SDAP) layers; and the second one or more layers include medium access control (MAC) and radio link control (RLC) layers.

Aspect 6. The method of any one of aspects 2-5, further comprising, at a distributed unit of a base station of the RAN: transmitting a first message to a central unit of the base station, the first message including the multicast configuration; in response to the first message, receiving from the central unit a second message including the first MRB configuration; transmitting a third message to the central unit, the third message including the unicast configuration; and in response to the third message, receiving from the central unit a fourth message including the second MRB configuration, wherein transmitting the first MRB configuration and transmitting the multicast configuration is in response to receiving the second message, and wherein transmitting the second MRB configuration and transmitting the unicast configuration is in response to receiving the fourth message.

Aspect 7. The method of aspect 6, further comprising: determining, at the distributed unit, to provide unicast and/or multicast radio resources to the user device based on an indication, received from the central unit, of one or both of (i) a quality of service associated with the first MRB, and (ii) a protocol data unit (PDU) session associated with the first MRB.

Aspect 8. The method of any one of aspects 1-7, wherein transmitting first MBS packets to the plurality of user devices includes broadcasting the first MRB packets.

Aspect 9. The method of any one of aspects 1-8, wherein transmitting the first MRB configuration to the plurality of user devices includes broadcasting the first MRB configuration.

Aspect 10. The method of any one of aspects 1-9, further comprising: before transmitting the first MRB configuration, receiving from the user device a message requesting a first MBS, wherein the point-to-multipoint MRB is associated with the first MBS.

Aspect 11. The method of aspect 10, further comprising: before transmitting the second MRB configuration, receiving from the user device a message requesting a second MBS, wherein the point-to-point MRB is associated with the second MBS.

Aspect 12. The method of aspects 11, further comprising: in response to receiving the message requesting the first MBS, sending a first message to a core network; in response to sending the first message, receiving a second message from the core network; in response to receiving the message requesting the second MBS, sending a third message to the core network; and in response to sending the third message, receiving a fourth message from the core network, wherein transmitting the first MRB configuration is in response to receiving the second message, and wherein transmitting the second MRB configuration is in response to receiving the fourth message.

Aspect 13. The method of aspect 11 or 12, wherein the message requesting the first MBS is a message requesting establishment of a first protocol data unit (PDU) session supporting at least the first MBS.

Aspect 14. The method of aspect 13, wherein the message requesting the second MBS is a message requesting establishment of a second PDU session supporting the second MBS.

Aspect 15. The method of aspect 13, wherein: the first PDU session supports the first MBS and the second MBS; and the message requesting the second MBS does not request another PDU session.

Aspect 16. The method of aspect 10, wherein the message requesting the first MBS is a message requesting establishment of a protocol data unit (PDU) session supporting at least the first MBS, the method further comprising: after transmitting the first MBS packets, receiving from a core network a message indicating that the PDU session is to be reconfigured to use unicast radio resources, wherein transmitting the second MRB configuration is in response to receiving the message indicating that the PDU session is to be reconfigured.

Aspect 17. The method of any one of aspects 1-16, wherein transmitting the first MRB configuration occurs after transmitting the second MRB configuration and after transmitting at least some of the second MBS packets.

Aspect 18. The method of any one of aspects 1-17, wherein transmitting the first MBS packets includes transmitting some of the first MBS packets before transmitting the second MRB configuration, and transmitting other of the first MBS packets after transmitting the second MRB configuration.

Aspect 19. A method in one or more nodes of a radio access network (RAN), for managing multicast and/or broadcast services (MBS) communications, the method comprising: transmitting to a user device (i) a first MBS radio bearer (MRB) configuration associated with a first MRB and (ii) a first lower layer configuration; transmitting first MBS packets to the user device via the first MRB and according to the first MRB configuration and the first lower layer configuration; and after transmitting the first MBS packets, transmitting second MBS packets to the user device via either the first MRB or a second MRB, and according to a second lower layer configuration and either the first MRB configuration or a second MRB configuration, the first and second lower layer configurations being different ones of a multicast configuration and a unicast configuration.

Aspect 20. The method of aspect 19, wherein: the first MRB configuration is associated with operations at a first one or more layers of a protocol stack; and the first and second lower layer configurations are associated with operations at a second one or more layers of the protocol stack, the first one or more layers being above the second one or more layers in the protocol stack.

Aspect 21. The method of aspect 20, wherein: the first one or more layers include packet data convergence protocol (PDCP) and service data adaptation protocol (SDAP) layers; and the second one or more layers include medium access control (MAC) and radio link control (RLC) layers.

Aspect 22. The method of any one of aspects 19-21, further comprising, at a distributed unit of a base station of the RAN: transmitting a first message to a central unit of the base station, the first message including the first lower layer configuration; in response to the first message, receiving from the central unit a second message including the first MRB configuration; transmitting a third message to the central unit, the third message including the second lower layer configuration; and in response to the third message, receiving from the central unit a fourth message, wherein transmitting the first MRB configuration and the first lower layer configuration is in response to receiving the second message, and wherein transmitting the transmitting the second lower layer configuration is in response to receiving the fourth message.

Aspect 23. The method of aspect 22, further comprising: determining, at the distributed unit, to provide unicast and/or multicast radio resources to the user device based on an indication, received from the central unit, of one or both of (i) a quality of service associated with the first MRB, and (ii) a protocol data unit (PDU) session associated with the first MRB.

Aspect 24. The method of any one of aspects 19-23, further comprising: after transmitting the first MBS packets and before transmitting the second MBS packets, transmitting the second lower layer configuration to the user device.

Aspect 25. The method of aspect 24, wherein: transmitting the second lower layer configuration further includes transmitting the second MRB configuration to the user device; and transmitting the second MBS packets is according to the second lower layer configuration and the second MRB configuration.

Aspect 26. The method of aspect 25, further comprising: before transmitting the first MRB configuration and the first lower layer configuration, receiving from the user device a message requesting establishment of a protocol data unit (PDU) session supporting at least the first MBS; and after transmitting the first MBS packets, receiving from a core network a message indicating that the PDU session is to be reconfigured, wherein transmitting the second lower layer configuration and the second MRB configuration is in response to receiving the message indicating that the PDU session is to be reconfigured.

Aspect 27. The method of any one of aspects 19-26, wherein transmitting the first MRB configuration and the first lower layer configuration further includes transmitting the second lower layer configuration to the user device.

Aspect 28. The method of aspect 27, wherein transmitting the first MRB configuration, the first lower layer configuration, and the second lower layer configuration to the user device includes transmitting to the user device a radio resource control (RRC) message that includes the first MRB configuration, the first lower layer configuration, and the second lower layer configuration.

Aspect 29. The method of any one of aspects 19-28, wherein the method occurs during a single protocol data unit (PDU) session associated with the user device.

Aspect 30. The method of any one of aspects 19-29, wherein either transmitting the first MBS packets or transmitting the second MBS packets includes broadcasting the first MRB packets.

Aspect 31. The method of any one of aspects 19-30, wherein transmitting the first MRB configuration includes broadcasting the first MRB configuration.

Aspect 32. One or more nodes of a random access network (RAN), the one or more nodes comprising hardware and being configured to perform the method of any one of aspects 1-31.

Aspect 33. A method, in a user device communicating with a radio access network (RAN), for managing multicast and/or broadcast services (MBS) communications, the method comprising: receiving from the RAN a first MBS radio bearer (MRB) configuration associated with a point-to-multipoint MRB; receiving first MBS packets from the RAN via the point-to-multipoint MRB and according to the first MRB configuration; receiving from the RAN a second MRB configuration associated with a point-to-point MRB; and receiving second MBS packets from the RAN via the point-to-point MRB and according to the second MRB configuration.

Aspect 34. The method of aspect 33, further comprising: receiving from the RAN a multicast configuration, wherein receiving the first MBS packets via the point-to-multipoint MRB is according to both the first MRB configuration and the multicast configuration; and receiving from the RAN a unicast configuration, wherein receiving the second MBS packets via the point-to-point MRB is according to both the second MRB configuration and the unicast configuration.

Aspect 35. The method of aspect 34, comprising: receiving from the RAN a first radio resource control (RRC) message, wherein the first RRC message includes the first MRB configuration and the multicast configuration; and receiving from the RAN a second RRC message, wherein the second RRC message includes the second MRB configuration and the unicast configuration.

Aspect 36. The method of aspect 34 or 35, wherein: the first and second MRB configurations are associated with operations at a first one or more layers of a protocol stack; and the multicast and unicast configurations are associated with operations at a second one or more layers of the protocol stack, the first one or more layers being above the second one or more layers in the protocol stack.

Aspect 37. The method of aspect 36, wherein: the first one or more layers include packet data convergence protocol (PDCP) and service data adaptation protocol (SDAP) layers; and the second one or more layers include medium access control (MAC) and radio link control (RLC) layers.

Aspect 38. The method of any one of aspects 33-37, further comprising: before receiving the first MRB configuration, transmitting to the RAN a message requesting a first MBS, wherein the point-to-multipoint MRB is associated with the first MBS; and before receiving the second MRB configuration, transmitting to the RAN a message requesting a second MBS, wherein the point-to-point MRB is associated with the second MBS.

Aspect 39. The method of aspect 38, wherein the message requesting the first MBS is a message requesting establishment of a first protocol data unit (PDU) session supporting at least the first MBS.

Aspect 40. The method of aspect 39, wherein the message requesting the second MBS is a message requesting establishment of a second PDU session supporting the second MBS.

Aspect 41. The method of aspect 39, wherein: the first PDU session supports the first MBS and the second MBS; and the message requesting the second MBS does not request another PDU session.

Aspect 42. The method of any one of aspects 33-41, wherein receiving the first MRB configuration occurs after receiving the second MRB configuration and after receiving at least some of the second MBS packets.

Aspect 43. The method of any one of aspects 33-42, wherein receiving the first MBS packets includes receiving some of the first MBS packets before receiving the second MRB configuration, and receiving other of the first MBS packets after receiving the second MRB configuration.

Aspect 44. A method, in a user device communicating with a radio access network (RAN), for managing multicast and/or broadcast services (MBS) communications, the method comprising: receiving from the RAN (i) a first MBS radio bearer (MRB) configuration associated with a first MRB and (ii) a first lower layer configuration; receiving first MBS packets from the RAN via the first MRB and according to the first MRB configuration and the first lower layer configuration; and after receiving the first MBS packets, receiving second MBS packets from the RAN via either the first MRB or a second MRB, and according to a second lower layer configuration and either the first MRB configuration or a second MRB configuration, the first and second lower layer configurations being different ones of a multicast configuration and a unicast configuration.

Aspect 45. The method of aspect 44, wherein: the first MRB configuration is associated with operations at a first one or more layers of a protocol stack; and the first and second lower layer configurations are associated with operations at a second one or more layers of the protocol stack, the first one or more layers being above the second one or more layers in the protocol stack.

Aspect 46. The method of aspect 45, wherein: the first one or more layers include packet data convergence protocol (PDCP) and service data adaptation protocol (SDAP) layers; and the second one or more layers include medium access control (MAC) and radio link control (RLC) layers.

Aspect 47. The method of any one of aspects 44-46, further comprising: after receiving the first MBS packets and before receiving the second MBS packets, receiving the second lower layer configuration from the RAN.

Aspect 48. The method of aspect 47, wherein: receiving the second lower layer configuration further includes receiving the second MRB configuration from the RAN; and receiving the second MBS packets is according to the second lower layer configuration and the second MRB configuration.

Aspect 49. The method of aspect 48, further comprising: before receiving the first MRB configuration and the first lower layer configuration, transmitting to the RAN a message requesting establishment of a protocol data unit (PDU) session supporting at least the first MBS.

Aspect 50. The method of any one of aspects 44-46, wherein receiving the first MRB configuration and the first lower layer configuration further includes receiving the second lower layer configuration from the RAN.

Aspect 51. The method of aspect 50, wherein receiving the first MRB configuration, the first lower layer configuration, and the second lower layer configuration from the RAN includes receiving from the RAN a radio resource control (RRC) message that includes the first MRB configuration, the first lower layer configuration, and the second lower layer configuration.

Aspect 52. The method of any one of aspects 44-51, wherein the method occurs during a single protocol data unit (PDU) session associated with the user device.

Aspect 53. A user device comprising hardware and being configured to perform the method of any one of aspects 33-52.

The following additional considerations apply to the foregoing discussion.

A user device in which the techniques of this disclosure can be implemented (e.g., the UE 102A or 102B) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for communicating MBS information through the disclosed principles herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method, performed by a central unit (CU) of a distributed base station, for managing multicast and/or broadcast services (MBS) communications, the method comprising:

transmitting, to a distributed unit (DU) of the distributed base station, a first CU-to-DU message to request a multicast configuration for a user equipment (UE);

in response to the first CU-to-DU message, receiving from the DU a first DU-to-CU message including a multicast configuration for the UE; and transmitting, to the UE and via the DU, a first message including the multicast configuration.

2. The method of claim 1, further comprising:

transmitting to the DU a second CU-to-DU message to request a unicast configuration for the UE;

in response to the second CU-to-DU message, receiving from the DU a second DU-to-CU message including a unicast configuration for the UE; and transmitting, to the UE and via the DU, a second message including the unicast configuration.

3. The method of claim 1, wherein the first CU-to-DU message is a UE Context Modification Request message and the first DU-to-CU message is a UE Context Modification Response message.

4. The method of claim 1, wherein the first CU-to-DU message is a UE Context Setup Request message and the first DU-to-CU message is a UE Context Setup Response message.

5. A central unit (CU) of a distributed base station, the CU comprising:

one or more processors configured to:

transmit, to a distributed unit (DU) of the distributed base station, a first CU-to-DU message to request a multicast configuration for a user equipment (UE);

in response to the first CU-to-DU message, receive from the DU a first DU-to-CU message including a multicast configuration for the UE; and transmit, to the UE and via the DU, a first message including the multicast configuration.

6. The CU of claim 5, wherein the one or more processors are further configured to:

transmit to the DU a second CU-to-DU message to request a unicast configuration for the UE;

in response to the second CU-to-DU message, receive from the DU a second DU-to-CU message including a unicast configuration for the UE; and transmit, to the UE and via the DU, a second message including the unicast configuration.

7. The CU of claim 5, wherein the first CU-to-DU message is a UE Context Modification Request message and the first DU-to-CU message is a UE Context Modification Response message.

8. The CU of claim 5, wherein the first CU-to-DU message is a UE Context Setup Request message and the first DU-to-CU message is a UE Context Setup Response message.

9. A method, performed by a distributed unit (DU) of a distributed base station, for managing multicast and/or broadcast services (MBS) communications, the method comprising:

transmitting, to a central unit (CU) of the distributed base station, a first DU-to-CU message including a multicast configuration for a user equipment (UE); and multicasting MBS packets to the UE and one or more other UEs according to the multicast configuration.

10. The method of claim 9, further comprising:
receiving, from the CU, a first CU-to-DU message,
wherein transmitting the first DU-to-CU message is in response to the first CU-to-DU message.

11. The method of claim 10, wherein the first CU-to-DU message is a UE Context Modification Request message and the first DU-to-CU message is a UE Context Modification Response message.

12. The method of claim 10, wherein the first CU-to-DU message is a UE Context Setup Request message and the first DU-to-CU message is a UE Context Setup Response message.

13. The method of claim 9, further comprising:
transmitting to the CU a second DU-to-CU message including a unicast configuration for the UE; and
unicasting MBS packets to the UE according to the unicast configuration.

14. A distributed unit (DU) of a distributed base station, the DU comprising:
one or more processors configured to:
transmit, to a central unit (CU) of the distributed base station, a first DU-to-CU message including a multicast configuration for a user equipment (UE); and
multicast multicast and/or broadcast services (MBS) packets to the UE and one or more other UEs according to the multicast configuration.

15. The DU of claim 14, wherein the one or more processors are further configured to:
receive, from the CU, a first CU-to-DU message,
wherein transmitting the first DU-to-CU message is in response to the first CU-to-DU message.

16. The DU of claim 15, wherein the first CU-to-DU message is a UE Context Modification Request message and the first DU-to-CU message is a UE Context Modification Response message.

17. The DU of claim 15, wherein the first CU-to-DU message is a UE Context Setup Request message and the first DU-to-CU message is a UE Context Setup Response message.

18. The DU of claim 14, wherein the one or more processors are further configured to:
transmit to the CU a second DU-to-CU message including a unicast configuration for the UE; and
unicast multicast and/or broadcast services (MBS) packets to the UE according to the unicast configuration.

19. A method, performed by a distributed unit (DU) of a distributed base station, for managing multicast and/or broadcast services (MBS) communications, the method comprising:
receiving, from a central unit (CU) of the distributed base station, a first CU-to-DU message requesting radio resources for a user equipment (UE); and
transmitting to the CU a first DU-to-CU message, wherein
when the first CU-to-DU message requests radio resources for multicast, the first DU-to-CU message includes a multicast configuration for the UE,
when the first CU-to-DU message requests radio resources for unicast, the first DU-to-CU message includes a unicast configuration for the UE, and
when the first CU-to-DU message requests radio resources for both multicast and unicast, the first DU-to-CU message includes a multicast configuration and a unicast configuration for the UE.

20. The method of claim 19, wherein the first CU-to-DU message is a UE Context Modification Request message and the first DU-to-CU message is a UE Context Modification Response message.

21. The method of claim 19, wherein the first CU-to-DU message is a UE Context Setup Request message and the first DU-to-CU message is a UE Context Setup Response message.

* * * * *